(12) United States Patent
Chen et al.

(10) Patent No.: US 12,100,810 B2
(45) Date of Patent: Sep. 24, 2024

(54) SECONDARY BATTERY AND BATTERY MODULE, BATTERY PACK AND ELECTRICAL DEVICE CONTAINING THE SAME

(71) Applicant: CONTEMPORARY AMPEREX TECHNOLOGY CO., LIMITED, Ningde (CN)

(72) Inventors: Peipei Chen, Ningde (CN); Limei Zhang, Ningde (CN); Yao Jiang, Ningde (CN); Jiao Liu, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/638,759

(22) Filed: Apr. 18, 2024

(65) Prior Publication Data

US 2024/0283027 A1    Aug. 22, 2024

Related U.S. Application Data

(63) Continuation of application No. PCT/CN2022/090261, filed on Apr. 29, 2022.

(51) Int. Cl.
*H01M 10/0567* (2010.01)
*H01M 4/36* (2006.01)
(Continued)

(52) U.S. Cl.
CPC ....... *H01M 10/0567* (2013.01); *H01M 4/366* (2013.01); *H01M 4/505* (2013.01); *H01M 4/5825* (2013.01); *H01M 2300/0025* (2013.01)

(58) Field of Classification Search
CPC .. H01M 10/0567; H01M 4/366; H01M 4/505; H01M 4/5825; H01M 2300/0025
See application file for complete search history.

(56) References Cited

U.S. PATENT DOCUMENTS

2018/0166679 A1    6/2018    Ophir et al.

FOREIGN PATENT DOCUMENTS

| CN | 104600364 A | 5/2015 |
|---|---|---|
| CN | 105261740 A | 1/2016 |

(Continued)

OTHER PUBLICATIONS

International Search Report received in the corresponding international application PCT/CN2022/090261, mailed Nov. 30, 2022.
(Continued)

*Primary Examiner* — Jane J Rhee
(74) *Attorney, Agent, or Firm* — Kilpatrick Townsend & Stockton LLP

(57) ABSTRACT

The present application provides a secondary battery and a battery module, battery pack and electrical device containing the same. The secondary battery comprises a positive electrode plate and an non-aqueous electrolytic solution,
(Continued)

wherein the positive electrode plate comprises a positive electrode active material with a core-shell structure, said positive electrode active material comprising an core and a shell covering said core, said core has a chemical formula of $Li_{1+x}Mn_{1-y}A_yP_{1-z}R_zO_4$; said shell comprises a first cladding layer covering said core, a second cladding layer covering said first cladding layer and a third cladding layer covering said second cladding layer, said non-aqueous electrolytic solution comprises a first additive, said first additive comprises one or more of compounds as shown by Formula 1, Formula 2 and Formula 3.

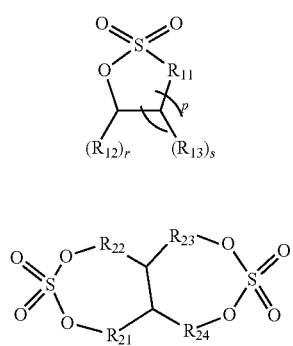

16 Claims, 2 Drawing Sheets

(51) Int. Cl.
H01M 4/505 (2010.01)
H01M 4/58 (2010.01)

(56) References Cited

FOREIGN PATENT DOCUMENTS

| | | |
|---|---|---|
| CN | 106058225 A | 10/2016 |
| CN | 110416525 A | 11/2019 |
| CN | 113764732 A | 12/2021 |
| CN | 114256448 A | 3/2022 |
| JP | 2021101432 A | 7/2021 |
| WO | 2018032569 A1 | 2/2018 |

OTHER PUBLICATIONS

Written Opinion of ISA received in the corresponding international application PCT/CN2022/090261, mailed Nov. 30, 2022.

SECONDARY BATTERY AND BATTERY MODULE, BATTERY PACK AND ELECTRICAL DEVICE CONTAINING THE SAME

CROSS-REFERENCE TO RELATED APPLICATION

This application is a Continuation of International Application No. PCT/CN2022/090261 filed on Apr. 29, 2022, which is incorporated herein by reference in its entirety.

TECHNICAL FIELD

The present application belongs to the technical field of battery, in particular to a secondary battery and a battery module, a battery pack and an electrical device containing the same.

BACKGROUND

In recent years, secondary batteries have been widely used in energy storage power systems such as hydro, thermal, wind and solar power plants, as well as electric tools, electric bicycles, electric motorcycles, electric vehicles, military equipment, aerospace and many other fields. With the application and promotion of secondary batteries, their safety performances are receiving more and more attention. Lithium manganese phosphate has become one of the most popular positive electrode active materials due to its high capacity, good safety performance and abundant raw material sources, however, lithium manganese phosphate is prone to manganese ion leaching out during charging, resulting in rapid capacity decay, thereby constraining its commercialization.

SUMMARY

An object of the present application is to provide a secondary battery and a battery module, a battery pack and an electrical device containing the same, aiming to enable the secondary battery to have a relatively high energy density, and a good rate performance, cycle performance, storage performance and safety performance.

A first aspect of the present application provides a secondary battery, comprising a positive electrode plate and an non-aqueous electrolytic solution, wherein
the positive electrode plate comprises a positive electrode active material with a core-shell structure, in which said positive electrode active material comprises an core and a shell covering said core,
said core has a chemical formula of $Li_{1+x}Mn_{1-y}A_yP_{1-z}R_zO_4$, x is any value in the range of −0.100 to 0.100, y is any value in the range of 0.001 to 0.500, z is any value in the range of 0.001 to 0.100, said A is one or more elements selected from Zn, Al, Na, K, Mg, Mo, W, Ti, V, Zr, Fe, Ni, Co, Ga, Sn, Sb, Nb, and Ge, optionally one or more elements selected from Fe, Ti, V, Ni, Co and Mg, said R comprises one or more elements selected from B, Si, N and S, optionally one element selected from B, Si, N and S;
said x, y and z have a value satisfying such a condition that the core is electrically neutral throughout;
the shell comprises a first cladding layer covering the core, a second cladding layer covering the first cladding layer and a third cladding layer covering the second cladding layer,
said first cladding layer comprises crystalline pyrophosphate salts $Li_aMP_2O_7$ and/or $Mb(P_2O_7)_c$, 0≤a≤2, 1≤b≤4, 1≤c≤6, wherein said a, b, and c have an value satisfying such a condition that the crystalline pyrophosphate salts $Li_aMP_2O_7$ or $Mb(P_2O_7)_c$ is electrically neutral; and each M in the crystalline pyrophosphate salts L $Li_aMP_2O_7$ and/or $Mb(P_2O_7)_c$ is independently one or more elements selected from Fe, Ni, Mg, Co, Cu, Zn, Ti, Ag, Zr, Nb, and Al, and
said second cladding layer comprises crystalline phosphate salts $XPO_4$, X being one or more elements selected from Li, Fe, Ni, Mg, Co, Cu, Zn, Ti, Ag, Zr, Nb and Al; and
said third cladding layer is carbon,
said non-aqueous electrolytic solution comprises a first additive which comprises one or more of compounds as shown by Formula 1, Formula 2 and Formula 3,

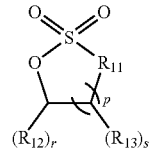

Formula 1

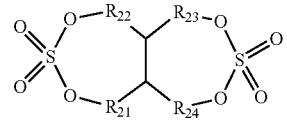

Formula 2

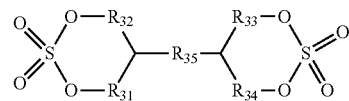

Formula 3 in which,
p represents 1, 2 or 3, r represents 1 or 2, s represents 1 or 2, and
$R_{11}$ represents an oxygen atom or $C(Y^1)_2$, $Y^1$ independently represents one of a hydrogen atom, a halogen atom, C1-C6 alkyl, C1-C6 haloalkyl, C1-C6 alkoxy, and C1-C6 haloalkoxy, and
$R_{12}$ each independently represents one of a hydrogen atom, a halogen atom, C1-C6 alkyl, C1-C6 haloalkyl, C1-C6 alkoxy, and C1-C6 haloalkoxy, and
$R_{13}$ each independently represents one of a hydrogen atom, a halogen atom, C1-C6 alkyl group, C1-C6 haloalkyl group, C1-C6 alkoxy group, and C1-C6 haloalkoxy group, and
$R_{21}$, $R_{22}$, $R_{23}$, $R_{24}$ each independently represent a single bond or $C(Y^2)_2$, and $Y^2$ each independently represents one of a hydrogen atom, a halogen atom, C1-C6 alkyl, C1-C6 haloalkyl, C1-C6 alkoxy, and C1-C6 haloalkoxy, and
$R_{31}$, $R_{32}$, $R_{33}$, $R_{34}$ each independently represent a single bond or $C(Y^3)_2$, and $Y^3$ each independently represents one of a hydrogen atom, a halogen atom, C1-C6 alkyl, C1-C6 haloalkyl, C1-C6 alkoxy, and C1-C6 haloalkoxy, and
$R_{35}$ is absent or represents one of a single bond, an oxygen atom, C1-C6 alkylene, C1-C6 haloalkylene, C1-C6 oxa-alkylene.

The inventors, after extensive study, found that by modifying lithium manganese phosphate with doping and cladding lithium manganese phosphate with multiple cladding layers, it is allowed to obtain a novel positive electrode active material with a core-shell structure and the positive electrode active material is capable of achieving reduced leaching out of manganese ions and reduced lattice change rate, thereby improving rate performances, cycle performances, storage performances and safety performances of secondary batteries while increasing capacity exertion of secondary batteries.

When the non-aqueous electrolytic solution contains the first additive shown in the above Formula 1, Formula 2, and Formula 3, it is capable of forming a layer of a sulfur-containing polymer with strong lithium ion conductivity on the surface of the positive electrode active material during a charge process of the secondary battery, so as to enhance lithium ion conductivity of the positive electrode active material, and thereby further enhance capacity exertion and rate performance of the secondary battery.

In addition, the first additive can also coordinate with transition metals on the surface of the positive electrode active material and form a complex, so that interfacial film formed on the surface of the positive electrode active material is more dense and stable, thereby further reducing interfacial side reactions between the positive electrode active material and the non-aqueous electrolytic solution, further reducing leaching out of the manganese ions, and reducing gas production. Since the first additive has a high reduction potential, it can also accept electrons from a negative electrode during a charge process and reduce itself, and preferentially form a dense and stable interfacial film on the surface of the negative electrode active material over an organic solvent, thereby reducing interfacial side reactions between the negative electrode active material and the non-aqueous electrolytic solution.

Therefore, the secondary battery of the present application is capable of simultaneously combining a high energy density with a good rate performance, cycle performance, storage performance, and safety performance.

In some embodiments of the present application, said compound shown in Formula 1 satisfies at least one of the following conditions (1) to (4):
(1) p represents 1 or 2,
(2) $R_{11}$ represents an oxygen atom or $C(Y^1)_2$, with $Y^1$ independently representing one of a hydrogen atom, a fluorine atom, methyl, ethyl, propyl, fluorinated methyl, fluorinated ethyl, fluorinated propyl, methoxy, ethoxy, and propoxy,
(3) $R_{12}$ each independently represents one of a hydrogen atom, a fluorine atom, methyl, ethyl, propyl, fluorinated methyl, fluorinated ethyl, fluorinated propyl, methoxy, ethoxy, and propoxy, and
(4) $R_{13}$ each independently represents one of a hydrogen atom, a fluorine atom, methyl, ethyl, propyl, fluorinated methyl, fluorinated ethyl, fluorinated propyl, methoxy, ethoxy, and propoxy.

In some embodiments of the present application, said compound shown in formula 2 satisfies at least one of the following conditions (5) to (7):
(5) $R_{21}$, $R_{22}$, $R_{23}$, $R_{24}$ independently represent a single bond or methylene,
(6) $R_{21}$, $R_{22}$, $R_{23}$, and $R_{24}$ are not all a single bond, and
(7) one or both of $R_{21}$, $R_{22}$ are methylene, and one or both of $R_{23}$, $R_{24}$ are methylene.

In some embodiments of the present application, said compound shown in formula 3 satisfies at least one of the following conditions (8) to (10):

(8) $R_{31}$, $R_{32}$, $R_{33}$, and $R_{34}$ independently represent a single bond or methylene, and $R_{31}$, $R_{32}$, $R_{33}$, and $R_{34}$ are not all a single bond,
(9) $R_{35}$ is absent or represents one of a single bond, an oxygen atom, methylene, ethylene, propylene, fluorinated methylene, fluorinated ethylene, fluorinated propylene, 2-oxa-1,3-propylene, 2-oxa-1,4-butylene, 3-oxa-1,5-pentylene, and
(10) $R_{35}$ is absent or represents one of a single bond, methylene, ethylene, propylene, 2-oxa-1,3-propylene.

In some embodiments of the present application, $R_{31}$, $R_{32}$, $R_{33}$, $R_{34}$, and $R_{35}$ satisfy any one of the following conditions (1) to (6):
(1) $R_{35}$ is a single bond, one or both of $R_{31}$ and $R_{32}$ are methylene, and the remaining substituents are a single bond, and
(2) $R_{35}$ is a single bond, one or both of $R_{33}$ and $R_{34}$ are methylene, and the remaining substituents are a single bond, and
(3) $R_{35}$ is a single bond, one of $R_{31}$ and $R_{32}$ is methylene, one of $R_{33}$ and $R_{34}$ is methylene, and the remaining substituents are a single bond, and
(4) $R_{35}$ is a single bond, one of $R_{31}$ and $R_{32}$ is methylene, one of $R_{33}$ and $R_{34}$ is methylene, and the remaining substituents are a single bond, and
(5) $R_{35}$ is a single bond, $R_{33}$ and $R_{34}$ are both methylene, one of $R_{31}$ and $R_{32}$ is methylene, and the remaining substituents are a single bond, and
(6) $R_{35}$ is a single bond, $R_{31}$, $R_{32}$, $R_{33}$, $R_{34}$ are all methylene.

In some embodiments of the present application, said first additive comprises at least one of the following compounds:

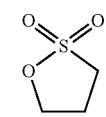

H1

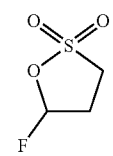

H2

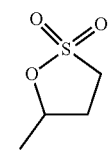

H3

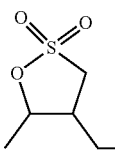

H4

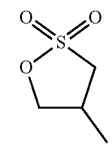

H5

| | |
|---|---|
| 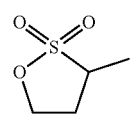 | H6 |
| 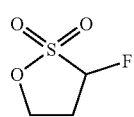 | H7 |
| 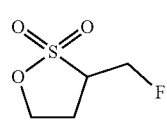 | H8 |
| 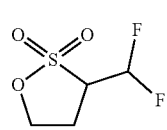 | H9 |
| 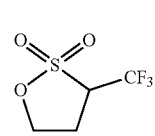 | H10 |
| 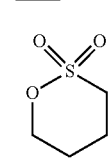 | H11 |
| 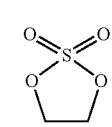 | H12 |
| 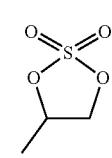 | H13 |
| 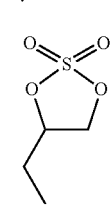 | H14 |
| 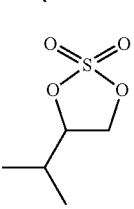 | H15 |
| 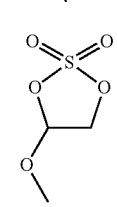 | H16 |
| | |
|---|---|
| 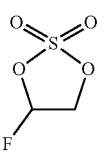 | H17 |
| 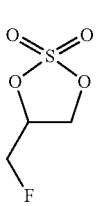 | H18 |
| 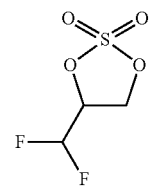 | H19 |
| 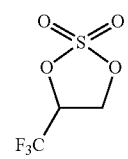 | H20 |
| 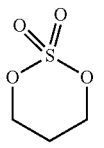 | H21 |
| 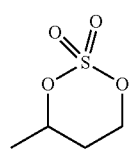 | H22 |
| 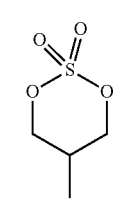 | H23 |
| 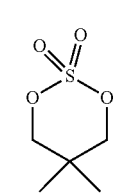 | H24 |
| 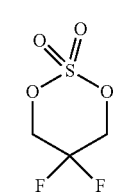 | H25 |

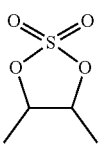
H26

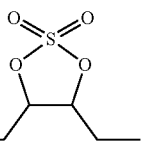
H27

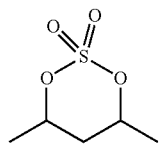
H28

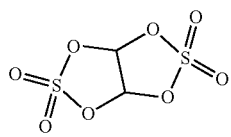
H29

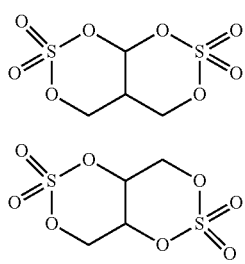
H30

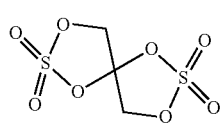
H31

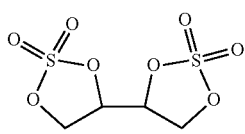
H32

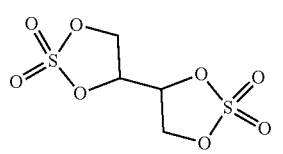
H33

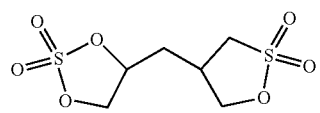
H34

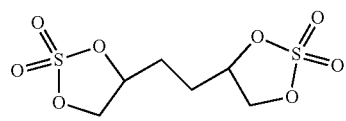
H35

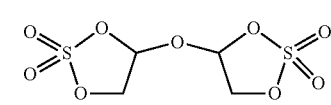
H36

H37

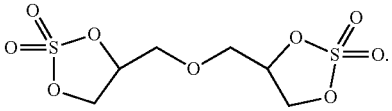
H38

With at least one of the above compounds as the first additive, it capable of forming a more dense and stable interfacial film with stronger lithium ion conductivity on the surface of the positive electrode active material, and a more dense and stable interfacial film on the surface of the negative electrode active material, and even after a long period of charge and discharge, said positive and negative electrode interfacial film are still effective in preventing active materials from coming into contact with the non-aqueous electrolytic solution, thus effectively reducing leaching out of manganese ions and reducing gas production, further improving cycle performance and storage performance of the secondary battery.

In some embodiments of the present application, said first additive is present in an amount of W1% by weight, with W1 being 0.01 to 20, optionally 0.1 to 10, more optionally 0.5 to 5, based on the total weight of said non-aqueous electrolytic solution. As a result, lithium ion conductivity of the lithium manganese phosphate positive electrode active material after being encompassed by pyrophosphate can be improved without significantly increasing interfacial impedance of the positive and negative electrode, and thus the secondary battery can have a high capacity exertion and good rate performance, cycle performance and storage performance.

In some embodiments of the present application, said first cladding layer is applied in an amount of C1% by weigh, with C1 being greater than 0 wt % and less than or equal to 6 wt %, optionally greater than 0 wt % and less than or equal to 5.5 wt %, more optionally greater than 0 wt % and less than or equal to 2 wt %, based on the weight of said core.

In some embodiments of the present application, said second cladding layer is applied in an amount of C2% by weight, with C2 being greater than 0 wt % and less than or equal to 6 wt %, optionally greater than 0 wt % and less than or equal to 5.5 wt %, more optionally from 2 wt % to 4 wt %, based on the weight of said core.

In some embodiments of the present application, said third cladding layer is applied in an amount of C3% by weigh, with C3 being greater than 0 wt % and less than or equal to 6 wt %, optionally greater than 0 wt % and less than or equal to 5.5 wt %, more optionally greater than 0 wt % and less than or equal to 2 wt %, based on the weight of said core.

The above three cladding layers have the applied amount preferably within the above range, it is allowed to sufficiently cladding the core and at the same time further improving dynamic performance, cycle performance, storage performance and safety performance of secondary batteries without sacrificing specific capacity of the positive electrode active material.

In some embodiments of the present application, W1/(C1+C2+C3) is 0.001 to 2, optionally 0.01 to 1, and more optionally 0.05 to 1. As a result, the secondary battery is able to have a high capacity exertion and a good rate performance, cycle performance, and storage performance.

In some embodiments of the present application, the non-aqueous electrolytic solution further includes a second additive, and the second additive comprises one or more of a cyclic carbonate compound containing unsaturated bonds, a halogenated cyclic carbonate compound, a nitrile compound, a phosphonitrile compound, an aromatic hydrocarbon and halogenated aromatic hydrocarbon compound, an anhydride compound, a phosphite ester compound, a phosphate ester compound, a borate ester compound, a sulfite ester compound, a methylene disulfonate compound, and an isocyanate compound. When the non-aqueous electrolytic solution comprises both the first additive and the second additive, the second additive helps to form a more dense and stable interfacial film on the surface of the positive electrode and/or the negative electrode active material, so as to further improve at least one of cycle performance, storage performance, rate performance, and safety performance of the secondary battery.

In some embodiments of the present application, the first cladding layer has a thickness of from 1 nm to 10 nm. As a result, it is allowed to avoid an unfavorable effect on the dynamic performance of the active material that may arise when the first cladding layer is too thick, and it is possible to avoid a problem that the first cladding layer may not be able to effectively hinder migration of transition metal ions when the first cladding layer is too thin.

In some embodiments of the present application, the second cladding layer has a thickness of from 2 nm to 15 nm. As a result, the second cladding layer has a stable surface structure, and side reactions with a electrolytic solution is less, so that interface side reactions can be effectively reduced, thereby improving high-temperature cycle performance and high-temperature storage performance of secondary batteries.

In some embodiments of the present application, the third cladding layer has a thickness of from 2 nm to 25 nm. As a result, it is allowed to improve an electrical conductivity of the positive electrode active material and to improve compaction density of the positive electrode plate prepared using the positive electrode active material.

In some embodiments of the present application, in said core, a ratio of y to 1−y is from 1:10 to 1:1, optionally from 1:4 to 1:1. As a result, it is allowed to further improve cycle performance and rate performance of the secondary battery.

In some embodiments of the present application, in said core, a ratio of z to 1−z is from 1:9 to 1:999, optionally from 1:499 to 1:249. As a result, it is allowed to further improve cycle performance and rate performance of the secondary battery.

In some embodiments of the present application, said first cladding layer contains crystalline pyrophosphate salts having a crystal plane spacing of 0.293 nm to 0.470 nm, and a crystal orientation (111) angle of 18.00° to 32.00°.

In some embodiments of the present application, said second cladding layer contains crystalline phosphate salts having a crystal plane spacing of 0.244 nm to 0.425 nm, and a crystal orientation (111) angle of from 20.000 to 37.00°.

The above crystalline pyrophosphate salts and crystalline phosphate salts having the above crystal plane spacing and crystal orientation angle can effectively inhibit lattice change rate and leaching out of manganese ions during the de-inercalation and intercalation of lithium, thereby improving high-temperature cycle performance and high-temperature storage performance of the secondary battery.

In some embodiments of the present application, the carbon of the third cladding layer is a mixture of SP2 carbon and SP3 carbon, optionally, a molar ratio of the SP2 carbon to SP3 carbon is any value in the range of 0.1 to 10, optionally any value in the range of 2.0 to 3.0. In the present application, a comprehensive performance of the secondary battery is improved by defining the molar ratio of SP2 carbon to SP3 carbon as to be within the above range.

In some embodiments of the present application, manganese is present in a content in the range of from 10 wt % to 35 wt %, optionally in the range of from 15 wt % to 30 wt %, and more optionally in the range of from 17 wt % to 20 wt %, based on the weight of the positive electrode active material. Thus, it is possible to effectively avoid problems such as poor structural stability of the positive electrode active material and density decline that may be caused if the content of manganese element is too large, so as to improve performances of the secondary battery in terms of cycle, storage, and compaction density, and the like. In addition, it is also possible to avoid problems such as low voltage plateau that may be caused if the content of manganese element is too small, so as to improve energy density of the secondary battery.

In some embodiments of the present application, phosphorus is present in a content in the range of from 12 wt % to 25 wt %, optionally in the range of from 15 wt % to 20 wt %, based on the weight of the positive electrode active material. Thus, the following can be effectively avoided: if the content of the elemental phosphorus is too high, it may cause covalency of P—O to be too strong and affect conductivity of small polarons, thereby affecting electrical conductivity of the positive electrode active material; if the content of the elemental phosphorus is too small, it is possible to enable lattice structure of the pyrophosphate salts in the core and in the first cladding layer, and/or the phosphate salts in the second cladding layer to be less stable, thereby affecting overall stability of the positive electrode active material.

In some embodiments of the present application, a weight ratio of manganese to phosphorus is in the range of 0.90 to 1.25, optionally in the range of 0.95 to 1.20, based on the weight of the positive electrode active material. Thus, the following can be effectively avoided: if the weight ratio is too large, it is possible to lead to an increase in leaching out of manganese ions, and to affect stability of the positive electrode active material and cycle performance and storage performance of the secondary battery; if the weight ratio is too small, it is possible to cause a decrease in a discharge voltage plateau, thereby resulting in a decrease in energy density of the secondary battery.

In some embodiments of the present application, the positive electrode active material has a lattice change rate of 4% or less, optionally 3.8% or less, more optionally from 2.0% to 3.8% before and after complete de-intercalation and intercalation of lithium. As a result, the positive electrode active material can improve capacity exertion and rate performance of the secondary battery.

In some embodiments of the present application, the positive electrode active material has a Li/Mn anti-site defect concentration of 4% or less, optionally 2.2% or less, more optionally from 1.5% to 2.2%. By having the Li/Mn anti-site defect concentration within the above range, it is possible to avoid the result of $Mn^{2+}$ hindering $Li^+$ transport, and at the same time enhance capacity exertion and rate performance of the positive electrode active material.

In some embodiments of the present application, the positive electrode active material has a compaction density of 2.2 $g/cm^3$ or more, optionally 2.2 $g/cm^3$ or more and 2.8 $g/cm^3$ or less, at 3 T. Thus, it is beneficial to improving volumetric energy density of the secondary battery.

In some embodiments of the present application, the positive electrode active material has a surface oxygen valence of −1.82 or less, optionally −1.89 to −1.98. Thereby, by limiting the surface oxygen valence of the positive electrode active material to the above range as described above, it is possible to alleviate interfacial side reactions of the positive electrode active material and an electrolytic solution, thereby improving cycle performance and high-temperature storage performance and the like of the secondary battery.

In some embodiments of the present application, the positive electrode active material has a specific surface area of B in $m^2/g$, with B being in the range of 7 to 18, optionally 10 to 15. As a result, it is allowed to ensure that the positive electrode plate has a high lithium ion conductivity, while the secondary battery has good rate performance, cycle performance and storage performance.

A second aspect of the present application provides a battery module, comprising the secondary battery according to the first aspect of the present application.

A third aspect of the present application provides a battery pack, comprising the battery module according to the second aspect of the present application.

A fourth aspect of the present application provides an electrical device comprising at least one of the secondary battery of the first aspect of the present application, the battery module of the second aspect of the present application or the battery pack of the third aspect of the present application.

The battery module, battery pack and electrical device include the secondary battery of the present application, and thus have at least the same advantages as said secondary battery.

DESCRIPTION OF THE DRAWINGS

In order to explain the technical solutions of the embodiments of the present application more clearly, the following will briefly introduce the drawings that need to be used in the embodiments of the present application. Apparently, the drawings described below are only some embodiments of the present application. A person skilled in the art can obtain other drawings based on the accompanying drawings without creative work.

Figure 1:
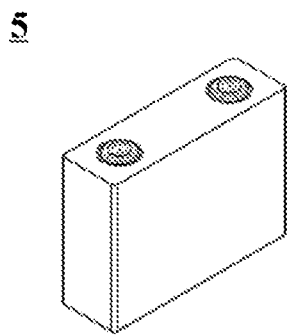
FIG. 1 is a schematic diagram of a secondary battery according to an embodiment of the present application.

In the drawings, the accompanying drawings are not necessarily drawn to an actual scale. Among them, the reference sings in the accompanying drawings are illustrated as follows: 1—battery pack, 2—upper case, 3—lower case, 4—battery module, 5—secondary battery, 51—housing, 52—electrode assembly, and 53—cover plate.

DETAILED DESCRIPTION

Hereinafter, embodiments of the secondary battery and the battery module, the battery pack and the electrical device containing the same will be described in detail with reference to the accompanying drawings as appropriate. However, unnecessary detailed descriptions may be omitted in some cases, for example the detailed description of a well-known item or the repetitive description of an actually identical structure, so as to prevent the following description from becoming unnecessarily redundant and to facilitate understanding by those skilled in the art. In addition, the drawings and the following description are provided for those skilled in the art to fully understand the present application, and are not intended to limit the subject matter described in the claims.

The "range(s)" disclosed in this application is/are defined in the form of lower and upper limits, and a given range is defined by selection of a lower limit and an upper limit that define boundary of the particular range. Ranges defined in this manner may or may not be inclusive of the endpoints, and may be arbitrarily combined. That is, any lower limit may be combined with any upper limit to form a range. For example, if the ranges of 60-120 and 80-110 are listed for a particular parameter, it is to be understood that the ranges of 60-110 and 80-120 are also contemplated. Additionally, if the minimum range values 1 and 2 are listed, and the maximum range values 3, 4, and 5 are listed, the following ranges are all expected: 1-3, 1-4, 1-5, 2-3, 2-4 and 2-5. In the present application, unless stated otherwise, the numerical range "a-b" represents an abbreviated representation of any combination of real numbers between a and b, where both a and b are real numbers. For example, the numerical range "0-5" means that all real numbers between "0-5" have been listed herein, and the range "0-5" is just an abbreviated representation of the combination of these numerical values. In addition, when a parameter is expressed as an integer greater than or equal to 2, it is equivalent to disclose that the parameter is, for example, an integer of 2, 3, 4, 5, 6, 7, 8, 9, 10, 11, 12, and the like.

Unless stated otherwise, all the embodiments and the optional embodiments of the present application can be combined with each other to form a new technical solution, and such technical solution should be considered to be included in the disclosure of the present application.

Unless stated otherwise, all technical features and optional technical features of the present application can be combined with each other to form a new technical solution, and such technical solution should be considered to be included in the disclosure of the present application.

Unless stated otherwise, all steps of the present application can be carried out sequentially, and also can be carried out randomly, preferably they are carried out sequentially. For example, the method includes steps (a) and (b), indicating that the method may include steps (a) and (b) performed in sequence, or that the method may include steps (b) and (a) performed in sequence. For example, reference to the method further comprising step (c) indicates that step (c) may be added to the method in any order. As an example, the method may comprises steps (a), (b) and (c), steps (a), (c) and (b), or steps (c), (a) and (b), and the like.

Unless stated otherwise, the transition phases "comprise", "comprising", "contain" and "containing" mentioned in the present application mean that it is drafted in an open mode, or it may also mean a close mode. For example, the transition phases "comprise", "comprising", "contain" and "containing" may mean that other components not listed may also be included or contained, or only the listed components may be included or contained.

In the present application herein, unless otherwise stated, the term "or" is inclusive. For example, the phrase "A or B"

means "A, B, or both A and B". More specifically, any of the following conditions meets "A or B": A is true (or present) and B is false (or absent); A is false (or absent) and B is true (or present); or both A and B are true (or present).

It shall note that as used herein, the term "cladding layer" refers to a layer of material covering a lithium manganese phosphate core, and said layer of material may completely or partially cover the core. Use of the term "cladding layer" is used only for convenience of description and is not intended to limit the present invention. Alternatively, each cladding layer may completely or partially cover the underlying layer. Similarly, the term "thickness of the cladding layer" refers to a thickness of said material layer that is covered on a lithium manganese phosphate core in a radial direction of the lithium manganese phosphate core.

As used herein, the term "median particle size Dv50" is a particle size at which a cumulative volume distribution percentage of a material reaches to 50%. In the present application, the median particle size Dv50 of a material may be determined using a laser diffraction particle size analysis. For example, with reference to standard GB/T 19077-2016, it is determined using a laser particle size analyzer (e.g., Malvern Master Size 3000).

As used herein, an "approximate" value indicates a range of that the specified value±10%.

As used herein, the terms "a plurality of", and "more" mean two or more.

As used herein, the term "alkyl" refers to a saturated hydrocarbon group, including both straight chain and branched chain structures. Examples of alkyl include, without being limited to, methyl, ethyl, propyl (e.g., n-propyl, isopropyl), butyl (e.g., n-butyl, iso-butyl, sec-butyl, tert-butyl), and pentyl (e.g., n-pentyl, iso-pentyl, neopentyl). In various embodiments, C1-C6 alkyl group is an alkyl group containing from 1 to 6 carbon atoms.

As used herein, the term "haloalkyl" refers to a group obtained by substituting at least one hydrogen atom in an alkyl group with a halogen atom. The number of halogen atoms in the haloalkyl may be one or more. When more than one halogen atoms are present in the haloalkyl, these halogen atoms may be the same or different.

As used herein, the term "alkoxy" refers to an alkyl group containing an oxygen atom (—O—). Examples of alkoxy include, without being limited to, methoxy, ethoxy, or propoxy. In various embodiments, C1-C6 alkoxy is an alkoxy containing 1 to 6 carbon atoms.

As used herein, the term "haloalkoxy" refers to a group obtained by substituting at least one hydrogen atom in an alkoxy group with a halogen atom. The number of halogen atoms in the haloalkoxy may be one or more. When more than one halogen atoms are present in the haloalkoxy, the halogen atoms may be the same or different.

As used herein, a group with the suffix "ene" indicates that the group is an organic divalent functional group. That is, it indicates the group remaining after an organic compound corresponding to the group lose two hydrogen atoms.

As used herein, the term "oxa-alkylene" represents a group obtained by replacement of at least one carbon atom in an alkylene group by an oxygen atom. The number of oxygen atoms in an oxa-alkylene group may be one or more. Examples of oxa-alkylene include, without being limited to, 2-oxa-1,3-propylene (—CH$_2$—O—CH$_2$—), 2-oxa-1,4-butylene (—CH$_2$—O—CH$_2$CH$_2$—), and 3-oxa-1,5-pentylene (—CH$_2$CH$_2$—O—CH$_2$CH$_2$—). In various embodiments, C1-C6 oxa-alkylene is an oxa-alkylene containing from 1 to 6 carbon atoms.

For purposes herein, a halogen atom are a fluorine atom, a chlorine atom, a bromine atom, and an iodine atom. Optionally, the halogen atom is a fluorine atom.

As used herein, substituents of compounds are disclosed as groups or ranges. It is explicitly expected that such a description includes each individual subcombination of members of these groups and ranges. For example, the term "C1-C6 alkyl group" is explicitly expected to disclose C1, C2, C3, C4, C5, C6, C1-C6, C1-C5, C1-C4, C1-C3, C1-C2, C2-C6, C2-C5, C2-C4, C1-C3, C1-C2, C3-C6, C3-C5, C3-C4, C4-C6, C4-C5, C5-C6, alkyl groups.

The inventors of the present application found in an actual operation that leaching out of manganese ions is serious during deep charging and discharging of a currently existing lithium manganese phosphate positive electrode active material. Although the prior art have attempted to clad the lithium manganese phosphate with lithium iron phosphate to reduce interfacial side reactions, such a cladding cannot prevent the leached-out manganese ions from further migrating into a non-aqueous electrolytic solution. The leached-out manganese ions are reduced to metal manganese after migration to a negative electrode. The as-produced metal manganese is equivalent to a "catalyst", which can catalyze decomposition of SEI (solid electrolyte interphase) film on the surface of the negative electrode to produce a by-product. One part of the by-product is gas, which is prone to cause the secondary battery to expand and affect safety performance of the secondary battery, and the other part of the by-product is deposited on the surface of the negative electrode, and blocks channel of lithium ions in and out of the negative electrode, resulting in an increased impedance of the battery and negatively affecting dynamic performance of the battery. In addition, in order to supplement the decomposed SEI film, the non-aqueous electrolytic solution and active lithium ions in the battery are continuously consumed, which has an irreversible impact on capacity retention rate of the battery.

The inventor, after thorough consideration on a positive electrode and a non-aqueous electrolytic solution, has designed a secondary battery capable of simultaneously combining a high energy density with good rate performance, cycle performance, storage performance and safety performance.

Specifically, a first aspect of the present application provides a secondary battery.

Secondary Battery

A secondary battery, also known as a rechargeable battery or accumulator, is a battery that can continue to be used by activating its active material by means of charging after the battery has been discharged. Typically, a secondary battery includes an electrode assembly and a non-aqueous electrolytic solution, and the electrode assembly includes a positive electrode plate, a negative electrode plate, and a separator. The separator is disposed between the positive electrode plate and the negative electrode plate, which mainly functions to prevent short circuit of the positive and negative electrodes while allowing lithium ions to pass through. The non-aqueous electrolytic solution functions as conducting active ions between the positive electrode plate and the negative electrode plate.

[Positive Electrode Plate]

The secondary battery of the present application adopts a positive electrode plate comprising a positive electrode active material with a core-shell structure wherein said positive electrode active material comprises a core and a shell cladding said core.

The core has a chemical formula of $Li_{1+x}Mn_{1-y}A_yP_{1-z}R_zO_4$, wherein x is any value in the range of −0.100 to 0.100, y is any value in the range of 0.001 to 0.500, z is any value in the range of 0.001 to 0.100, A is one or more elements selected from Zn, Al, Na, K, Mg, Mo, W, Ti, V, Zr, Fe, Ni, Co, Ga, Sn, Sb, Nb, and Ge, optionally one or more elements selected from Fe, Ti, V, Ni, Co and Mg, said R comprises one or more elements selected from B, Si, N and S, optionally one element selected from B, Si, N and S; said x, y and z have a value satisfying such a condition that the core is electrically neutral throughout.

The shell comprises a first cladding layer covering the core, a second cladding layer covering the first cladding layer and a third cladding layer covering the second cladding layer. The first cladding layer comprises crystalline pyrophosphate salts $Li_aMP_2O_7$ and/or $M(P_2O_7)_c$, $0 \le a \le 2$, $1 \le b \le 4$, $1 \le c \le 6$, wherein a, b, and c have an value satisfying such a condition that the crystalline pyrophosphate salts $Li_aMP_2O_7$ or $Mb(P_2O_7)_c$ are electrically neutral; and each M in the crystalline pyrophosphate salts $Li_aMP_2O_7$ and/or $Mb(P_2O_7)_c$ is independently one or more elements selected from Fe, Ni, Mg, Co, Cu, Zn, Ti, Ag, Zr, Nb, and Al. The second cladding layer comprises crystalline phosphate salts $XPO_4$, X being one or more elements selected from Li, Fe, Ni, Mg, Co, Cu, Zn, Ti, Ag, Zr, Nb and Al. The third cladding layer is carbon, Unless otherwise stated, in the above chemical formula, when A represents more than two elements, the above range for the y value is not only for the stoichiometric number of each element as A, but also for the sum of the stoichiometric numbers of each element as A. For example, when A represents more than two elements A1, A2 ... and An, each of the respective stoichiometric numbers y1, y2 ... and yn of respective A1, A2 ... and An must fall within the numerical range defined by the present application for y, and the sum of y1, y2 ... and yn must also fall within such numerical range of the present application. Similarly, in the case where R is more than two elements, the limitations on numerical ranges for the stoichiometric numbers of R in the present application also have the above meaning.

In an optional embodiment, when A is one, two, three, or four elements selected from Zn, Al, Na, K, Mg, Mo, W, Ti, V, Zr, Fe, Ni, Co, Ga, Sn, Sb, Nb, and Ge, $A_y$ is $Q_{n1}D_{n2}E_{n3}K_{n4}$, with $n1+n2+n3+n4=y$ and n1, n2, n3, and n4 being a positive number and not simultaneously 0, and Q, D, E, and K are each independently one selected from Zn, Al, Na, K, Mg, Mo, W, Ti, V, Zr, Fe, Ni, Co, Ga, Sn, Sb, Nb, and Ge, optionally at least one of Q, D, E, and K is Fe. Optionally, one of n1, n2, n3, and n4 is zero, and the rest are not zero; and more optionally, two of n1, n2, n3 and n4 are zero and the rest are not zero; more optionally, three of n1, n2, n3 and n4 are zero and the rest are not zero. In the core of $Li_{1+x}Mn_{1-y}A_yP_{1-z}R_zO_4$, it is advantageous to dope one, two, three or four of the A elements at the manganese site, and optionally, to dope one, two or three of the A elements; furthermore, it is advantageous to dope one or two of the R elements at the phosphorus site, which facilitates a uniform distribution of dopant elements.

In the core of $Li_{1+x}Mn_{1-y}A_yP_{1-z}R_zO_4$, the magnitude of x is affected by the size of valence states of A and R, and the magnitude of y and z, to ensure that the whole system exhibits electroneutrality. If the value of x is too small, it will lead to a lower lithium content in the whole core system, affecting capacity exertion of the positive electrode active material. The value of y will limit the total amount of all the dopant elements, and if y is too small, i.e., the amount of doping is too small, the dopant elements cannot work, and if y is more than 0.5, it will lead to a lower content of Mn in the system, affecting voltage plateau of the material. The R element is doped at the position of P since the P—O tetrahedron is relatively stable, and if the value of z is too large, the stability of the material will be affected, thus the value of z is limited to 0.001 to 0.100.

The inventors, after extensive study, found that by modifying lithium manganese phosphate with doping and cladding lithium manganese phosphate with multiple cladding layers, it is allowed to obtain a novel positive electrode active material with a core-shell structure and the positive electrode active material is capable of achieving reduced leaching out of manganese ions and reduced lattice change rate, thereby improving rate performances, cycle performances, storage performances and safety performances of secondary batteries while increasing capacity exertion of secondary batteries.

Although the mechanism is not clear, it is presumed that by doping a lithium manganese phosphate core with element A and element R at the manganese and phosphorus sites, respectively, not only is it possible to effectively reduce leaching out of manganese ions, and thus reduce manganese ions migrating to the negative electrode, and reduce consumption of an electrolytic solution caused by decomposition of a SEI membrane, thereby improving cycle performance and safety performance of secondary batteries, but also it is possible to promote adjustment of Mn—O bond, to lower migration barrier of lithium ions, and to promote migration of lithium ions, thereby improving rate performance of secondary batteries; and that by cladding the core with a first cladding layer comprising crystalline pyrophosphate salts, it is allowed to further increase migration resistance of manganese ions, to reduce leaching out of manganese ions, and to reduce the content of surface heterolithium and the contact between the core and an electrolytic solution, thus reducing interfacial side reactions, reducing gas production, and improving high-temperature storage performance, cycle performance and safety performance of secondary batteries; by further cladding with a crystalline phosphate cladding layer with an excellent lithium ion conductivity, it is allowed to effectively reduce interfacial side reactions between the positive electrode active material and an electrolytic solution, and to in turn improve high-temperature cycle and storage performances of secondary batteries; and by further cladding with a carbon layer as a third cladding layer, it is allowed to further improve safety performance and dynamic performance of secondary batteries.

In addition, in the core, the dopant element A doped at a manganese site of the lithium manganese phosphate also helps to reduce lattice change rate of lithium manganese phosphate in the process of de-intercalation and intercalation of lithium in this material, and improve structural stability of the lithium manganese phosphate positive electrode active material, thereby greatly reducing leaching out of manganese ions and reduce oxygen activity on the surface of the particles; and the dopant element R doped at a phosphorus site also helps to change the difficulty of the Mn—O bond length change, thereby improving electronic conductivity and reducing migration barrier of lithium ions, promoting migration of lithium ions, and improving rate performance of secondary batteries.

In addition, the entire core system remains electrically neutral, which ensures that there are as few defects and heterogeneous phases in the positive electrode active material as possible. If there is an excessive amount of transition metal (e.g., manganese) in the positive electrode active material, the excess transition metal is likely to precipitate in the form of elemental substance or form a heterogeneous phase inside a crystal lattice of the material since the material system itself has a relatively stable structure, remaining electrically neutral enables such heterogeneous phases as small as possible. Additionally, the system remaining electrically neutral can also lead to creation of lithium vacancies in the positive electrode active material in some cases, which can lead to better dynamic performance of the positive electrode active material.

The core prepared in the present application has an average particle size ranging from 50 nm to 500 nm, and a medium particle size Dv50 ranging from 200 nm to 300 nm. The core has a primary particle size ranging from 50 nm to 500 nm, and has a medium particle size Dv50 ranging from 200 nm to 300 nm. If the average particle size of the core is too large (more than 500 nm), capacity exertion of the secondary batteries using the material will be affected; if the average particle size of the core is too small, the core has a large specific surface area and is prone to agglomeration, making it difficult to be uniform coated.

Through a process management (e.g., sufficient mixing and grinding of materials as various sources), it is possible to ensure that elements are uniformly distributed in a crystal lattice without agglomeration. Lithium manganese phosphate doped with element A and element R has a X-ray diffraction (XRD) pattern whose primary characteristic peaks have positions consistent with those of un-doped $LiMnPO_4$, indicating that no impurity phases are introduced in the doping process, and thus improvement of performances of the core is mainly from element doping rather than impurity phase. After preparing the positive electrode active material according to the present application, the inventors cut a middle region (an inner core region) of the prepared positive electrode active material particles by a focused ion beam (referred to as FIB), and tested it by a transmission electron microscope (referred to as TEM) as well as an X-ray energy spectrum analysis (referred to as EDS), and found that distribution of various elements was uniform, and that no aggregation occurs.

In the present application, "crystalline" means having a degree of crystallinity of 50% or more, i.e., 50% to 100%. A crystallinity of less than 50% is referred to as the glassy (or amorphous) state. The crystalline pyrophosphate salts and crystalline phosphate salts described in the present application have a crystallinity of 50% to 100%. Pyrophosphate salts and phosphate salts with a certain degree of crystallinity are not only conducive to exerting the function of the pyrophosphate cladding layer in hindering leaching out of manganese ions and the excellent lithium ions conductivity of the phosphate cladding layer, and to reducing interfacial side reactions, but also enable the pyrophosphate cladding layer and the phosphate cladding layer to lattice match well, thereby achieving a closer bonding of the cladding layers.

In the present application, the crystallinity of crystalline pyrophosphate salts as materials for the first cladding layer and crystalline phosphate salts as material for the second cladding layer of the positive electrode active material can be tested by conventional technical means in the field, for example, by density method, infrared spectroscopy, differential scanning calorimetry, and nuclear magnetic resonance absorption method, and can also be tested, for example, by X-ray diffraction method.

A specific method for testing the crystallinity of crystalline pyrophosphate salts as materials for the first cladding layer and crystalline phosphate salts as materials for the second cladding layer of the positive electrode active material by an X-ray diffraction method may comprise the steps of taking a certain amount of the positive electrode active material powder and measuring a total scattering intensity by X-rays, which is the sum of scattering intensities of substances in the entire space, and is only related to intensity of primary rays, a chemical structure of the positive electrode active material powder, and the total number (i.e., mass) of electrons participating in diffraction, and not with an ordinal state of the sample; and then separating a crystalline scattering from an amorphous scattering in the diffraction pattern, to determine a degree of crystallinity, i.e., a ratio of scattering of the crystalline portion to the total scattering intensity.

It should be noted that in the present application, crystallinity of the pyrophosphate salts and phosphate salts in the cladding layer can be adjusted, for example, by adjusting process conditions of a sintering process such as temperature, period and the like for the sintering.

In the present application, since metal ions are difficult to migrate in pyrophosphate salts, the pyrophosphate salts as a first cladding layer can effectively isolate doping metal ions from a non-aqueous electrolytic solution. Crystalline pyrophosphate salts have a stable structure, thus a cladding layer of the crystalline pyrophosphate salts can effectively inhibit leaching out of transition metal ions and improve cycle performance of secondary batteries.

The bonding between the first cladding layer and the core is similar to a heterojunction, the firmness of which is limited by a lattice matching degree. When a lattice mismatching degree is below 5%, better lattice matching occurs, and the two materials are easy to bind tightly. The tight bonding can ensure that a cladding layer will not fall off in the subsequent cycle process, which is conducive to enabling the positive electrode active material to have a long-term stability. The bonding between the first cladding layer and the core is measured mainly by calculating a lattice mismatching degree between the core and the respective lattice constant in the cladding layer. In the present application, by doping the core with elements A and R, the core has an improved matching degree with the first cladding layer and the core can bind the pyrophosphate salts cladding layer more tightly, as compared to an un-doped core.

The crystalline phosphate salts are chosen as a second cladding layer for the following reasons. Firstly, it has a higher lattice matching degree with the crystalline pyrophosphate salts in the first cladding layer, with only 3% of the lattice mismatching degree between them. Secondly, the phosphate salts per se have a better stability than the pyrophosphate salts, and cladding the pyrophosphate salts with it is conducive to improvement of stability of the positive electrode active material. The structure of crystalline phosphate salts is very stable, and thus they have excellent conductivity of lithium ions, so the use of crystalline phosphate salts for covering can effectively reduce interfacial side reactions between the positive electrode active material and a non-aqueous electrolytic solution, thus improving high-temperature cycle performance and high-temperature storage performance of secondary batteries. The lattice matching degree between the second cladding layer and the first cladding layer, among other things, is similar to the lattice matching degree between of the first cladding layer and the core as described above, and when a lattice mismatching degree is less than 5%, better lattice matching occurs, and the two materials are easy to be bonded tightly.

The main reason for carbon as a third cladding layer is that the carbon layer has a better electronic conductivity.

Since electrochemical reactions occur when applied in secondary batteries, requiring participation of electrons, carbon with excellent electrical conductivity can be used to cover the positive electrode active material in order to increase electron transfer between particles and at different locations on particles. Cladding with carbon can effectively improve electrical conductivity and desolventization of the positive electrode active material.

In some embodiments, primary particles of the positive electrode active material have an average particle size in the range of 50 nm to 500 nm, with a volume median particle size Dv50 in the range of 200 nm to 300 nm. Since the particles will agglomerate, the actual measured size of the secondary particles after agglomeration may be from 500 nm to 40,000 nm. The size of particles of the positive electrode active material affects processing of the material and compaction density of the electrode plate. By selecting the average particle size of primary particles to be within the above range, it is thereby possible to effectively avoid the following: if the average particle size of primary particles of the positive electrode active material is too small, it is possible to cause agglomeration of particles and make the particles difficult to be dispersed, and thus a higher amount of binder is required, resulting in a worse brittleness of the electrode plate; if the average particle size of primary particles of the positive electrode active material is too large, it is possible to result in larger gaps among particles and a lower compaction density.

By the above-described scheme, it is allowed to effectively suppress lattice change rate of lithium manganese phosphate and leaching out of manganese ions in the process of de-intercalation and intercalation of lithium, thereby enhancing high-temperature cycle performance and high-temperature storage performance of secondary batteries.

In some embodiments, the crystalline pyrophosphate salts in the first cladding layer have a crystal plane spacing ranging from 0.293 nm to 0.470 nm, and a crystal orientation (111) angle of 18.00° to 32.00°; the crystalline phosphate salts in the second cladding layer have a crystal plane spacing ranging from 0.244 nm to 0.425 nm, and a crystal orientation (111) angle of 20.00° to 37.00°.

Both the first cladding layer and the second cladding layer in the positive electrode active material described in the present application contain crystalline substances. The crystalline pyrophosphate salts and crystalline phosphate salts in a cladding layer can be characterized by means of techniques that are conventional in the art, alternatively can be characterized for example, with the aid of transmission electron microscopy (TEM). With TEM, the core and the cladding layers can be distinguished by testing a crystal plane spacing.

The specific test method for the crystal plane spacing and crystal orientation angle of crystalline pyrophosphate salts and crystalline phosphate salts in cladding layers may include the following steps. A certain amount of the positive electrode active material powder with cladding layers was placed in a test tube, to which a solvent, such as alcohol is injected, and then it was subjected to sufficient stirring and dispersion. And then an appropriate amount of the above solution is dropped on a 300-mesh copper mesh with a clean disposable plastic pipette. At this time, some of the powder would be left on the copper mesh, and then the copper mesh with samples would be transferred to a TEM sample chamber for testing, thereby obtaining original images of TEM testing. The original TEM images are opened in a diffractometer software and subjected to Fourier transform to get a diffraction pattern, the distance from the diffracted spot to the center of diffraction pattern is measured to get a crystal plane spacing, and the orientation angle was calculated according to the Bragg's equation.

The crystal plane spacing of crystalline pyrophosphate salts is different from that of crystalline phosphate salts, and these two salts may be directly judged by the value of crystal plane spacing.

Crystalline pyrophosphate salts and crystalline phosphate salts having a crystal plane spacing and an orientation angle within the above range can more effectively inhibit lattice change rate of lithium manganese phosphate and leaching out of manganese ions in the process of de-intercalation and intercalation of lithium, thereby enhancing high-temperature cycle performance and high-temperature storage performance of secondary batteries.

In some embodiments, in the core, a ratio of y to (1−y) is from 1:10 to 1:1, optionally from 1:4 to 1:1. Herein y denotes the sum of stoichiometric numbers of the Mn-site doping element A. The energy density and cycle performance of secondary batteries using the positive electrode active material may be further improved when the above condition is met.

In some embodiments, in the core, the ratio of z to (1−z) is from 1:9 to 1:999, optionally from 1:499 to 1:249. Herein z denotes the sum of stoichiometric numbers of the P-site doping element R. The energy density and cycle performance of secondary batteries using the positive electrode active material may be further improved when the above conditions are met.

In some embodiments, the carbon of the third cladding layer is a mixture of SP2 carbon and SP3 carbon; optionally, a molar ratio of the SP2 carbon to the SP3 carbon is any value in the range of 0.1 to 10, optionally any value in the range of 2.0 to 3.0.

In some embodiments, a molar ratio of the SP2 carbon to the SP3 carbon may be about 0.1, about 0.2, about 03, about 0.4, about 0.5, about 0.6, about 0.7, about 0.8, about 0.9, about 1, about 2, about 3, about 4, about 5, about 6, about 7, about 8, about 9, or about 10, or any value within any of the foregoing ranges.

By selecting morphology of the carbon in the carbon cladding layer, it is allowed to enhance an overall electrochemical performance of secondary batteries. Specifically, by using a mixed SP2 and SP3 morphology of carbon and limiting a ratio of the SP2 carbon to the SP3 carbon to a certain range, the following can be effectively avoided: if all of the carbon in the cladding layer is in the morphology of amorphous SP3, its electrical conductivity is poor, and if all of the carbon in the cladding layer is in the morphology of graphitized SP2, it is conducive to intercalation and de-intercalation of lithium ions since it has few lithium-ion pathways although its electrical conductivity is good. In addition, limiting a molar ratio of the SP2 carbon to the SP3 carbon to the above range achieves good electrical conductivity and ensures the lithium ion pathway, and is therefore conducive to improving the dynamic performance and cycle performance of secondary batteries.

The mixing ratio of the SP2 form and the SP3 form of carbon for the third cladding layer can be controlled by sintering conditions such as sintering temperature and sintering time. For example, in the case where sucrose is used as a carbon source to prepare a third cladding layer, the sucrose is decomposed at a high temperature and then deposited on a second cladding layer meanwhile a carbon cladding layer with both the SP3 form and the SP2 form is produced under the action of high temperature. The ratio of the SP2 carbon to the SP3 carbon may be regulated by selecting the high temperature decomposition conditions and the sintering conditions.

The structure and characterization of carbon in the third cladding layer can be determined by Raman (Raman) spectroscopy. The particular measurement comprises the following steps of splitting energy spectrum from the Raman test to obtain $I_d/I_g$ in which $I_d$ is a peak intensity of the carbon in the SP3 form and $I_g$ is a peak intensity of the carbon in the SP2 form and then determining a molar ratio of the SP2 carbon to the SP3 carbon.

In some embodiments, the first cladding layer is applied in an amount of C1% by weight, with C1 being greater than 0 and less than or equal to 6 wt %, optionally greater than 0 and less than or equal to 5.5 wt %, more optionally greater than 0 and less than or equal to 2 wt %, based on the weight of the core.

In some embodiments, the second cladding layer is applied in an amount of C2% by weight, with C2 being greater than 0 and less than or equal to 6 wt %, optionally greater than 0 and less than or equal to 5.5 wt %, and more optionally between 2 wt % and 4 wt %, based on the weight of the core.

In some embodiments, the third cladding layer is applied in an amount of C3% by weight, with C3 being greater than 0 and less than or equal to 6 wt %, optionally greater than 0 and less than or equal to 5.5 wt %, more optionally greater than 0 and less than or equal to 2 wt %, based on the weight of the core.

In the present application, each of the cladding layers is applied in an amount greater than zero.

In the positive electrode active material with a core-shell structure described in the present application, the applied amounts of the three cladding layers are preferably within the above ranges, whereby the core can be sufficiently coated and at the same time it is allowed to further improve the dynamic performance, cycle performance, storage performance and safety performance of secondary batteries without sacrificing specific capacity of the positive electrode active material.

For the first cladding layer, by controlling the applied amount within the above range, the following situations can be effectively avoided: if the applied amount is too small, the cladding layer has a relatively thin thickness, which may not be able to effectively impede migration of transition metals; if the applied amount is too large, the cladding layer is too thick, which may affect migration of Li$^+$, and thus affect rate performance of secondary batteries.

For the second cladding layer, by controlling the applied amount within the above range, the following situations can be effectively avoided: if the applied amount is too much, it is possible to affect an overall platform voltage of the positive electrode active material; if the applied amount is too little, it is impossible to realize a sufficient cladding effect.

For the third cladding layer, the cladding of carbon mainly serves to enhance electron transfer between particles. Nevertheless, since there is a large amount of amorphous carbon in the cladding structure, which carbon has a relatively low density, compaction density of the electrode plate containing the cladding layer may be affected if the applied amount is too large.

In some embodiments, the first cladding layer has a thickness of 1 nm to 10 nm.

In some embodiments, the second cladding layer has a thickness of 2 nm to 15 nm.

In some embodiments, the third cladding layer has a thickness of 2 nm to 25 nm.

In some embodiments, the thickness of the first cladding layer may be about 2 nm, about 3 nm, about 4 nm, about 5 nm, about 6 nm, about 7 nm, about 8 nm, about 9 nm, or about 10 nm, or in any range of any of the above values.

In some embodiments, the thickness of the second cladding layer may be about 2 nm, about 3 nm, about 4 nm, about 5 nm, about 6 nm, about 7 nm, about 8 nm, about 9 nm, about 10 nm, about 11 nm, about 12 nm, about 13 nm, about 14 nm, about 15 nm, or in any range of any of the above values.

In some embodiments, the thickness of the third cladding layer may be about 2 nm, about 3 nm, about 4 nm, about 5 nm, about 6 nm, about 7 nm, about 8 nm, about 9 nm, about 10 nm, about 11 nm, about 12 nm, about 13 nm, about 14 nm, about 15 nm, about 16 nm, about 17 nm, about 18 nm, about 19 nm, about 20 nm, about 21 nm, about 22 nm, about 23 nm, about 24 nm, or about 25 nm, or in any range of any of the above values.

When the thickness of the first cladding layer is within the range of 1 nm to 10 nm, it is possible to avoid an unfavorable effect on the dynamic performance of the positive electrode active material that may arise when it is too thick, and it is possible to avoid a problem that the cladding layer may not be able to efficiently hinder migration of transition metal ions when it is too thin.

When the thickness of the second cladding layer is within the range of 2 nm to 15 nm, the second cladding layer has a stable surface structure, and its side reactions with a non-aqueous electrolytic solution is less, and thus the interfacial side reactions can be effectively mitigated, thereby improving high-temperature cycle performance and high-temperature storage performance of secondary batteries.

When the thickness of the third cladding layer is within the range of 2 nm to 25 nm, electrical conductivity of the positive electrode active material can be improved and compaction density of a positive electrode plate prepared using the positive electrode active material can be improved.

The test for the thickness of these cladding layers is mainly carried out by FIB, and the specific method may comprise the following steps: randomly selecting an individual particle from the positive electrode active material powder to be tested, cutting a thin slice with a thickness of about 100 nm from the selected particle at its middle position or at a position close to its middle portion, and then carrying out a TEM test on the thin slice, from which the thickness of the respective cladding layers is measured at 3-5 positions, and the average value is taken.

In some embodiments, the content of manganese is in the range of 10 wt % to 35 wt %, optionally in the range of 15 wt % to 30 wt %, and more optionally in the range of 17 wt % to 20 wt %, based on the weight of the positive electrode active material.

In some embodiments, the content of phosphorus is in the range of 12 wt % to 25 wt %, optionally in the range of 15 wt % to 20 wt %, based on the weight of the positive electrode active material.

In some embodiments, a weight ratio of manganese to phosphorus is in the range of 0.90 to 1.25, optionally in the range of 0.95 to 1.20.

In the present application, where only the core of the positive electrode active material contains manganese, the content of the core may be determined by measuring the content of manganese.

In the present application, by limiting the content of manganese to be within the above range, it is possible to effectively avoid problems such as poor structural stability of the positive electrode active material and density decline that may be caused if the content of manganese element is too large, so as to improve performances of the secondary battery in terms of cycle, storage, and compaction density, and the like. In addition, it is also possible to avoid problems such as low voltage plateau that may be caused if the content of manganese element is too small, so as to improve energy density of the secondary battery.

In the present application, by defining the content of phosphorus as to be within the above range, the following can be effectively avoided: if the content of the elemental phosphorus is too high, it may cause covalency of P—O to be too strong and affect conductivity of small polarons, thereby affecting electrical conductivity of the positive electrode active material; if the content of the elemental phosphorus is too small, it is possible to enable lattice structure of the pyrophosphate salts in the core and in the first cladding layer, and/or the phosphate salts in the second cladding layer to be less stable, thereby affecting overall stability of the positive electrode active material.

The weight ratio of the manganese content to the phosphorus content has the following effects on performances of secondary batteries: if the weight ratio is too large, it means that there is too much manganese, and thus leaching out of manganese ions will increase, which affects stability and capacity exertion of the positive electrode active material, and in turn affects cycle performance and storage performance of secondary batteries; if the weight ratio is too small, it means that there is too much phosphorus, a heterogeneous phase is easy to be produced, enabling a discharge voltage plateau of the positive electrode active material to decrease, thus reducing energy density of secondary batteries.

The measurement of manganese and phosphorus element may be carried out by the conventional technical means in the art. In particular, the contents of manganese element and phosphorus element are measured using the following method: a material to be tested is dissolved in dilute hydrochloric acid (with a concentration of 10-30%), the content of each element in the solution is tested using ICP, and then the content of manganese element is measured and converted to obtain its weight percentage.

In some embodiments, the positive electrode active material with a core-shell structure has a lattice change rate of less than 4%, optionally less than 3.8%, and more optionally from 2.0% to 3.8% before and after complete deintercalation and intercalation of lithium.

A lithium intercalation-deintercalation process of $LiMnPO_4$ is a two-phase reaction. The interfacial stress between the two phases is determined by the lattice change rate before and after a lithium intercalation-deintercalation process, and the smaller the lattice change rate is, the smaller the interfacial stress is, and the easier the $Li^+$ transport is. Thus, reducing lattice change rate of the core will facilitate to enhance $Li^+$ transport, thereby improving rate performance of secondary batteries. The positive electrode active material having a core-shell structure described in the present application is capable of realizing a lattice change rate before and after a lithium deintercalation and intercalation process of less than 4%, and thus the positive electrode active material can be used to improve rate performance of secondary batteries. The lattice change rate can be measured by methods known in the art, such as X-ray diffraction (XRD) patterns.

In some embodiments, the positive electrode active material with a core-shell structure has a Li/Mn anti-site defect concentration of 4% or less, optionally 2.2% or less, more optionally 1.5% to 2.2%.

The Li/Mn anti-site defect as used in the present application refer to swapping of the $Li^+$ and $Mn^{2+}$ sites in a $LiMnPO_4$ lattice. The Li/Mn anti-site defect concentration refers to a percentage of $Li^+$ that is swapped with $Mn^{2+}$ relative to the total amount of $Li^+$. In the present application, the anti-site defect concentration can be determined, for example, according to JIS K 0131-1996.

The positive electrode active material with a core-shell structure described in the present application is capable of realizing a lower Li/Mn anti-site defect concentration described above. Although the mechanism is not yet well understood, the inventors of the present application speculate that since $Li^+$ is capable of swapping with $Mn^{2+}$ in the lattice of $LiMnPO_4$ and a transport channel for $Li^+$ is a one-dimensional channel, $Mn^{2+}$ is difficult to migrate in the $Li^+$ transport channel, and it in turn will hinder transport of $Li^+$. As a result, the positive electrode active material with a core-shell structure described in the present application is able to avoid $Mn^{2+}$ from hindering transport of $Li^+$ while improving its capacity exertion and rate performance because of having a lower Li/Mn anti-site defect concentration within the above range.

In some embodiments, said positive electrode active material with a core-shell structure has a compaction density of 2.2 g/cm$^3$ or more, optionally from 2.2 g/cm$^3$ or more and 2.8 g/cm$^3$ or less, at 3 tonnes (T). The higher the compaction density of the positive electrode active material, the higher the weight per unit volume of the active material is. As a result, increasing the compaction density will be more conducive to improving volumetric energy density of secondary batteries. The compaction density may, for example, be determined according to GB/T 24533-2009.

In some embodiments, said positive electrode active material with a core-shell structure has a surface oxygen valence of is −1.90 or less, optionally −1.90 to −1.98.

The stable valence of oxygen is originally −2, and the closer the valence state to −2, the stronger the ability to gain electrons is, i.e., the stronger the oxidizability is. In a usual case, the surface valence is below −1.7. By limiting the surface oxygen valence of the positive electrode active material to the above range as described above, it is possible to mitigate interfacial side reactions between the positive electrode active material and a non-aqueous electrolytic solution, thereby improving cycle performance and high-temperature storage performance of secondary batteries.

The surface oxygen valence state can be measured by methods known in the art, such as by electron energy loss spectroscopy (EELS).

In some embodiments, the positive electrode active material with a core-shell structure has a specific surface area of B in m$^2$/g, with B being in the range of 7 to 18, optionally in the range of 10 to 15.

If the specific surface area of the positive electrode active material is high, lithium ion conductivity of the positive electrode plate will be increased, which in turn can improve capacity exertion and rate performance of secondary batteries. However, the specific surface area of the positive electrode active material should not be too high, which may increase contact area between the positive electrode active material and a non-aqueous electrolytic solution, thereby increasing their interfacial side reactions and affecting cycle performance and storage performance of secondary batteries. By controlling the specific surface area of the positive electrode active material in a suitable range, it can ensure that the positive electrode plate has a high lithium ions conductivity, and at the same time, the secondary battery has good rate performance, cycle performance and storage performance. The specific surface area of the positive electrode active material has the common meaning in the art and may be determined by equipment and method known in the art. For example, with reference to GB/T 19587-2017, the nitrogen adsorption specific surface area analysis method can be used for testing, and the BET (BrunauerEmmett Teller) method can be used for calculating. The test can be carried out by Micromeritics Tri-Star 3020 specific surface area aperture analysis tester.

The present application further provides a method for preparing a positive electrode active material, comprising a step of providing a core material and a step of cladding.

In the step of providing a core material, the core has a chemical formula of $Li_{1+x}Mn_{1-y}A_yP_{1-z}R_zO_4$, in which x is any value in the range of −0.100 to 0.100, y is any value in the range of 0.001 to 0.500, and z is any value in the range of 0.001 to 0.100; A is one or more elements selected from Zn, Al, Na, K, Mg, Mo, W, Ti, V, Zr, Fe, Ni, Co, Ga, Sn, Sb, Nb, and Ge, optionally one or more elements selected from Fe, Ti, V, Ni, Co, and Mg; and R is one or more elements selected from B, Si, N, and S, optionally R is an element selected from among B, Si, N and S.

The step of cladding comprises providing suspensions of $Li_aMP_2O_7$ and/or $Mb(P_2O_7)_c$ and $XPO_4$, respectively, adding the core material to the suspensions and mixing them, and then performing sintering to obtain the positive electrode active material in which 0≤a≤2, 1≤b≤4, 1≤c≤6, said a, b, and c have an value satisfying such a condition that crystalline pyrophosphate salts of $Li_aMP_2O_7$ or $Mb(P_2O_7)_c$ are electrically neutral; and each M is independently one or more elements selected from Fe, Ni, Mg, Co, Cu, Zn, Ti, Ag, Zr, Nb, and Al, and X is one or more elements selected from Li, Fe, Ni, Mg, Co, Cu, Zn, Ti, Ag, Zr, Nb and Al. The positive electrode active material has a core-shell structure comprising the core and a shell covering the core, wherein the shell comprises a first cladding layer covering the core, a second cladding layer covering the first cladding layer and a third cladding layer covering the second cladding layer, the first cladding layer comprising crystalline pyrophosphate salts $Li_aMP_2O_7$ and/or $Mb(P_2O_7)_c$, the second cladding layer comprises crystalline phosphate salts $XPO_4$; and wherein the third cladding layer is carbon.

In some embodiments, the step of providing a core material comprises the Step (1) and Step (2).

In Step (1), a manganese source, a dopant for element A and an acid were mixed in a container with stirring to obtain manganese salt particles doped with element A.

In Step (2), the manganese salt particles doped with element A is mixed with a lithium source, a phosphorus source and a dopant of element R in a solvent to obtain a slurry, and then carrying out sintering under the protection of an inert gas atmosphere to obtain a core doped with element A and element R, wherein the core doped with element A and element R is $Li_{1+x}Mn_{1-y}A_yP_{1-z}R_zO_4$, in which x is any value in the range of −0.100 to 0.100, y is any value in the range of 0.001 to 0.500, and z is any value in the range of 0.001 to 0.100; A is one or more elements selected from Zn, Al, Na, K, Mg, Mo, W, Ti, V, Zr, Fe, Ni, Co, Ga, Sn, Sb, Nb, and Ge, optionally one or more elements selected from Fe, Ti, V, Ni, Co, and Mg; and R is one or more elements selected from B, Si, N, and S, optionally R is one element selected from B, Si, N and S.

There is no particular limitation on source of materials in the preparation method of the present application and a source of a certain element may include one or more of an elemental substance, sulfate, halide, nitrate, organic acid salt, oxide, or hydroxide of the element, and the precursor being the source may fulfill the purpose of the preparation methods of the present application.

In some embodiments, the dopant of element A is one or more of elemental substances, carbonates, sulfates, chlorates, nitrates, organic acids, oxides, hydroxides of one or more of the respective elements selected from Zn, Al, Na, K, Mg, Mo, W, Ti, V, Zr, Fe, Ni, Co, Ga, Sn, Sb, Nb and Ge.

In some embodiments, the dopant of element R is one or more of an inorganic acid, an organic acid, a sulfate, a chloride, a nitrate, an organic acid salt, an oxide, a hydroxide of one or more of the respective elements selected from B, Si, N and S.

In the present application, a manganese source may be a manganese-containing substance known in the art that can be used to prepare lithium manganese phosphate. As an example, the manganese source may be one or more selected from elemental manganese, manganese dioxide, manganese phosphate, manganese oxalate, and manganese carbonate.

In the present application, an acid may be one or more selected from inorganic acids such as hydrochloric acid, sulfuric acid, nitric acid, phosphoric acid, silicic acid, siliceous acid, and organic acids such as oxalic acid. In some embodiments, the acid is a dilute organic acid with a concentration of 60 wt % or less.

In some embodiments, a lithium source may be a lithium-containing substance known in the art that can be used to prepare lithium manganese phosphate. For example, the lithium source may be one or more selected from lithium carbonate, lithium hydroxide, lithium phosphate, and lithium dihydrogen phosphate.

In the present application, a phosphorus source may be a phosphorus-containing substance known in the art that can be used to prepare lithium manganese phosphate. For example, the phosphorus source may be one or more selected from diammonium hydrogen phosphate, ammonium dihydrogen phosphate, ammonium phosphate and phosphoric acid.

In some embodiments, the manganese source, the dopant of element A and the acid are reacted in a solvent to obtain a suspension of manganese salts doped with element A, and then the suspension is filtered, dried, and sanded to obtain manganese salt particles doped with element A having a particle size of 50-200 nm.

In some embodiments, the slurry in step (2) is dried to obtain powder, and then the powder is sintered to obtain a core doped with element A and element R.

In some embodiments, the mixing in the step (1) is carried out at a temperature of 20° C. to 120° C., optionally 40° C. to 120° C. The stirring in the step (1) is carried out at 400 rpm to 700 rpm for 1 h to 9 h, optionally 3 h to 7 h.

Optionally, the reaction temperature in the step (1) may be about 30° C., about 50° C., about 60° C., about 70° C., about 80° C., about 90° C., about 100° C., about 110° C., or about 120° C.; the stirring in the step (1) is carried out for about 2 hours, about 3 hours, about 4 hours, about 5 hours, about 6 hours, about 7 hours, about 8 hours, or about 9 hours; optionally, the reaction temperature and the stirring time in step (1) may be within any range of any of the above values.

In some embodiments, the mixing in the step (2) is carried out at a temperature of 20° C. to 120° C., optionally 40° C. to 120° C. for 1 hour to 12 hours. Optionally, the reaction temperature in the step (2) may be about 30° C., about 50°

C., about 60° C., about 70° C., about 80° C., about 90° C., about 100° C., about 110° C., or about 120° C.; the mixing in the step (2) is carried out for about 2 hours, about 3 hours, about 4 hours, about 5 hours, about 6 hours, about 7 hours, about 8 hours, about 9 hours, about 10 hours, about 11 hours, or about 12 hours; optionally, the reaction temperature and the mixing time in the step (2) may be within any range of any of the above values.

When the temperature and time in the preparation of the core particles are within the above range, the core as obtained and the positive electrode active material made therefrom have fewer lattice defects, which is favorable to reducing leaching out of manganese ions and reducing interfacial side reactions between the positive electrode active material and a non-aqueous electrolytic solution, thereby improving cycle performance, storage performance and safety performance of secondary batteries.

In some embodiments, optionally, in the process of preparing the lithium manganese phosphate particles doped with element A and element R, pH of the solution is controlled to be from 3.5 to 6, optionally, the pH of the solution is controlled to be from 4 to 6, and more optionally, the pH of the solution is controlled to be from 4 to 5. It is to be noted that the pH of the resultant mixture can be adjusted in the present application by a method commonly used in the art, for example, by adding an acid or a base.

Optionally, in some embodiments, in the step (2), a molar ratio of the manganese salt particles doped with element A to a lithium source and a phosphorus source is 1:(0.5-2.1):(0.5-2.1), and more optionally, a molar ratio of the manganese salt particles doped with element A to a lithium source and to a phosphorus source is about 1:1:1.

In some embodiments, optionally, the sintering is carried out at the following conditions in the preparation of A-element and R-element doped lithium manganese phosphate. The sintering is carried out at an atmosphere of inert gas or a mixture of inert gas and hydrogen at a temperature of from 600° C. to 950° C. for 4 hours to 10 hours; optionally, the sintering may be carried out at a temperature of from about 650° C., to about 700° C., to about 750° C., to about 800° C., to about 850° C., or to about 900° C. for about 2 hours, about 3 hours, about 4 hours, about 5 hours, about 6 hours, about 7 hours, about 8 hours, about 9 hours, or about 10 hours. Optionally, the sintering temperature and sintering time may be within any range of any of the above values. In the preparation of A-element and R-element doped lithium manganese phosphate, when the sintering temperature is too low and the sintering time is too short, it will lead to a lower crystallinity of the core of the positive electrode active material, which will affect its overall performance; when the sintering temperature is too high, heterogeneous phases are likely to appear in the core of the positive electrode active material, which will affect its overall performance; and when the sintering time is too long, particles of the core of the positive electrode active material will be larger, thus affecting capacity exertion, compaction density, rate performance, and the like.

Optionally, the protective atmosphere is a mixture of 70-90 vol % nitrogen and 10-30 vol % hydrogen.

In some embodiments, the cladding step comprises a first cladding step, a second cladding step and a third cladding step.

In the first cladding step, a source of element M, a source of phosphorus and an acid, and optionally a source of lithium, are dissolved in a solvent to obtain a suspension for a first cladding layer; the core obtained in the step of providing a core material is mixed with the suspension for a first cladding layer obtained in the first cladding step sufficiently, followed by drying, and sintering to obtain a material covered by a first cladding layer.

In the second cladding step, a source of element X, a phosphorus source, and an acid are dissolved in a solvent to obtain a suspension for a second cladding layer; the material covered by a first cladding layer obtained in the first cladding step is mixed with the suspension for a second cladding layer obtained in the second cladding step sufficiently, followed by drying, and sintering, to obtain a material covered by two cladding layers.

In the third cladding step, a carbon source is dissolved in a solvent fully to obtain a solution for a third cladding layer; then the material covered by two cladding layers obtained in the second cladding step is added to the solution for a third cladding layer, and mixed well, followed by drying and sintering to obtain a material covered by three cladding layers, i.e., a positive electrode active material.

As an example, the source of element M is one or more of elemental substance, carbonates, sulfates, chlorates, nitrates, organic acids, oxides, hydroxides of one or more of the respective elements selected from Fe, Ni, Mg, Co, Cu, Zn, Ti, Ag, Zr, Nb, and Al.

As an example, the source of element X is one or more of elemental substances, carbonates, sulfates, chlorates, nitrates, organic acids, oxides, hydroxides of one or more of the respective elements Li, Fe, Ni, Mg, Co, Cu, Zn, Ti, Ag, Zr, Nb, and Al.

The addition amount of the sources of each of elements A, R, M, and X depends on the target doping amount, and a ratio of the amounts of lithium source, manganese source, and phosphorus source is based on a stoichiometric ratio.

As an example, the carbon source is one or more of starch, sucrose, glucose, polyvinyl alcohol, polyethylene glycol, and citric acid.

In some embodiments, in the first cladding step, pH of the solution comprising the source of element M, the phosphorus source and the acid, and optionally the lithium source, is controlled to be from 3.5 to 6.5, and then it is allowed to react for from 1 hour to 5 hours with stirring, and then the solution is warmed up to from 50° C. to 120° C., and maintained at that temperature for from 2 hours to 10 hours. In some embodiments, sintering is carried out at 650° C. to 800° C. for 2 hours to 6 hours in the first cladding step.

Optionally, in the first cladding step, it is allowed to react fully. Optionally, in the first cladding step, the reaction proceeds for about 1.5 hours, about 2 hours, about 3 hours, about 4 hours, about 4.5 hours, or about 5 hours. Optionally, the reaction time in the first cladding step may be within any range of any of the above values.

Optionally, in the first cladding step, pH of the solution is controlled to be from 4 to 6.

Optionally, in the first cladding step, the solution is warmed to about 55° C., about 60° C., about 70° C., about 80° C., about 90° C., about 100° C., about 110° C., or about 120° C. and held at that temperature for about 2 hours, about 3 hours, about 4 hours, about 5 hours, about 6 hours, about 7 hours, about 8 hours, about 9 hours, or about 10 hours; optionally, the temperature at which the warming occurs and the holding time in the first cladding step may be within any range of any of the above values.

Optionally, in the first cladding step, the sintering may be carried out at about 650° C., about 700° C., about 750° C., or about 800° C. for about 2 hours, about 3 hours, about 4 hours, about 5 hours, or about 6 hours; optionally, the sintering temperature and the sintering time, may be within any range of any of the above values.

In the first cladding step, by controlling the sintering temperature and time within the above range, the following can be effectively avoided: when the sintering temperature in the first cladding step is too low and the sintering time is too short, this will result in the first cladding layer having a low degree of crystallinity and more amorphous matter, which will lead to a decrease in the effect of reducing leaching out of metals, thereby affecting cycle performance and storage performance of secondary batteries; whereas, if the sintering temperature is too high, this will lead to the appearance of heterogeneous phases in the first cladding layer, which will also affect its effect of reducing leaching out of metals, thereby affecting cycle performance and high-temperature storage performance of secondary batteries; and if the sintering time is too long, this will increase a thickness of the first cladding layer, affecting migration of $Li^+$, thereby affecting capacity exertion and rate performance of secondary batteries.

In some embodiments, in the second cladding step, the source of element X, the phosphorus source and the acid are dissolved in a solvent, then stirred and reacted for 1 hour to 10 hours, and then the solution is warmed up to 60° C. to 150° C. and maintained at that temperature for 2 hours to 10 hours. In some embodiments, the sintering in the second cladding step is carried out at 500° C. to 700° C. for 6 hours to 10 hours.

Optionally, in the second cladding step, it is allowed to react fully. Optionally, in the second cladding step, the reaction proceeds for about 1.5 hours, about 2 hours, about 3 hours, about 4 hours, about 4.5 hours, about 5 hours, about 6 hours, about 7 hours, about 8 hours, about 9 hours, or about 10 hours. Optionally, the reaction time in the second cladding step may be within any range of any of the above values.

Optionally, in the second cladding step, the solution is warmed to about 65° C., about 70° C., about 80° C., about 90° C., about 100° C., about 110° C., about 120° C., about 130° C., about 140° C., or about 150° C. and maintained at that temperature for about 2 hours, about 3 hours, about 4 hours, about 5 hours, about 6 hours, about 7 hours, about 8 hours, about 9 hours, or about 10 hours; optionally, the temperature at which the warming occurs and the holding time in the second cladding step may be within any range of any of the above values.

In the step of providing the core material and in the first cladding step and the second cladding step, prior to sintering, i.e., in the preparation of the core material in which a chemical reaction takes place (steps (1) and (2)) as well as in the preparation of a suspension for a first cladding layer and a suspension for a second cladding layer, it is possible to efficiently avoid the following by selecting an appropriate reaction temperature and reaction time, as described above: if the reaction temperature is too low, the reaction cannot occur or the reaction rate is slow; if the temperature is too high, the product decomposes or a heterogeneous phase is formed; if the reaction time is too long, the product has a larger particle size, which may increase the time and difficulty of the subsequent process; and if the reaction time is too short, then the reaction is incomplete and less product is obtained.

Optionally, in the second cladding step, the sintering may be carried out at about 550° C., about 600° C., or about 700° C. for about 6 hours, about 7 hours, about 8 hours, about 9 hours, or about 10 hours; optionally, the sintering temperature and the sintering time may be in any range of any of the above values.

In the second capping step, by controlling the sintering temperature and time within the above range, the following can be effectively avoided: if the sintering temperature in the second cladding step is too low and the sintering time is too short, this will result in the second cladding layer having a low degree of crystallinity, more amorphous states, and a decline in its performance of lowering a surface reactive activity of the positive electrode active material, thereby affecting the cycling performance and high-temperature storage performance of secondary batteries; and if the sintering temperature is too high, this will lead to the appearance of heterogeneous phases in the second cladding layer, which will also affect its effect of lowering a surface reaction activity of the positive electrode active material, thereby affecting cycle performance and high-temperature storage performance of secondary batteries; and if the sintering time is too long, this will lead to an increase in a thickness of the second cladding layer, which will affect a voltage plateau of the positive electrode active material, thereby enabling energy density of secondary batteries to decrease.

In some embodiments, the sintering in the third cladding step is carried out at 700° C. to 800° C. for 6 hours to 10 hours. Optionally, in the third cladding step, the sintering may be performed at about 700° C., about 750° C., or about 800° C. for about 6 hours, about 7 hours, about 8 hours, about 9 hours, or about 10 hours; optionally, the temperature of the sintering, and the time of the sintering, may be within any range of any of the above values.

In the third cladding step, by controlling the sintering temperature and time within the above ranges, the following can be effectively avoided: if the sintering temperature in the third cladding step is too low, this will result in a decrease in the degree of graphitization of the third cladding layer, which will affect its electrical conductivity, thereby affecting capacity exertion of the positive electrode active material; if the sintering temperature is too high, this will result in an excessive degree of graphitization of the third cladding layer, which will affect the $Li^+$ transmission, thereby affecting capacity exertion of the positive electrode active material; if the sintering time is too short, it will result in a too thin cladding layer, affecting its electrical conductivity, thereby affecting capacity exertion of the positive electrode active material; if the sintering time is too long, it will result in a too thick cladding layer, affecting compaction density of the positive electrode active material.

In the above-described first cladding step, second cladding step, and third cladding step, the drying may all be carried out at a drying temperature of 100° C. to 200° C., optionally 110° C. to 190° C., more optionally 120° C. to 180° C., even more optionally 120° C. to 170° C., and most optionally 120° C. to 160° C., and the drying time may be from 3 hours to 9 hours, optionally 4 hours to 8 hours, more optionally 5 hours to 7 hours, and most optionally about 6 hours.

By adopting the positive electrode active material prepared by the method for preparing the positive electrode active material described in the present application, the secondary battery prepared therefrom has a reduced leaching out of Mn and Mn-site doping elements after cycle, and has improved high-temperature storage performance, cycle performance, and rate performance. In addition, the raw materials are widely available, with a low cost and simple process, which is conducive to industrialization.

The positive electrode plate of the present application comprises a positive electrode current collector and a positive electrode film layer provided on at least one surface of the positive electrode current collector. In particular, said positive electrode current collector has two surfaces opposite to each other in the direction of its own thickness, and said positive electrode film layer is provided on either or both of two opposite surfaces of said positive electrode current collector. The positive electrode film layer comprises the positive electrode active material of the present application described above.

In some embodiments, optionally, said positive electrode active material is present in said positive electrode film layer in a content of from 90 wt % to 99.5 wt %, based on the total weight of said positive electrode film layer. More optionally, said positive electrode active material is present in said positive electrode film layer in a content of from 95 wt % to 99.5 wt %, based on the total weight of said positive electrode film layer.

The positive electrode film layer does not exclude other positive electrode active materials than the positive electrode material composition with a core-shell structure provided by the present application. For example, in some embodiments, the positive electrode film layer may further comprise at least one of a lithium transition metal oxide and a modified compound thereof. By way of example, said other positive electrode materials may include at least one of lithium cobalt oxide, lithium nickel oxide, lithium manganese oxide, lithium nickel cobalt oxide, lithium manganese cobalt oxide, lithium nickel manganese oxide, lithium nickel cobalt manganese oxide, lithium nickel cobalt aluminum oxide, and respective modified compounds thereof.

In some embodiments, said positive electrode film layer optionally further comprises a positive electrode conductive agent. The present application does not specifically limit the type of said positive electrode conductive agent, and as an example, said positive electrode conductive agent includes at least one of superconducting carbon, conductive graphite, acetylene black, carbon black, Ketjen black, carbon dots, carbon nanotubes, graphene, and carbon nanofibers.

In some embodiments, said positive electrode film layer optionally further comprises a binder. The present application does not specifically limit the type of said binder, and as an example, said binder may include at least one of polyvinylidene fluoride (PVDF), polytetrafluoroethylene (PTFE), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, and fluorine-containing acrylate-based resin.

In some embodiments, said positive electrode current collector may be a metal foil or a composite current collector. As an example of a metal foil, an aluminum foil may be used. The composite current collector may include a polymeric material matrix and a metallic material layer formed on at least one surface of the polymeric material matrix. As an example, the metallic material may be at least one selected from aluminum, aluminum alloy, nickel, nickel alloy, titanium, titanium alloy, silver, and silver alloy. As an example, the polymeric material matrix may be selected from polypropylene (PP), polyethylene terephthalate (PET), polybutylene terephthalate (PBT), polystyrene (PS), polyethylene (PE), etc.

Said positive electrode film layer is usually made by applying a positive electrode slurry to the positive collector followed by drying and cold pressing. Said positive electrode slurry is usually formed by dispersing the positive electrode active material, an optional conductive agent, an optional binder, and any other components in a solvent and stirring uniformly. The solvent may be N-methylpyrrolidone (NMP), but is not limited thereto.

[Negative Electrode Plate]

In some embodiments, said negative electrode plate comprises a negative electrode current collector and a negative electrode film layer provided on at least one surface of said negative electrode current collector and comprising a negative electrode active material. For example, said negative electrode current collector has two surfaces opposite to each other in the direction of its own thickness, and said negative electrode film layer is provided on either or both of two opposite surfaces of said negative electrode current collector.

Said negative electrode active material may be a negative electrode active material known in the art for use in secondary batteries. By way of example, said negative electrode active material includes, but is not limited to, at least one of natural graphite, artificial graphite, soft carbon, hard carbon, silicon-based material, tin-based material, and lithium titanate. Said silicon-based material may include at least one of elemental silicon, a silicon oxide, a silicon carbon composite, a silicon nitrogen composite, a silicon alloy material. Said tin-based materials may include at least one of elemental tin, a tin oxide, and a tin alloy material. The present application is not limited to these materials, and other conventionally known materials that can be used as negative electrode active materials for secondary batteries may also be used. These negative electrode active materials can be used alone, or in combination of two or more materials.

In some embodiments, said negative electrode film layer may further optionally comprise a negative conductive agent. In the present application, the type of said negative conductive agent is not particularly limited and, as an example, said negative conductive agent may include at least one of superconducting carbon, conductive graphite, acetylene black, carbon black, Ketjen black, carbon dots, carbon nanotubes, graphene, and carbon nanofibers.

In some embodiments, said negative electrode film layer may further optionally comprise a negative electrode binder. In the present application, the type of said negative binder is not particularly limited and, as an example, said negative electrode binder may include at least one of styrene-butadiene rubber (SBR), water-soluble unsaturated resin SR-1B, aqueous acrylic resins (e.g., polyacrylic acid PAA, polymethacrylic acid PMAA, polyacrylic acid sodium salt PAAS), polyacrylamide (PAM), polyvinyl alcohol (PVA), sodium alginate (SA), and carboxymethyl chitosan (CMCS).

In some embodiments, said negative electrode film layer may optionally also include other additives. As an example, the other additives may include thickeners, e.g., sodium carboxymethyl cellulose (CMC), and PTC thermistor material, etc.

In some embodiments, said negative electrode current collector may be a metal foil or a composite collector. As an example of a metal foil, a copper foil may be used. The composite collector may include a polymeric material matrix and a metallic material layer formed on at least one surface of the polymeric material matrix. As an example, the metallic material may be selected from at least one of copper, copper alloy, nickel, nickel alloy, titanium, titanium alloy, silver, and silver alloy. As an example, the polymer material matrix may be selected from polypropylene (PP), polyethylene terephthalate (PET), polybutylene terephthalate (PBT), polystyrene (PS), polyethylene (PE), etc.

Said negative electrode film layer is usually made by applying a negative electrode slurry to the negative electrode current collector followed by drying and cold pressing. Said negative electrode slurry is usually formed by dispersing the negative active material, an optional conductive agent, an optional binder, and any other optional additives in a solvent and stirring uniformly. The solvent may be N-methylpyrrolidone (NMP) and deionized water, but is not limited thereto.

Said negative electrode plate does not exclude other additional functional layers than said negative electrode film layer. For example, in some embodiments, the negative electrode plate described in the present application further comprises a conductive primer (e.g. being composed of a conductive agent and a binder) sandwiched between said negative electrode current collector and said negative electrode film layer and disposed on the surface of said negative electrode current collector. In some other embodiments, the negative electrode plate described in this application further comprises a protective layer covering the surface of said negative electrode film layer.

[Separator]

There is no particular limitation on the type of separator in the present application, and any well-known porous-structure separator with good chemical stability and mechanical stability may be used.

In some embodiments, materials of the separator may be at least one of glass fibers, non-woven fabrics, polyethylene, polypropylene and polyvinylidene fluoride. The separator may be a single-layer film or a multi-layer composite film. When the separator is a multi-layer composite film, materials of each layer may be the same or different.

In some embodiments, said positive electrode plate, said separator, and said negative electrode plate may be made into an electrode assembly by a winding process and/or a laminating process.

[Non-Aqueous Electrolytic Solution]

The secondary battery comprises a non-aqueous electrolytic solution, which is a bridge for the passage of lithium ions in the secondary battery, takes the burden of transporting lithium ions between the positive and negative electrodes in the secondary battery, and plays a crucial role in capacity exertion, cycle performance, storage performance, and safety performance of the secondary battery.

The inventors, through research, found that specific elemental doping and surface cladding of lithium manganese phosphate can increase resistance to migration of manganese ions, effectively reduce leaching out of manganese ions, while reducing surface oxygen activity, reducing the content of lithium impurity, reducing interfacial side reactions between the positive electrode active material and the non-aqueous electrolytic solution, and reducing production of gas, so as to improve cycle performance and storage performance of the secondary battery, in particular high-temperature cycle performance and high-temperature storage performance. However, when the content of pyrophosphate in the first cladding layer is low, its effect of reducing leaching out of manganese ions is not significant. When the content of pyrophosphate is high, it will lead to an increase in impedance of the battery due to its poor ability of pyrophosphate itself to conduct lithium ions, resulting in a limited improvement in rate performance of the secondary battery. For example, the voltage plateau of the positive electrode active material decreases to different degrees.

The inventor further conducted extensive research and skillfully added a first additive shown in Formula 1, 2, and 3 below to a non-aqueous electrolytic solution to break the above bottleneck. Specifically, the non-aqueous electrolytic solution of the present application comprises at least a first additive, and said first additive comprising one or more of the compounds shown in Formula 1, Formula 2, and Formula 3.

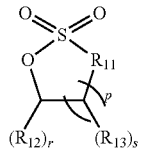

Formula 1

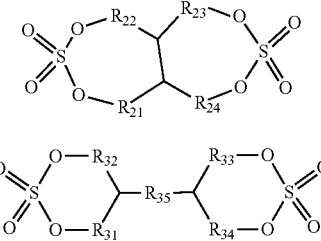

Formula 2

Formula 3

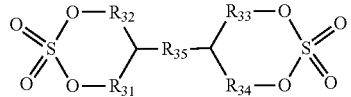

p represents 1, 2 or 3, optionally p represents 1 or 2.

r represents 1 or 2.

s represents 1 or 2.

$R_{11}$ represents an oxygen atom or $C(Y^1)_2$, $Y^1$ independently represents one of a hydrogen atom, a halogen atom, C1-C6 alkyl, C1-C6 haloalkyl, C1-C6 alkoxy, and C1-C6 haloalkoxy.

$R_{12}$ each independently represents one of a hydrogen atom, a halogen atom, C1-C6 alkyl, C1-C6 haloalkyl, C1-C6 alkoxy, and C1-C6 haloalkoxy.

$R_{13}$ each independently represents one of a hydrogen atom, a halogen atom, C1-C6 alkyl, C1-C6 haloalkyl, C1-C6 alkoxy, and C1-C6 haloalkoxy.

$R_{21}$, $R_{22}$, $R_{23}$, $R_{24}$ each independently represent a single bond or $C(Y^2)_2$, and each of $Y^2$ independently represents one of a hydrogen atom, a halogen atom, C1-C6 alkyl, C1-C6 haloalkyl, C1-C6 alkoxy, and C1-C6 haloalkoxy. $R_{21}$, $R_{22}$, $R_{23}$, and $R_{24}$ may be the same or different.

$R_{31}$, $R_{32}$, $R_{33}$, $R_{34}$ each independently represent a single bond or $C(Y^3)_2$, and $Y^3$ each independently represents one of a hydrogen atom, a halogen atom, C1-C6 alkyl, C1-C6 haloalkyl, C1-C6 alkoxy, and C1-C6 haloalkoxy, in which $R_{31}$, $R_{32}$, $R_{33}$, and $R_{34}$ may be the same or different.

$R_{35}$ is absent or represents one of a single bond, an oxygen atom, C1-C6 alkylene, C1-C6 haloalkylene, C1-C6 oxa-alkylene.

$R_{35}$ is absent, i.e.,

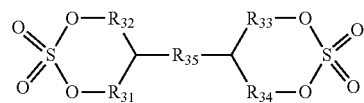

represents

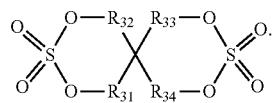

$R_{35}$ represents a single bond, i.e.,

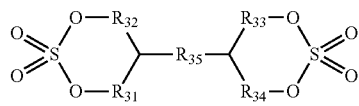

represents

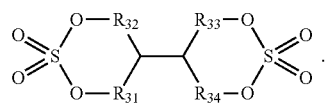

When the non-aqueous electrolytic solution contains the first additive shown in the above Formula 1, Formula 2, and Formula 3, it is capable of forming a layer of sulfur-containing polymer with strong lithium ion conductivity on the surface of the positive electrode active material during the charge process of the secondary battery, so as to enhance lithium ion conductivity of the positive electrode active material, and thereby further enhance capacity exertion and rate performance of the secondary battery.

In addition, the first additive can also coordinate with transition metals on the surface of the positive electrode active material and form a complex, so that interfacial film formed on the surface of the positive electrode active material is more dense and stable, thereby further reducing interfacial side reactions between the positive electrode active material and the non-aqueous electrolytic solution, further reducing leaching out of the manganese ions, and reducing production of gas. Since the first additive has a high reduction potential, it can also accept electrons from a negative electrode during a charge process and reduce itself, and preferentially form a dense and stable interfacial film on the surface of the negative electrode active material over an organic solvent, thereby reducing interfacial side reactions between the negative electrode active material and the non-aqueous electrolytic solution. Therefore, when the non-aqueous electrolytic solution comprises the first additive as shown by Formula 1, Formula 2 and Formula 3, the secondary battery may have a further improved cycle performance and storage performance.

Said first additive comprises one or more of the compounds shown in Formula 1, Formula 2, and Formula 3. Specifically, in some embodiments, said first additive comprises one or more of the compounds shown in formula 1; in some embodiments, said first additive comprises one or more of the compounds shown in formula 2; in some embodiments, said first additive comprises one or more of the compounds shown in formula 3; in some embodiments, said first additive comprises both the compounds shown in formula 1 and the compounds shown in Formula 2; in some embodiments, said first additive comprises the compounds shown in Formula 1 and the compounds shown in Formula 3; in some embodiments, said first additive comprises both the compounds shown in Formula 2 and the compounds shown in Formula 3; and in some embodiments, said first additive comprises both the compounds shown in Formula 1, the compounds shown in Formula 2, and the compounds shown in Formula 3.

In some embodiments of the present application, optionally, Rn represents an oxygen atom or $C(Y^1)_2$, with $Y^1$ independently representing one of a hydrogen atom, a fluorine atom, methyl, ethyl, propyl, fluorinated methyl, fluorinated ethyl, fluorinated propyl, methoxy, ethoxy, and propoxy. More optionally, Rn represents an oxygen atom or $C(Y^1)_2$, with $Y^1$ independently representing one of a hydrogen atom, a fluorine atom, methyl, ethyl, propyl, fluorinated methyl, fluorinated ethyl, and fluorinated propyl.

In some embodiments of the present application, optionally, $R_{12}$ each independently represents one of a hydrogen atom, a fluorine atom, methyl, ethyl, propyl, fluorinated methyl, fluorinated ethyl, fluorinated propyl, methoxy, ethoxy, and propoxy.

In some embodiments of the present application, optionally, $R_{13}$ each independently represents one of a hydrogen atom, a fluorine atom, methyl, ethyl, propyl, fluorinated methyl, fluorinated ethyl, fluorinated propyl, methoxy, ethoxy, and propoxy. More optionally, $R_{13}$ each independently represents one of a hydrogen atom, a fluorine atom, methyl, ethyl, propyl, fluorinated methyl, fluorinated ethyl, fluorinated propyl In some embodiments of the present application, optionally, $R_{21}$, $R_{22}$, $R_{23}$, and $R_{24}$ independently represent a single bond or methylene (i.e. —$CH_2$—). More optionally, $R_{21}$, $R_{22}$, $R_{23}$, and $R_{24}$ are not all a single bond. Further optionally, one or both of $R_{21}$, $R_{22}$ are methylene, and one or both of $R_{23}$, $R_{24}$ are methylene.

For example, $R_{21}$ and $R_{23}$ are methylene, and $R_{22}$ and $R_{24}$ are a single bond. Alternatively, $R_{21}$ and $R_{24}$ are methylene and $R_{22}$ and $R_{23}$ are a single bond. Alternatively, $R_{21}$ and $R_{22}$ are both methylene, and one of $R_{23}$ and $R_{24}$ is methylene and the other is a single bond. Alternatively, $R_{21}$, $R_{22}$, $R_{23}$, and $R_{24}$ are all methylene.

In some embodiments of the present application, optionally, $R_{31}$, $R_{32}$, $R_{33}$, and $R_{34}$ independently represent a single bond or methylene, and $R_{31}$, $R_{32}$, $R_{33}$, and $R_{34}$ are not all a single bond.

In some embodiments of the present application, optionally, $R_{35}$ is absent or represents one of a single bond, an oxygen atom, methylene, ethylene, propylene, fluorinated methylene, fluorinated ethylene, fluorinated propylene, 2-oxa-1,3-propylene, 2-oxa-1,4-butylene, 3-oxa-1,5-pentylene. More optionally, $R_{35}$ is absent or represents one of a single bond, methylene, ethylene, propylene, 2-oxa-1,3-propylene. Further optionally, $R_{35}$ is a single bond.

In some embodiments, in the compounds shown in Formula 3, $R_{35}$ is a single bond, one or both of $R_{31}$ and $R_{32}$ are methylene, and the remaining substituents are a single bond. Alternatively, $R_{35}$ is a single bond, one or both of $R_{33}$ and $R_{34}$ are methylene, and the remaining substituents are a single bond.

In some embodiments, in the compounds shown in Formula 3, $R_{35}$ is a single bond, one of $R_{31}$ and $R_{32}$ is methylene, one of $R_{33}$ and $R_{34}$ is methylene, and the remaining substituents are a single bond.

In some embodiments, in the compounds shown in Formula 3, $R_{35}$ is a single bond, one of $R_{31}$ and $R_{32}$ is methylene, one of $R_{33}$ and $R_{34}$ is methylene, and the remaining substituents are a single bond. Alternatively, $R_{35}$ is a single bond, $R_{33}$ and $R_{34}$ are both methylene, one of $R_{31}$ and $R_{32}$ is methylene, and the remaining substituents are a single bond.

In some embodiments, in the compounds shown in Formula 3, $R_{35}$ is a single bond, and $R_{31}$, $R_{32}$, $R_{33}$, $R_{34}$ are all methylene.

In some embodiments, said first additive comprises at least one of the following compounds:
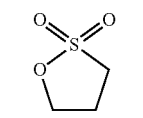 H1
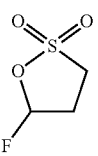 H2
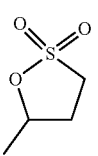 H3
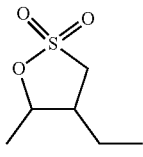 H4
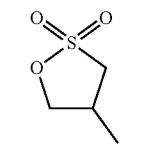 H5
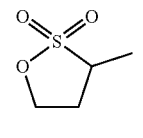 H6
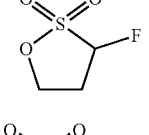 H7
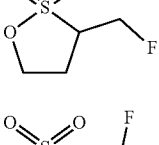 H8
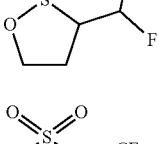 H9
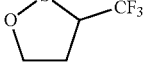 H10
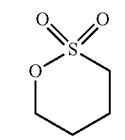 H11
-continued
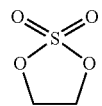 H12
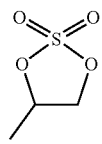 H13
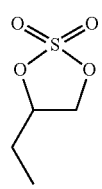 H14
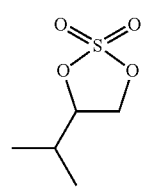 H15
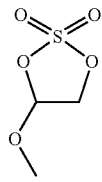 H16
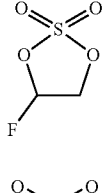 H17
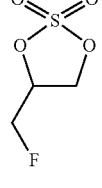 H18
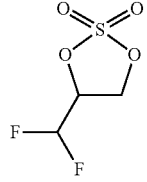 H19
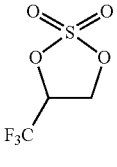 H20

H21 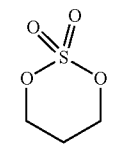

H22 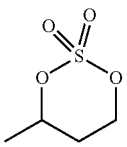

H23 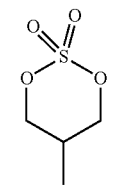

H24 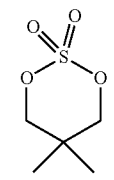

H25 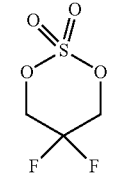

H26 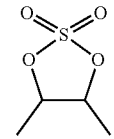

H27 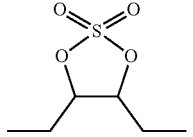

H28 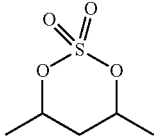

H29 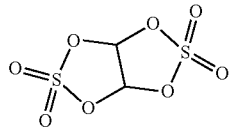

H30 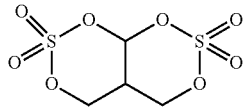

H31 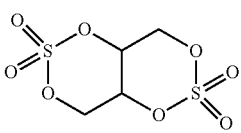

H32 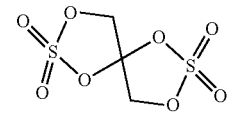

H33 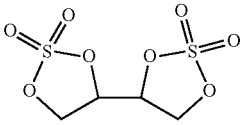

H34 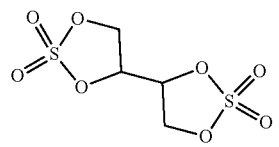

H35 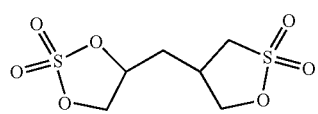

H36 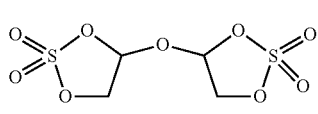

H37 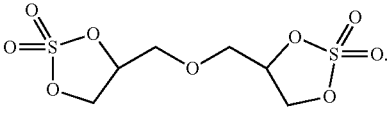

H38 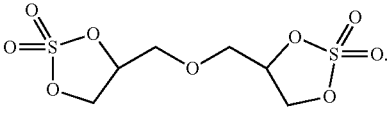

The inventors, after extensive research, found that with at least one of the above compounds as the first additive, it is capable of forming a more dense and stable interfacial film with stronger lithium ion conductivity on the surface of the positive electrode active material, and a more dense and stable interfacial film on the surface of the negative electrode active material, and even after a long period of charge and discharge, said positive and negative electrode interfacial film are still effective in preventing active materials from coming into contact with the non-aqueous electrolytic solution, thus effectively reducing leaching out of manganese ions and reducing gas production, further improving cycle performance and storage performance of the secondary battery.

The inventor further found that when the non-aqueous electrolytic solution contains too much of the first additive, interfacial impedance on the positive and negative electrodes will increase, and capacity exertion and rate performance of the secondary battery will be affected. Therefore, the content of the first additive in the non-aqueous electrolytic solution should not be too high. In some embodiments, the content of said first additive is W1% by weight, W1 being from 0.01 to 20, optionally from 0.1 to 10, and more optionally from 0.5 to 5, based on the total weight of said non-aqueous electrolytic solution. When the first additive content is within the above range, it can improve lithium ion conductivity of the lithium manganese phosphate positive electrode active material coated with pyrophosphate without significantly increasing interfacial impedance on the positive and negative electrode, and thus the secondary battery is able to have a high capacity exertion and good rate performance, cycle performance and storage performance.

In some embodiments, said first cladding layer has a cladding amount of C1% by weight, said second cladding layer has a cladding amount of C2% by weight, said third cladding layer has a cladding amount of C3% by weight, and said first additive has a content of W1% by weight, which satisfy the relationship of W1/(C1+C2+C3) of from 0.001 to 2, optionally from 0.01 to 1, and more optionally from 0.05 to 1. When W1/(C1+C2+C3) is within the above ranges, the secondary battery is able to have higher capacity exertion and good rate performance, cycle performance and storage performance. And the following can be effectively avoided: when W1/(C1+C2+C3) is small, there is not enough first additive to form a film on the surface of the positive electrode active materials, which cannot obviously improve lithium ion conductivity of the lithium manganese phosphate positive electrode active material coated with pyrophosphate, so that improvement of rate performance of the secondary battery is not obvious; when W1/(C1+C2+C3) is large, too much of the first additive will increase interface resistance on the positive and negative electrodes, affecting capacity exertion and rate performance of the secondary battery.

In some embodiments, the secondary battery has a liquid injection coefficient of Q0 in g/Ah with Q0 satisfying in the range of 2.5 to 4.0.

In some embodiments, said first additive has a content of W1% by weight, said secondary battery has an initial capacity of D0 in mAh/g, said secondary battery has a liquid injection coefficient of Q0 in g/Ah, and said positive electrode active material has a specific surface area of B in m$^2$/g, which satisfy the relationship of (W1%×D0×Q0)/B of 0.002 to 10, optionally 0.01 to 5. When (W1%×D0×Q0)/B is in the above range, the secondary battery is capable of having high capacity exertion and good rate performance, cycle performance and storage performance. And the following can be effectively avoided: when (W1%×D0×Q0)/B is small, there is not enough first additive to form a film on the surface of the positive electrode active materials, which cannot obviously improve lithium ion conductivity of the lithium manganese phosphate positive electrode active material coated with pyrophosphate, so that improvement of rate performance of the secondary battery is not obvious; when (W1%×D0×Q0)/B is large, too much of the first additive will increase interface resistance on the positive and negative electrodes, affecting capacity exertion and rate performance of the secondary battery.

An initial capacity D0 in mAh/g of secondary batteries can be obtained by the following method. A secondary battery is charged to a charge cut-off voltage at 0.33C at a constant temperature of 25° C. and then is charged at constant voltage until current is less than or equal to 0.05 mA. After that, the battery is allowed to stand for 5 minutes, and then is discharged to a discharge cut-off voltage at 0.33C, at which, a ratio of the discharge capacity to mass of the positive electrode active material is an initial capacity D0 in mAh/g of the secondary battery. In the test method of the present application, the charge and discharge cut-off voltage of the secondary battery may be 2.5V-4.3V.

Said non-aqueous electrolytic solution further comprises a lithium salt and an organic solvent. The present application has no particular limitation on the types of said lithium salt and said organic solvent, which may be selected according to actual needs.

As an example, said organic solvent may include one or more of chain carbonate, cyclic carbonate, carboxylic acid ester. Among them, the present application has no specific limitation on the types of said chain carbonate, said cyclic carbonate, and said carboxylic acid ester, which can be selected according to actual needs. Optionally, said organic solvent includes one or more of dimethyl carbonate (DMC), diethyl carbonate (DEC), dipropyl carbonate (DPC), methyl ethyl carbonate (EMC), methyl propyl carbonate (MPC), ethyl propyl carbonate (EPC), ethylene carbonate (EC), propylene carbonate (PC), butylene carbonate (BC), gamma-butyrolactone (GBL), methyl formate (MF), ethyl formate (EF), methyl acetate (MA), ethyl acetate (EA), propyl acetate (PA), methyl propionate (MP), ethyl propionate (EP), propyl propionate (PP), and tetrahydrofuran (THF).

As an example, said lithium salt may include one or more of $LiN(C_mF_{2m+1}SO_2)(C_nF_{2n+1}SO_2)$, $LiPF_6$, $LiBF_4$, LiBOB, $LiAsF_6$, $Li(FSO_2)_2N$, $LiCF_3SO_3$, and $LiClO_4$, with m and n being natural numbers. When the non-aqueous electrolytic solution includes the lithium salt described above, this helps to form a dense, stable and low-impedance interfacial film on the surface of the positive electrode and/or negative electrode active materials, and effectively improves at least one of cycle performance, storage performance and rate performance of the secondary battery.

The cyclic carbonate has a higher dielectric constant, which facilitates dissociation of lithium salts. In some embodiments, said cyclic carbonate may be present in a content of 20 wt % or more, optionally from 20 wt % to 80 wt %, more optionally from 20 wt % to 50 wt %, based on the total weight of said organic solvent. Optionally, said cyclic carbonate includes one or more of ethylene carbonate (EC), propylene carbonate (PC), and butylene carbonate (BC).

The chain carbonate has a smaller dielectric constant and a weaker ability to dissociate lithium salts, but has a low viscosity and good fluidity and thus it can increase migration rate of lithium ions. In some embodiments, said chain carbonate may be present in a content of 10 wt % or more, optionally from 10 wt % to 80 wt %, based on the total weight of said organic solvent. Optionally, said chain carbonate comprises one or more of dimethyl carbonate (DMC), diethyl carbonate (DEC), dipropyl carbonate (DPC), methyl ethyl carbonate (EMC), methyl propyl carbonate (MPC), and ethyl propyl carbonate (EPC).

Carboxylic acid esters have advantages of low viscosity and high dielectric constant and thus it may enhance conductivity of a non-aqueous electrolytic solution. In some embodiments, said carboxylic acid ester may be present in a content of from 0 wt % to 70 wt %, optionally from 0 wt % to 60 wt %, based on the total weight of said organic solvent. Optionally, said carboxylic acid ester comprises one or more of methyl formate (MF), ethyl formate (EF), methyl acetate (MA), ethyl acetate (EA), propyl acetate (PA), methyl propionate (MP), ethyl propionate (EP), and propyl propionate (PP).

With increasing the content of lithium salts, the total number of mobile lithium ions increases, but at the same time, viscosity of the non-aqueous electrolytic solution will also increase, and migration rate of lithium ions slows down instead. Thus, an optimal value for the content of lithium salts occurs. In some embodiments, said lithium salt may be present in a content of from 6 wt % to 39 wt %, optionally from 10 wt % to 31 wt %, more optionally from 11 wt % to 24 wt %, based on the total weight of said non-aqueous electrolytic solution.

In some embodiments, said non-aqueous electrolytic solution further comprises a second additive, said second additive comprising one or more of a cyclic carbonate compound containing an unsaturated bond, a halogen-substituted cyclic carbonate compound, a nitrile compound, a phosphonitrile compound, an aromatic hydrocarbon and halogenated aromatic hydrocarbon compound, an anhydride compound, a phosphite compound, a phosphate compound, a borate compound, a sulfite compound, a methylene disulfonate compound, and an isocyanate compound. When the non-aqueous electrolytic solution comprises both the first additive and the second additive, the second additive helps to form a more dense and stable interfacial film on the surface of the positive electrode and/or negative electrode active materials, so as to be able to further enhance at least one of cycle performance, storage performance, rate performance, and safety performance of secondary batteries. In some embodiments, said second additive is present in a content of W2% by weight, with W2 being 20 or less, optionally from 0.1 to 10, more optionally from 0.5 to 5, based on the total weight of said non-aqueous electrolytic solution.

(a) Cyclic Carbonate Compound Containing Carbon-Carbon Unsaturated Bonds

The cyclic carbonate compound containing carbon-carbon unsaturated bonds may comprise one or more of the compounds shown in Formula 2-1. $R_{36}$ represents C1-C6 alkylene group with alkenyl or alkynyl substituents on its branched chain, or a substituted or unsubstituted C2-C6 straight-chain alkenylene group, wherein the substituent is one or more selected from a halogen atom, C1-C6 alkyl group, and a C2-C6 alkenyl group.

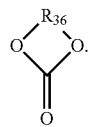

Formula 2-1

Optionally, the cyclic carbonate compound containing a carbon-carbon unsaturated bond may include, but is not limited to, one or more of the following compounds.

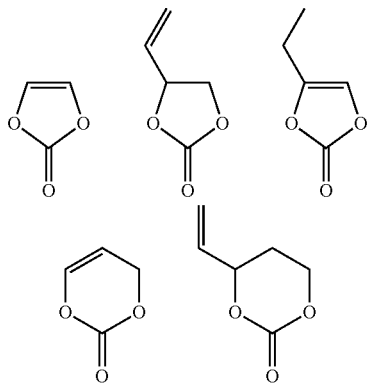

(b) Halogen-Substituted Cyclic Carbonate Compound

The halogen-substituted cyclic carbonate compound may include one or more of the compounds shown in Formula 2-2. $R_{37}$ represents a halogen-substituted C1-C6 alkylene group, or a halogen-substituted C2-C6 alkenylene group.

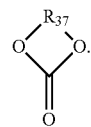

Formula 2-2

Optionally, the halogen-substituted cyclic carbonate compound may include, without being limited to, one or more of fluoro ethylene carbonate (FEC), fluoro propylene carbonate (FPC), trifluoro propylene carbonate (TFPC), and trans or cis-4,5-difluoro-1,3-dioxolan-2-one (hereinafter, both are collectively referred to as DFEC).

(c) Nitrile Compound

The nitrile compound may be a dinitrile or trinitrile compound. Optionally, the nitrile compound may comprise one or more of the compounds shown in Formulae 2-3 and Formulae 2-4. $R_{38}$ represents substituted or unsubstituted C1-C12 alkylene, substituted or unsubstituted C1-C12 oxa-alkylene, substituted or unsubstituted C2-C12 alkenylene, or substituted or unsubstituted C2-C12 alkynylene, and $R_{39}$ to $R_{41}$ each independently represent, substituted or unsubstituted C0-C12 alkylene, substituted or unsubstituted C1-C12 oxa-alkylene, substituted or unsubstituted C2-C12 alkenylene, or substituted or unsubstituted C2-C12 alkynylene, wherein the substituent is one or more selected from a halogen atom, a nitrile group, C1-C6 alkyl, C2-C6 alkenyl, and C1-C6 alkoxy.

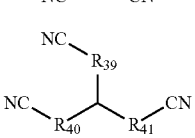

Formula 2-3

Formula 2-4

Optionally, the nitrile compound may include one or more of ethanedinitrile, propanedinitrile, butanedinitrile, pentanedinitrile, hexanedinitrile, heptanedinitrile, octanedinitrile, nonanedinitrile, decanedinitrile, undecanedinitrile, dodecanedinitrile, tetramethylsuccinonitrile, methylpentanedinitrile, butadienedinitrile, 2-pentenedinitrile, hex-2-enedinitrile, hex-3-enedinitrile, oct-4-enedinitrile, oct-4-ynedinitrile, 1,2,3-propane-tricarbonitrile, 1,3,5-pentanetricarbonitrile, 1,3,6-hexanetrinitrile.

(d) Phosphonitrile Compound

The phosphonitrile compound may be a cyclic phosphonitrile compound. The cyclic phosphonitrile compound may include one or more of methoxy pentafluorocyclotriphosphonitrile, ethoxy pentafluorocyclotriphosphonitrile, phenoxy pentafluorocyclotriphosphonitrile, and ethoxy heptafluorocyclotetraphosphonitrile. Optionally, the cyclic phosphonitrile compound may include one or more of methoxy pentafluorocyclotriphosphonitrile, ethoxy pentafluorocyclotriphosphonitrile, phenoxy pentafluorocyclotriphosphonitrile. Further optionally, the cyclic phosphonitrile compound may include methoxy pentafluorocyclotriphosphonitrile, ethoxy pentafluorocyclotriphosphonitrile, or a combination thereof.

(e) Aromatic Hydrocarbon and Halogenated Aromatic Hydrocarbon Compound

The aromatic hydrocarbon and halogenated aromatic hydrocarbon compound may include one or more of cyclohexylbenzene, fluorinated cyclohexylbenzene compounds (e.g., 1-fluoro-2-cyclohexylbenzene, 1-fluoro-3-cyclohexylbenzene, 1-fluoro-4-cyclohexylbenzene), t-butylbenzene, t-amylbenzene, 1-fluoro-4-t-butylbenzene, biphenyl, terphenyl (ortho-, meta-, para-), diphenyl ether, fluoro-benzene, difluorobenzene (ortho-, meta-, para-), anisole, 2,4-difluoroanisole, partial hydrides of terphenyl (e.g., 1,2-dicyclohexylbenzene, 2-phenylbicyclohexyl, 1,2-diphenylcyclohexane, o-cyclohexylbiphenyl). Optionally, the aromatic hydrocarbon and halogenated aromatic hydrocarbon compound may include one or more of biphenyl, terphenyl (ortho-, meta-, para-), fluorobenzene, cyclohexylbenzene, t-butylbenzene, t-amylbenzene. Further optionally, the aromatic hydrocarbon and halogenated aromatic hydrocarbon compound may include one or more of biphenyl, o-terphenyl, fluorobenzene, cyclohexylbenzene, and tert-pentylbenzene.

(f) Acid Anhydride Compound

The acid anhydride compound may be a chain acid anhydride or a cyclic acid anhydride. Specifically, the acid anhydride compound may include one or more of acetic anhydride, propionic anhydride, succinic anhydride, maleic anhydride, 2-allyl succinic anhydride, glutaric anhydride, itaconic anhydride, and 3-sulfo-propionic anhydride. Optionally, the acid anhydride compound may include one or more of succinic anhydride, maleic anhydride, and 2-allyl succinic anhydride. Further optionally, the acid anhydride compound may include succinic anhydride, 2-allyl succinic anhydride, or a combination thereof.

(g) Phosphite Compound

The phosphite compound may be a silane phosphite compound, and specifically may include one or more of the compounds shown in Formulae 2-5, with $R_{42}$ to $R_{50}$ each independently representing halogen-substituted or unsubstituted C1-C6 alkyl.

Formula 2-5

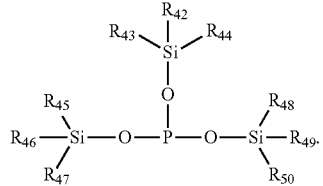

Optionally, the silane phosphite compound may include, but is not limited to, one or more of the following compounds.

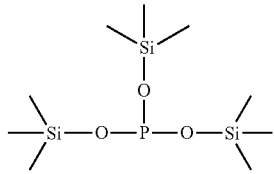

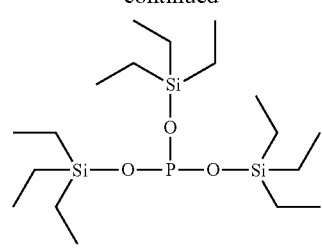

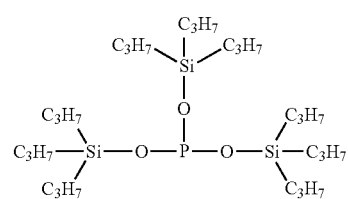

(h) Phosphate Ester Compound

The phosphate ester compound may be a silane phosphate ester compound, and specifically may include one or more of the compounds shown in Formula 2-6, with $R_{51}$ to $R_{59}$ each independently representing halogen-substituted or unsubstituted C1-C6 alkyl.

Formula 2-6

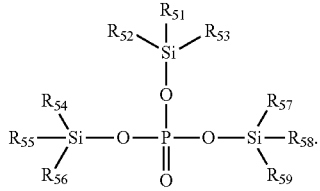

Optionally, the silane phosphate compound may include, but is not limited to, one or more of the following compounds.

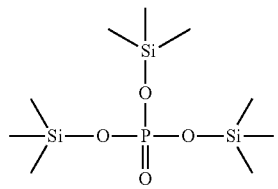

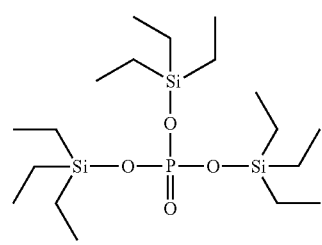

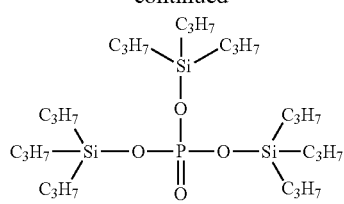

(i) Borate Ester Compound

The borate ester compound may be a silane borate ester compound, and specifically may include one or more of the compounds shown in Formula 2-7, with $R_{60}$ to $R_{68}$ each independently denoting halogen-substituted or unsubstituted C1-C6 alkyl.

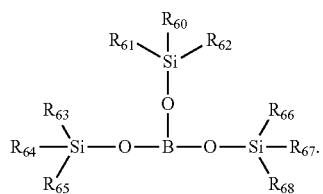
Formula 2-7

Optionally, the silane borate compound may include, but is not limited to, one or more of the following compounds:

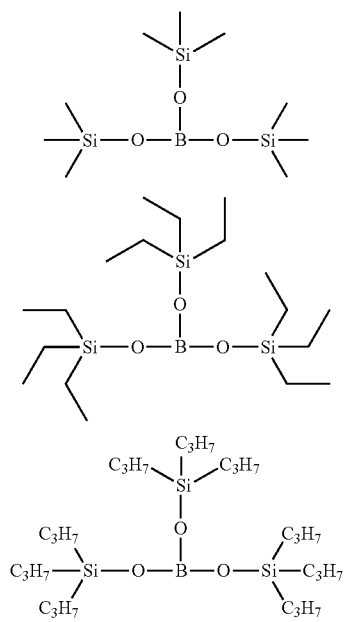

(j) Sulfite Compound

The sulfite compound may be a cyclic sulfite compound, and specifically may include one or more of the compounds shown in Formulas 2-8. $R_{69}$ represents substituted or unsubstituted C1-C6 alkylene, substituted or unsubstituted C2-C6 alkenylene, wherein the substituent is one or more selected from a halogen atom, C1-C3 alkylene, and C2-C4 alkenylene.

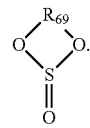
Formula 2-8

Optionally, the sulfite compound may include one or more of ethylene sulfite (ES), propylene sulfite (PS), butylene sulfite (BS).

(k) Methylene Disulfonate Compound

The methylene disulfonate compound may include one or more of the compounds shown in Formulae 2-9. $R_{70}$ to $R_{73}$ each independently represent a hydrogen atom, a halogen atom, substituted or unsubstituted C1-C10 alkyl group, and substituted or unsubstituted C2-C10 alkenyl, wherein the substituent is one or more selected from a halogen atom, C1-C3 alkyl, and C2-C4 alkenyl.

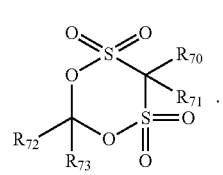
Formula 2-9

Optionally, the methylene disulfonate compound may include, but is not limited to, one or more of the following compounds.

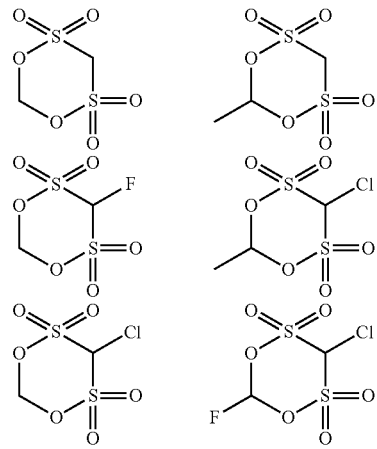

Further optionally, the methylene disulfonate compound may be methane methylene disulfonate.

(l) Isocyanate Compounds

The isocyanate compound may include one or more of methyl isocyanate, ethyl isocyanate, butyl isocyanate, phenyl isocyanate, tetramethylene diisocyanate, hexamethylene diisocyanate, octamethylene diisocyanate, 1,4-phenylene diisocyanate, 2-isocyanatoethyl acrylate, and 2-isocyanatoethyl methacrylate. Optionally, the isocyanate compound may comprise one or more of hexamethylene diisocyanate, octamethylene diisocyanate, 2-isocyanatoethyl acrylate, and 2-isocyanatoethyl methacrylate.

Optionally, said second additive may comprise one or more of vinylidene carbonate (VC), vinyl ethylene carbonate (VEC), fluorinated ethylene carbonate (FEC), ethanedinitrile, and ethoxy pentafluorocyclotriphosphonitrile. These additives are electrochemical reduction additives, and their reduction potential is higher than that of an organic solvent, so that electrochemical reduction can preferentially occur on the surface of the negative electrode active materials to form an interfacial membrane with excellent performances, thereby reducing destruction of the interfacial membrane by the organic solvent, and thus the secondary battery adopting the same can have better electrochemical performance and safety performance.

The non-aqueous electrolytic solution of the present application can be prepared in accordance with conventional methods in the field. For example, said additives, said organic solvent, said lithium salt and the like can be mixed well to obtain an non-aqueous electrolyt is solution. There is no particular limitation on the order of addition of each material. For example, said additive, said lithium salt and the like can be added to said organic solvent and mixed homogeneously to obtain an non-aqueous electrolytic solution.

In the present application, components and their contents in said non-aqueous electrolytic solution can be determined according to methods conventional in the art. For example, they can be determined by gas chromatography-mass spectrometry (GC-MS), ion chromatography (IC), liquid chromatography (LC), nuclear magnetic resonance spectrometry (NMR) and the like.

It should be noted that the non-aqueous electrolytic solution of the present application can also be obtained from a secondary battery. An exemplary method of obtaining a non-aqueous electrolytic solution from a secondary battery comprises the step of discharging the secondary battery to a discharge cut-off voltage and then centrifuging it, after which an appropriate amount of liquid obtained from centrifugation is taken for testing.

[Outer Package]

In some embodiments, said secondary battery may include an outer package. The outer package may be used to encapsulate said electrode assembly and a non-aqueous electrolytic solution.

In some embodiments, said outer package of said secondary battery may be a hard case, such as a hard plastic case, an aluminum case, a steel case, and the like. The outer package of the secondary battery may also be a soft package, such as a pouch-type soft package. Material of the soft bag can be plastic, such as at least one of polypropylene (PP), polybutylene terephthalate (PBT), and polybutylene succinate (PBS).

The shape of the secondary battery is not particularly limited in the present application, and it may be cylindrical, square, rectangular or any other shape. FIG. 1 is a schematic diagram of a secondary battery 5 of a rectangular structure as an example.

Figure 2:
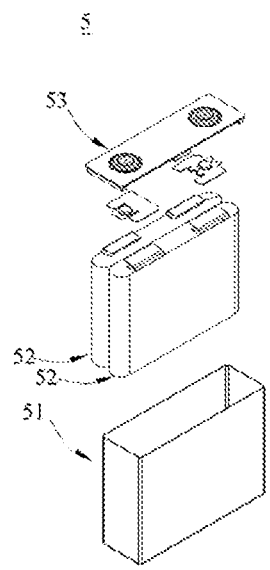
FIG. 2 is an exploded view of a secondary battery according to the embodiment of the present application as shown in FIG. 1.

In some embodiments, as shown in FIG. 2, the outer package may include a casing 51 and a cover plate 53, wherein the casing 51 may include a bottom plate and side plates connected to the bottom plate, and the bottom plate and the side plates are enclosed to form an accommodating cavity. The casing 51 has an opening communicating with the accommodating cavity, and the cover plate 53 is used to cover the opening to close the accommodating cavity. A positive electrode plate, a separator, and a negative electrode plate may be made into an electrode assembly 52 by a winding process or a laminating process. The electrode assembly 52 is packaged in the accommodating cavity, and the electrolytic solution is infiltrated in the electrode assembly 52. The number of electrode assemblies 52 contained in the secondary battery 5 may be one or more, and may be adjusted according to requirements.

A process for preparing the secondary battery of the present application is well known in the art. In some embodiments, a positive electrode plate, a separator, a negative electrode plate and a non-aqueous electrolytic solution may be assembled into a secondary battery. As an example, a positive electrode plate, a separator, and a negative electrode plate can be made into an electrode assembly by a winding process or a laminating process, and the electrode assembly can be placed in an outer package and is subjected to drying, to which a non-aqueous electrolytic solution is injected. After vacuum encapsulation, resting, chemical formation, and shaping process, a secondary battery can be obtained.

Battery Module

In some embodiments, the secondary batteries according to the present application can be assembled into a battery module, and the number of secondary batteries contained in the battery module can be more than one, and the specific number can be adjusted according to application and capacity of the battery module.

Figure 3:
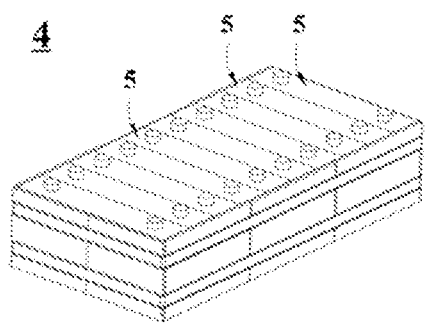
FIG. 3 is a schematic diagram of a battery module according to an embodiment of the present application.

FIG. 3 is a schematic diagram of the battery module 4 as an example. As shown in FIG. 3, in the battery module 4, a plurality of secondary batteries 5 may be arranged in sequence along the longitudinal direction of the battery module 4. Certainly, they can also be arranged in any other manner. Furthermore, a plurality of secondary batteries 5 can be fixed with fasteners.

Optionally, the battery module 4 may further include a housing having an accommodating space in which a plurality of secondary batteries 5 are accommodated.

Battery Pack

In some embodiments, the above-mentioned battery modules can also be assembled into a battery pack, and the number of battery modules included in the battery pack can be adjusted according to the application and capacity of the battery pack.

Figure 4:
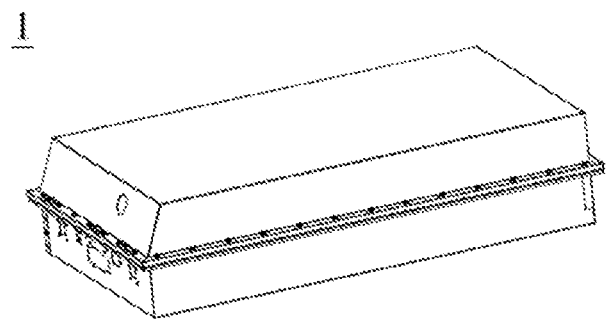
FIG. 4 is a schematic diagram of a battery pack according to an embodiment of the present application.
Figure 5:
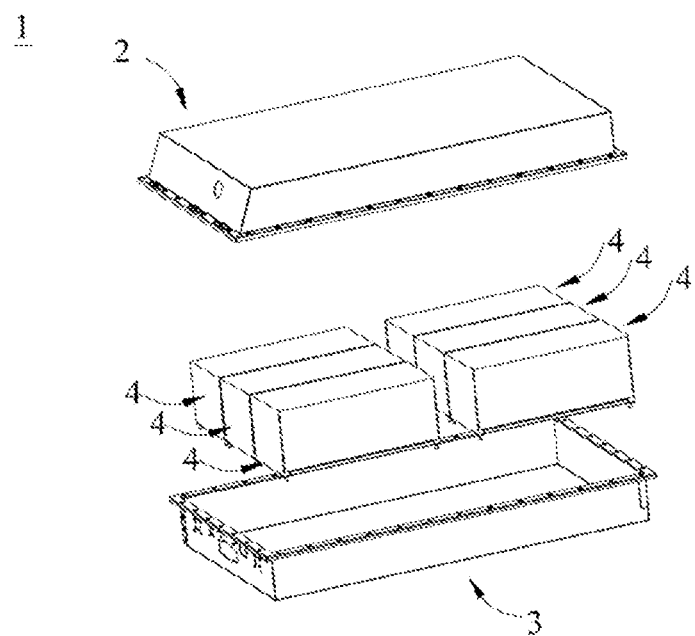
FIG. 5 is an exploded view of the battery pack according to the embodiment of the present application as shown in FIG. 4.

FIGS. 4 and 5 are schematic diagrams of the battery pack 1 as an example. As shown in FIGS. 4 and 5, the battery pack 1 may include a battery case and a plurality of battery modules 4 provided in the battery case. The battery box includes an upper case body 2 and a lower case body 3, and the upper case body 2 is used to cover the lower case body 3 to form a closed space for accommodating the battery modules 4. A plurality of battery modules 4 may be arranged in the battery case in any manner.

Electrical Device

The present application further provides an electrical device comprising at least one of the secondary battery, battery module, and battery pack of the present application. The secondary battery, battery module or battery pack can be used as a power source of the electrical device, and can also be used as an energy storage unit of the electrical device. The electrical device can be, but is not limited to, a mobile device (e.g., a mobile phone, a notebook computer, and the like), an electric vehicle (e.g., a pure electric vehicle, a hybrid electric vehicle, a plug-in hybrid electric vehicle, an electric bicycle, an electric scooter, an electric golf vehicle, an electric truck and the like), an electric train, a ship, a satellite, an energy storage system, and the like.

The electrical device can select a secondary battery, a battery module or a battery pack according to its usage requirements.

Figure 6:
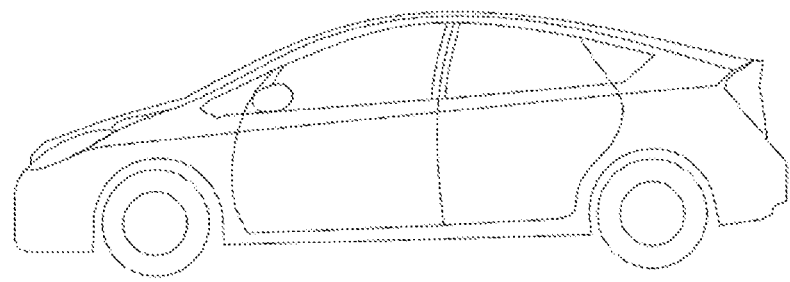
FIG. 6 is a schematic diagram of an electrical device according to an embodiment of the present application using the secondary battery of the present application as power.

FIG. 6 is a schematic diagrams of an electrical device as an example. The electrical device is a pure electric vehicle, a hybrid electric vehicle, or a plug-in hybrid electric vehicle.

In order to meet high power and high energy density requirements of the electrical device, a battery pack or a battery module can be used.

As another example, the electrical device may be a mobile phone, a tablet computer, a notebook computer, and the like. The electric device is generally required to be light and thin, and a secondary battery can be used as a power source.

EXAMPLES

The following examples more specifically describe the content disclosed in the present application, and these examples are only used for explanatory description, because various modifications and changes within the scope of the present disclosure are apparent to those skilled in the art. Unless otherwise stated, all parts, percentages, and ratios described in the following examples are based on mass, and all reagents used in the examples are commercially available or synthesized according to conventional methods and can be directly used without further treatment, and all instruments used in the examples are commercially available.

The sources of raw materials involved in examples of the present application are as follows:

| Name | Chemical Formula | Supplier | Specification |
| --- | --- | --- | --- |
| Manganese Carbonate | $MnCO_3$ | Shandong West Asia Chemical Industry Co. | 1 Kg |
| Lithium Carbonate | $Li_2CO_3$ | Shandong West Asia Chemical Industry Co. | 1 Kg |
| Magnesium carbonate | $MgCO_3$ | Shandong West Asia Chemical Industry Co. | 1 Kg |
| Zinc Carbonate | $ZnCO_3$ | Wuhan Xinru Chemical Co. | 25 Kg |
| Ferrous Carbonate | $FeCO_3$ | Xi'an Lanzhiguang Fine Material Co. | 1 Kg |
| Nickel Sulfate | $NiCO_3$ | Shandong West Asia Chemical Industry Co. | 1 Kg |
| Titanium Sulfate | $Ti(SO_4)_2$ | Shandong West Asia Chemical Industry Co. | 1 Kg |
| Cobalt Sulfate | $CoSO_4$ | Xiamen Zhixin Chemical Co. | 500 g |
| Vanadium Dichloride | $VCl_2$ | Shanghai Jin Jin Le Industry Co. | 1 Kg |
| Oxalic acid dihydrate | $C_2H_2O_4 \cdot 2(H_2O)$ | Shanghai Jin Jin Le Industry Co. | 1 Kg |
| Ammonium dihydrogen phosphate | $NH_4H_2PO_4$ | Shanghai Chengshao Biotechnology Co. | 500 g |
| Sucrose | $C_{12}H_{22}O_{11}$ | Shanghai Yuanye Biotechnology Co. | 100 g |
| Diluent sulfuric acid | $H_2SO_4$ | Shenzhen Haisian Biotechnology Co. | In a mass percentage of 60% |
| Dilute nitric acid | $HNO_3$ | Anhui Lingtian Fine Chemical Co. | In a mass percentage of 60% |
| Siliceous acid | $H_2SiO_3$ | Shanghai Yuanye Biotechnology Co. | 100 g, in a mass percentage of 99.8% |

Example 1

Step 1: Preparing positive electrode active material

Step S1: Preparing Fe, Co, V and S Co-Doped Manganese Oxalate 689.6 g of manganese carbonate, 455.27 g of ferrous carbonate, 4.65 g of cobalt sulfate, and 4.87 g of vanadium dichloride were added to a mixer and mixed thoroughly for 6 hours. The obtained mixture was then transferred to a reactor and 5 L of deionized water and 1260.6 g of oxalic acid dihydrate were added, and the resulting mixture was heated to 80° C., and stirred sufficiently at 500 rpm for 6 h. The mixture was mixed homogeneously until the reaction ended without bubbles being generated to obtain a suspension of Fe, Co, and V co-doped manganese oxalate. The suspension was then filtered, dried at 120° C., and then sanded to obtain manganese oxalate particles with a particle size of 100 nm.

Step S2: Preparing Core $Li_{0.997}Mn_{0.60}Fe_{0.393}V_{0.004}Co_{0.003}P_{0.997}S_{0.003}O_4$ 1793.1 g of manganese oxalate prepared in step S1 as well as 368.3 g of lithium carbonate, 1146.6 g of ammonium dihydrogen phosphate, and 4.9 g of dilute sulfuric acid were added into 20 L of deionized water, and then mixed thoroughly, and it was allowed to react with homogeneous mixing for 10 hours at 80° C. to obtain a slurry. The slurry was transferred to a spray drying equipment for spray drying and granulation, and dried at a temperature of 250° C. to obtain powder. The powder was sintered in a roller kiln at 700° C. for 4 hours in a protective atmosphere (90% nitrogen and 10% hydrogen) to obtain the core material.

Step S3: Preparing a Suspension for a First Cladding Layer $Li_2FeP_2O_7$ solution was prepared by dissolving 7.4 g of lithium carbonate, 11.6 g of ferrous carbonate, 23.0 g of ammonium dihydrogen phosphate, and 12.6 g of oxalic acid dihydrate in 500 mL of deionized water, controlling pH to be 5, followed by stirring and reacting for 2 hours at room temperature to obtain the solution, after which the solution was warmed up to 80° C. and kept at this temperature for 4 hours to obtain the first cladding layer suspension.

Step S4: Applying the First Cladding Layer 1571.9 g of the doped lithium manganese phosphate core material obtained in step S2 is added to the suspension for a first cladding layer with a cladding material content of 15.7 g obtained in step S3, and mixed with sufficient stirring for 6 hours, and after mixing well, transferred to an oven at 120° C. for drying for 6 hours, and then sintered at 650° C. for 6 hours to obtain a material cladded with pyrophosphate.

Step S5: Preparing a Suspension for a Second Cladding Layer 3.7 g of lithium carbonate, 11.6 g of ferrous carbonate, 11.5 g of ammonium dihydrogen phosphate, and 12.6 g of oxalic acid dihydrate were dissolved in 1500 mL of deionized water, and then stirred and reacted for 6 hours to obtain a solution, and then the solution was warmed up to 120° C. and kept at this temperature for 6 hours to obtain a suspension for a second cladding layer.

Step S6: Applying the Second Cladding Layer 1586.8 g of the material cladded with pyrophosphate obtained in Step S4 was added to the suspension for a second cladding layer with a cladding material content of 47.1 g obtained in Step S5, and mixed with thorough stirring for 6 hours, and after the mixture was homogeneous, it was transferred to an oven at 120° C. for drying for 6 hours, and then sintered at 700° C. for 8 hours to obtain a material cladded with two layers.

Step S7: Preparing an Aqueous Solution for a Third Cladding Layer 37.3 g of sucrose was dissolved in 500 g of deionized water, then stirred and fully dissolved to obtain an aqueous solution of sucrose.

Step S8: Applying the Third Cladding Layer 1633.9 g of the two-layer coated material obtained in Step S6 was added to the sucrose solution obtained in Step S7, stirred and mixed together for 6 hours, and after mixing uniformly, transferred to an oven at 150° C. to dry for 6 hours, and then sintered at 700° C. for 10 hours to obtain a material cladded with three layers.

Step 2: Preparing of Positive Electrode Plate

The positive electrode active material with a three-cladding layer structure prepared above, acetylene black as a conductive agent, and polyvinylidene fluoride (PVDF) as a binder were added to N-methylpyrrolidone (NMP) at a weight ratio of 97.0:1.2:1.8 with stirring until these materials were mixed homogeneously to obtain a positive electrode slurry. The positive electrode slurry was then uniformly applied to an aluminum foil at 0.280 g/1540.25 mm$^2$, and then dried, cold pressed, and slit to obtain a positive electrode plate.

Step 3: Preparing Negative Electrode Plate

Artificial graphite as a negative active material, hard carbon, acetylene black as a conductive agent, styrene butadiene rubber (SBR) as a binder, sodium carboxymethyl cellulose (CMC) as a thickener at a weight ratio of 90:5:2:2:1 were dissolved in a solvent deionized water, which was stirred and mixed well to prepare a negative electrode slurry. The negative electrode slurry was uniformly applied to a copper foil as a current collector at 0.117 g/1540.25 mm$^2$, and then dried, cold pressed, and slit to obtain a negative electrode plate.

Step 4: Preparing Non-Aqueous Electrolytic Solution

In an argon atmosphere glove box (H$_2$O<0.1 ppm, O$_2$<0.1 ppm), as an organic solvent, ethylene carbonate (EC), diethyl carbonate (DEC) and dimethyl carbonate (DMC) were mixed homogeneously at a volume ratio of 1:1:1, in which 12.5 wt % (based on the total weight of the non-aqueous electrolytic solution) of LiPF$_6$ and 2 wt % (based on the total weight of the non-aqueous electrolytic solution) of compound H 12 were dissolved, and the resulting mixture was stirred homogeneously, to obtain a non-aqueous electrolytic solution.

Step 5: Preparing Separator

A commercially available PP-PE copolymer microporous film with a thickness of m and an average pore size of 80 nm was used (from Trico Electronic Technology, model 20).

Step 6: Preparing Full Battery

The positive electrode plate, separator and negative electrode plate were stacked in order, so that the separator was sandwiched between the positive and negative electrodes for isolation, and then they were wound to form an electrode assembly. The electrode assembly was placed in an outer package, filled with the above electrolytic solution, and encapsulated to obtain a full battery. The full battery has a liquid injection coefficient of 3.5 g/Ah.

[Preparation of Button Battery]

The positive electrode active material prepared above, polyvinylidene fluoride (PVDF), and acetylene black were added to N-methyl pyrrolidone (NMP) at a weight ratio of 90:5:5 and stirred in a drying room to make a slurry. The above slurry was applied to an aluminum foil, dried and cold pressed to form a positive electrode plate. The applied amount was 0.2 g/cm$^2$ and the compaction density was 2.0 g/cm$^3$.

Lithium plate was used as a negative electrode, it was assembled together with the above prepared positive electrode plate and the non-aqueous electrolytic solution in a button battery box to form a button battery (hereinafter also referred to as "button").

Examples 2-66 and Comparative Examples 1-18

Examples 2-66 and Comparative Examples 1-18 were the same as Example 1 in terms of the preparation of positive electrode active material, preparation of non-aqueous electrolytic solution and preparation of battery. Examples 30-42 were the same as Example 1 with the exception for the material for a first cladding layer and the material for a second cladding layer. Examples 43-66 were the same as Example 1 with the exception for the preparation of non-aqueous electrolytic solution. The differences in the preparation of positive electrode active material were listed in tables 1 to 8 wherein Comparative Examples 1-2, 4-10 and 12 did not comprise a first cladding layer and thus no steps S3 and S4 was involved; and Comparative Examples 1-11 did not comprise a second cladding layer and thus no steps S5 and S6 was involved. The differences in the preparation of non-aqueous electrolytic solution were listed in table 9.

In addition, in all Examples and Comparative Examples of the present application, the materials for a first cladding layer and for a second cladding layer were by default crystalline if not indicated otherwise.

TABLE 1

| | | Materials for the core | |
|---|---|---|---|
| No. | Core | Materials used in step S1 | Materials used in step S2 |
| Comparative Examples 1 and 13 | LiMnPO$_4$ | manganese carbonate, 1149.3 g; water, 5 L; oxalic acid dihydrate, 1260.6 g | manganese oxalate dihydrate obtained in step S1 (counted as C$_2$O$_4$Mn•2H$_2$O), 1789.6 g; lithium carbonate, 369.4 g; ammonium dihydrogen phosphate, 1150.1 g; water, 20 L |

TABLE 1-continued

Materials for the core

| No. | Core | Materials used in step S1 | Materials used in step S2 |
| --- | --- | --- | --- |
| Comparative Example 2 | $LiMn_{0.60}Fe_{0.40}PO_4$ | manganese carbonate, 689.6 g; ferrous carbonate, 463.4 g; water, 5 L; oxalic acid dihydrate, 1260.6 g | ferromanganese oxalate dihydrate obtained in step S1(counted as $C_2O_4Mn_{0.60}Fe_{0.40} \cdot 2H_2O$), 1793.2 g; lithium carbonate, 369.4 g; ammonium dihydrogen phosphate, 1150.1 g; water, 20 L |
| Comparative Example 3 | $LiMn_{0.80}Fe_{0.20}PO_4$ | manganese carbonate, 919.4 g; ferrous carbonate, 231.7 g; water, 5 L; oxalic acid dihydrate, 1260.6 g | ferromanganese oxalate dihydrate obtained in step S1 (counted as $C_2O_4Mn_{0.80}Fe_{0.20} \cdot 2H_2O$), 1791.4 g; lithium carbonate, 369.4 g; ammonium dihydrogen phosphate, 1150.1 g; water, 20 L |
| Comparative Example 4 | $LiMn_{0.70}Fe_{0.295}V_{0.005}PO_4$ | manganese carbonate, 804.5 g; ferrous carbonate, 341.8 g; vanadium dichloride, 6.1 g; water, 5 L; oxalic acid dihydrate, 1260.6 g | ferrovanadium manganese oxalate dihydrate obtained in step S1 (counted as $C_2O_4Mn_{0.70}Fe_{0.295}V_{0.005} \cdot 2H_2O$), 1792.0 g; lithium carbonate, 369.4 g; ammonium dihydrogen phosphate, 1150.1 g; water, 20 L |
| Comparative Examples 5 and 15 | $LiMn_{0.60}Fe_{0.395}Mg_{0.005}PO_4$ | manganese carbonate, 689.6 g; ferrous carbonate, 457.6 g; magnesium carbonate, 4.2 g; water, 5 L; oxalic acid dihydrate, 1260.6 g | ferromanganese magnesium oxalate dihydrate obtained in step S1(counted as $C_2O_4Mn_{0.60}Fe_{0.395}Mg_{0.005} \cdot 2H_2O$), 1791.6 g; lithium carbonate, 369.4 g; ammonium dihydrogen phosphate, 1150.1 g; water, 20 L |
| Comparative Example 6 | $LiMn_{0.60}Fe_{0.35}Ni_{0.05}PO_4$ | manganese carbonate, 689.6 g; ferrous carbonate, 405.4 g; nickel carbonate, 59.3 g; water, 5 L; oxalic acid dihydrate, 1260.6 g | nickel ferromanganese oxalate dihydrate obtained in step S1(counted as $C_2O_4Mn_{0.60}Fe_{0.35}Ni_{0.05} \cdot 2H_2O$), 1794.6 g; lithium carbonate, 369.4 g; ammonium dihydrogen phosphate, 1150.1 g; water, 20 L |
| Comparative Example 7 and 9 | $LiMn_{0.60}Fe_{0.395}V_{0.002}Ni_{0.003}PO_4$ | manganese carbonate, 689.6 g; ferrous carbonate, 457.6 g; vanadium dichloride, 2.4 g; nickel carbonate, 3.6 g; water, 5 L; oxalic acid dihydrate, 1260.6 g | nickel manganese iron vanadium oxalate dihydrate obtained in step S1(counted as $C_2O_4Mn_{0.60}Fe_{0.395}V_{0.002}Ni_{0.003} \cdot 2H_2O$), 1793.2 g; lithium carbonate, 369.4 g; ammonium dihydrogen phosphate, 1150.1 g; water, 20 L |
| Comparative Example 8 | $LiMn_{0.60}Fe_{0.395}V_{0.002}Mg_{0.003}PO_4$ | manganese carbonate, 689.6 g; ferrous carbonate, 457.6 g; vanadium dichloride, 2.4 g; magnesium carbonate, 2.53 g; water, 5 L; oxalic acid dihydrate, 1260.6 g | magnesium manganese iron vanadium oxalate dihydrate obtained in step S1(counted as $C_2O_4Mn_{0.60}Fe_{0.395}V_{0.002}Mg_{0.003} \cdot 2H_2O$), 1792.1 g; lithium carbonate, 369.4 g; ammonium dihydrogen phosphate, 1150.1 g; water, 20 L |
| Comparative Examples 10-12, Comparative Example 16-18 and Example 1-10 | $Li_{0.997}Mn_{0.60}Fe_{0.393}V_{0.004}Co_{0.003}P_{0.997}S_{0.003}O_4$ | manganese carbonate, 689.6 g; ferrous carbonate, 455.3 g; cobalt sulfate, 4.7 g; vanadium dichloride, 4.9 g; water, 5 L; oxalic acid dihydrate, 1260.6 g | manganese iron vanadium cobalt oxalate dihydrate obtained in step S1(counted as $C_2O_4Mn_{0.60}Fe_{0.393}V_{0.004}Co_{0.003} \cdot 2H_2O$), 1793.1 g; lithium carbonate, 368.3 g; ammonium dihydrogen phosphate, 1146.6 g; dilute sulfuric acid, 4.9 g; water, 20 L |

TABLE 1-continued

Materials for the core

| No. | Core | Materials used in step S1 | Materials used in step S2 |
|---|---|---|---|
| Comparative Example 14 | $Li_{1.2}MnP_{0.8}Si_{0.2}O_4$ | manganese carbonate, 1149.3 g; water, 5 L; oxalic acid dihydrate, 1260.6 g | manganese oxalate dihydrate obtained in step S1(counted as $C_2O_4Mn \cdot 2H_2O$), 1789.6 g; lithium carbonate, 443.3 g; ammonium dihydrogen phosphate, 920.1 g; siliceous acid, 156.2 g; water, 20 L |
| Example 11 | $Li_{1.001}Mn_{0.60}Fe_{0.393}V_{0.004}Co_{0.003}P_{0.999}Si_{0.001}O_4$ | manganese carbonate, 689.6 g; ferrous carbonate, 455.3 g; cobalt sulfate, 4.7 g; vanadium dichloride, 4.9 g; water, 5 L; oxalic acid dihydrate, 1260.6 g | manganese iron vanadium cobalt oxalate dihydrate obtained in step S1 (counted as $C_2O_4Mn_{0.60}Fe_{0.393}V_{0.004}Co_{0.003} \cdot 2H_2O$), 1793.1 g; lithium carbonate, 369.8 g; ammonium dihydrogen phosphate, 1148.9 g; siliceous acid, 0.8 g; water, 20 L |
| Example 12 | $LiMn_{0.60}Fe_{0.393}V_{0.004}Co_{0.003}P_{0.998}N_{0.002}O_4$ | manganese carbonate, 689.6 g; ferrous carbonate, 455.3 g; cobalt sulfate, 4.7 g; vanadium dichloride, 4.9 g; water, 5 L; oxalic acid dihydrate, 1260.6 g | manganese iron vanadium cobalt oxalate dihydrate obtained in step S1 (counted as $C_2O_4Mn_{0.60}Fe_{0.393}V_{0.004}Co_{0.003} \cdot 2H_2O$), 1793.1 g; lithium carbonate, 369.4 g; ammonium dihydrogen phosphate, 1147.8 g; dilute nitric acid, 2.7 g; water, 20 L |
| Example 13 | $Li_{0.995}Mn_{0.65}Fe_{0.341}V_{0.004}Co_{0.005}P_{0.995}S_{0.005}O_4$ | manganese carbonate, 747.1 g; ferrous carbonate, 395.1 g; cobalt sulfate, 7.8 g; vanadium dichloride, 4.9 g; water, 5 L; oxalic acid dihydrate, 1260.6 g | manganese iron vanadium cobalt oxalate dihydrate obtained in step S1 (counted as $C_2O_4Mn_{0.65}Fe_{0.341}V_{0.004}Co_{0.005} \cdot 2H_2O$), 1792.7 g; lithium carbonate, 367.6 g; ammonium dihydrogen phosphate, 1144.3 g; dilute sulfuric acid, 8.2 g; water, 20 L |
| Example 14 | $Li_{1.002}Mn_{0.70}Fe_{0.293}V_{0.004}Co_{0.003}P_{0.998}Si_{0.002}O_4$ | manganese carbonate, 804.6 g; ferrous carbonate, 339.5 g; cobalt sulfate, 4.7 g; vanadium dichloride, 4.9 g; water, 5 L; oxalic acid dihydrate, 1260.6 g | manganese iron vanadium cobalt oxalate dihydrate obtained in step S1 (counted as $C_2O_4Mn_{0.70}Fe_{0.293}V_{0.004}Co_{0.003} \cdot 2H_2O$), 1792.2 g; lithium carbonate, 370.2 g; ammonium dihydrogen phosphate, 1147.8; siliceous acid, 1.6 g; water, 20 L |
| Examples 15 and 17 | $LiMn_{0.60}Fe_{0.393}V_{0.004}Co_{0.003}P_{0.999}N_{0.001}O_4$ | manganese carbonate, 689.6 g; ferrous carbonate, 455.3 g; cobalt sulfate, 4.7 g; vanadium dichloride, 4.9 g; water, 5 L; oxalic acid dihydrate, 1260.6 g | manganese iron vanadium cobalt oxalate dihydrate obtained in step S1 (counted as $C_2O_4Mn_{0.60}Fe_{0.393}V_{0.004}Co_{0.003} \cdot 2H_2O$), 1793.1 g; lithium carbonate, 369.4 g; ammonium dihydrogen phosphate, 1148.9 g; dilute nitric acid, 1.4 g; water, 20 L |
| Example 16 | $Li_{0.997}Mn_{0.60}Fe_{0.393}V_{0.004}Co_{0.003}P_{0.997}S_{0.003}O_4$ | manganese carbonate, 689.6 g; ferrous carbonate, 455.3 g; cobalt sulfate, 4.7 g; vanadium dichloride, 4.9 g; water, 5 L; oxalic acid dihydrate, 1260.6 g | manganese iron vanadium cobalt oxalate dihydrate obtained in step S1 (counted as $C_2O_4Mn_{0.60}Fe_{0.393}V_{0.004}Co_{0.003} \cdot 2H_2O$), 1793.1 g; lithium carbonate, 368.7 g; ammonium dihydrogen phosphate, 1146.6 g; dilute sulfuric acid, 4.9 g; water, 20 L |

TABLE 1-continued

Materials for the core

| No. | Core | Materials used in step S1 | Materials used in step S2 |
|---|---|---|---|
| Example 18 | $LiMn_{0.60}Fe_{0.393}V_{0.004}Mg_{0.003}P_{0.995}N_{0.005}O_4$ | manganese carbonate, 689.6 g; ferrous carbonate, 455.3 g; magnesium carbonate, 2.5 g; vanadium dichloride, 4.9 g; water, 5 L; oxalic acid dihydrate, 1260.6 g | magnesium manganese iron vanadium oxalate dihydrate obtained in step S1 (counted as $C_2O_4Mn_{0.60}Fe_{0.393}V_{0.004}Mg_{0.003} \cdot 2H_2O$), 1791.1 g; lithium carbonate, 369.4 g; ammonium dihydrogen phosphate, 1144.3 g; dilute nitric acid, 7.0 g; water, 20 L |
| Example 19 | $Li_{0.999}Mn_{0.60}Fe_{0.393}V_{0.004}Mg_{0.003}P_{0.999}S_{0.001}O_4$ | manganese carbonate, 689.6 g; ferrous carbonate, 455.3 g; magnesium carbonate, 2.5 g; vanadium dichloride, 4.9 g; water, 5 L; oxalic acid dihydrate, 1260.6 g | magnesium manganese iron vanadium oxalate dihydrate obtained in step S1 (counted as $C_2O_4Mn_{0.60}Fe_{0.393}V_{0.004}Mg_{0.003} \cdot 2H_2O$), 1791.1 g; lithium carbonate, 369.0 g; ammonium dihydrogen phosphate, 1148.9 g; dilute sulfuric acid, 1.6 g; water, 20 L |
| Example 20 | $Li_{0.998}Mn_{0.60}Fe_{0.393}V_{0.004}Ni_{0.003}P_{0.998}S_{0.002}O_4$ | manganese carbonate, 689.6 g; ferrous carbonate, 455.3 g; nickel carbonate, 3.6 g; vanadium dichloride, 4.9 g; water, 5 L; oxalic acid dihydrate, 1260.6 g | nickel manganese iron vanadium oxalate dihydrate obtained in step S1(counted as $C_2O_4Mn_{0.60}Fe_{0.393}V_{0.004}Ni_{0.003} \cdot 2H_2O$), 1792.2 g; lithium carbonate, 368.7 g; ammonium dihydrogen phosphate, 1147.8 g; dilute sulfuric acid, 3.2 g; water, 20 L |
| Example 21-24 | $Li_{1.001}Mn_{0.60}Fe_{0.393}V_{0.004}Ni_{0.003}P_{0.999}Si_{0.001}O_4$ | manganese carbonate, 689.6 g; ferrous carbonate, 455.3 g; nickel carbonate, 3.6 g; vanadium dichloride, 4.9 g; water, 5 L; oxalic acid dihydrate, 1260.6 g | nickel manganese iron vanadium oxalate dihydrate obtained in step S1(counted as $C_2O_4Mn_{0.60}Fe_{0.393}V_{0.004}Ni_{0.003} \cdot 2H_2O$), 1793.1 g; lithium carbonate, 369.8 g; ammonium dihydrogen phosphate, 1148.9 g; siliceous acid, 0.8 g; water, 20 L |
| Example 25 | $Li_{1.001}Mn_{0.50}Fe_{0.493}V_{0.004}Ni_{0.003}P_{0.999}Si_{0.001}O_4$ | manganese carbonate, 574.7 g; ferrous carbonate, 571.2 g; nickel carbonate, 3.6 g; vanadium dichloride, 4.9 g; water, 5 L; oxalic acid dihydrate, 1260.6 g | nickel manganese iron vanadium oxalate dihydrate obtained in step S1(counted as $C_2O_4Mn_{0.50}Fe_{0.493}V_{0.004}Ni_{0.003} \cdot 2H_2O$), 1794.0 g; lithium carbonate, 369.8 g; ammonium dihydrogen phosphate, 1148.9 g; siliceous acid, 0.8 g; water, 20 L |
| Example 26 | $Li_{1.001}Mn_{0.999}Fe_{0.001}P_{0.999}Si_{0.001}O_4$ | manganese carbonate, 1148.2 g; ferrous carbonate, 1.2 g; water, 5 L; oxalic acid dihydrate, 1260.6 g | ferromanganese oxalate dihydrate obtained in step S1(counted as $C_2O_4Mn_{0.999}Fe_{0.001} \cdot 2H_2O$), 1789.6 g; lithium carbonate, 369.8 g; ammonium dihydrogen phosphate, 1148.9 g; siliceous acid, 0.8 g; water, 20 L |

TABLE 1-continued

Materials for the core

| No. | Core | Materials used in step S1 | Materials used in step S2 |
|---|---|---|---|
| Example 27 | $LiMn_{0.60}Fe_{0.393}V_{0.004}Ni_{0.003}P_{0.9}N_{0.100}O_4$ | manganese carbonate, 689.6 g; ferrous carbonate, 455.3 g; nickel carbonate, 3.6 g; vanadium dichloride, 4.9 g; water, 5 L; oxalic acid dihydrate, 1260.6 g | nickel manganese iron vanadium oxalate dihydrate obtained in step S1(counted as $C_2O_4Mn_{0.60}Fe_{0.393}V_{0.004}Ni_{0.003}\cdot 2H_2O$), 1793.1 g; lithium carbonate, 369.4 g; ammonium dihydrogen phosphate, 1035.1 g; dilute nitric acid, 140.0 g; water, 20 L |
| Example 28 | $Li_{1.001}Mn_{0.40}Fe_{0.593}V_{0.004}Ni_{0.003}P_{0.999}Si_{0.001}O_4$ | manganese carbonate, 459.7 g; ferrous carbonate, 686.9 g; vanadium dichloride, 4.8 g; nickel carbonate, 3.6 g; water, 5 L; oxalic acid dihydrate, 1260.6 g | nickel manganese iron vanadium oxalate dihydrate obtained in step S1(counted as $C_2O_4Mn_{0.40}Fe_{0.593}V_{0.004}Ni_{0.003}\cdot 2H_2O$), 1794.9 g; lithium carbonate, 369.8 g; ammonium dihydrogen phosphate, 1148.9 g; siliceous acid, 0.8 g; water, 20 L |
| Example 29 | $Li_{1.001}Mn_{0.40}Fe_{0.393}V_{0.204}Ni_{0.003}P_{0.999}Si_{0.001}O_4$ | manganese carbonate, 459.7 g; ferrous carbonate, 455.2 g; vanadium dichloride, 248.6 g; nickel carbonate, 3.6 g; water, 5 L; oxalic acid dihydrate, 1260.6 g | nickel manganese iron vanadium oxalate dihydrate obtained in step S1(counted as $C_2O_4Mn_{0.40}Fe_{0.393}V_{0.204}Ni_{0.003}\cdot 2H_2O$), 1785.1 g; lithium carbonate, 369.8 g; ammonium dihydrogen phosphate, 1148.9 g; siliceous acid, 0.8 g; water, 20 L |

TABLE 2

Preparation of suspension for a first cladding layer (Step S3)

| No. | Materials for a first cladding layer | Preparation of suspension for a first cladding layer |
|---|---|---|
| Comparative Examples 3, 16 | Amorphous $Li_2FeP_2O_7$ | 7.4 g lithium carbonate; 11.6 g ferrous carbonate; 23.0 g ammonium dihydrogen phosphate; 12.6 g oxalic acid dihydrate; pH being controlled to 5 |
| Comparative Example 11, 13 to 15, 17-18; Examples 1-14, 19, 21-29 | crystalline $Li_2FeP_2O_7$ | 7.4 g lithium carbonate; 11.6 g ferrous carbonate; 23.0 g ammonium dihydrogen phosphate; 12.6 g oxalic acid dihydrate; pH being controlled to 5 |
| Examples 15-16 | crystalline $Al_4(P_2O_7)_3$ | 53.3 g aluminum chloride; 34.5 g ammonium dihydrogen phosphate; 18.9 g oxalic acid dihydrate; pH being controlled to 4 |
| Examples 17-18, 20 | crystalline $Li_2NiP_2O_7$ | 7.4 g lithium carbonate; 11.9 g nickel carbonate; 23.0 g ammonium dihydrogen phosphate; 12.6 g oxalic acid dihydrate; pH being controlled to 5 |

TABLE 3

| | | | Cladding of the first cladding layer (Step S4) | | | | |
|---|---|---|---|---|---|---|---|
| | Material for a first cladding layer and its amount (based on the weight of the core) | | Step S4: Cladding of the first cladding layer | | | | |
| No. | | The addition amount of the core in step S4 | The amount of corresponding cladding material in suspension for a first cladding layer | Mixing time (hour) | Drying temperature (° C.) | Sintering temperature (° C.) | Sintering time (hour) |
| Comparative Example 3 | 2% amorphous $Li_2FeP_2O_7$ | 1570.4 g | 31.4 g | 6 | 120 | 500 | 4 |
| Comparative Example 11 | 1% crystalline $Li_2FeP_2O_7$ | 1571.1 g | 15.7 g | 6 | 120 | 650 | 6 |
| Comparative Example 13 | 2% crystalline $Li_2FeP_2O_7$ | 1568.5 g | 31.4 g | 6 | 120 | 650 | 6 |
| Comparative Example 14 | 2% crystalline $Li_2FeP_2O_7$ | 1562.8 g | 31.2 g | 6 | 120 | 650 | 6 |
| Comparative Example 15 | 2% crystalline $Li_2FeP_2O_7$ | 1570.6 g | 31.4 g | 6 | 120 | 650 | 6 |
| Comparative Example 16 | 2% amorphous $Li_2FeP_2O_7$ | 1571.1 g | 31.4 g | 6 | 120 | 500 | 4 |
| Comparative Example 17 | 2% crystalline $Li_2FeP_2O_7$ | 1571.1 g | 31.4 g | 6 | 120 | 650 | 6 |
| Comparative Example 18 | 1% crystalline $Li_2FeP_2O_7$ | 1571.9 g | 15.7 g | 6 | 120 | 650 | 6 |
| Examples 1-4,8-10 | 1% crystalline $Li_2FeP_2O_7$ | 1571.9 g | 15.7 g | 6 | 120 | 650 | 6 |
| Example 5 | 2% crystalline $Li_2FeP_2O_7$ | 1571.9 g | 31.4 g | 6 | 120 | 650 | 6 |
| Example 6 | 3% crystalline $Li_2FeP_2O_7$ | 1571.1 g | 47.1 g | 6 | 120 | 650 | 6 |
| Example 7 | 5% crystalline $Li_2FeP_2O_7$ | 1571.9 g | 78.6 g | 6 | 120 | 650 | 6 |
| Example 11 | 1% crystalline $Li_2FeP_2O_7$ | 1572.1 g | 15.7 g | 6 | 120 | 650 | 6 |
| Example 12 | 1% crystalline $Li_2FeP_2O_7$ | 1571.7 g | 15.7 g | 6 | 120 | 650 | 6 |
| Example 13 | 2% crystalline $Li_2FeP_2O_7$ | 1571.4 g | 31.4 g | 6 | 120 | 650 | 6 |
| Example 14 | 2.5% crystalline $Li_2FeP_2O_7$ | 1571.9 g | 39.3 g | 6 | 120 | 650 | 6 |
| Example 15 | 2% crystalline $Al_4(P_2O_7)3$ | 1571.9 g | 31.4 g | 6 | 120 | 680 | 8 |
| Example 16 | 3% crystalline $Al_4(P_2O_7)3$ | 1571.9 g | 47.2 g | 6 | 120 | 680 | 8 |
| Example 17 | 1.5% crystalline $Li_2NiP_2O_7$ | 1571.9 g | 23.6 g | 6 | 120 | 630 | 6 |
| Example 18 | 1% crystalline $Li_2NiP_2O_7$ | 1570.1 g | 15.7 g | 6 | 120 | 630 | 6 |
| Example 19 | 2% crystalline $Li_2FeP_2O_7$ | 1571.0 g | 31.4 g | 6 | 120 | 650 | 6 |
| Example 20 | 1% crystalline $Li_2NiP_2O_7$ | 1571.9 g | 15.7 g | 6 | 120 | 630 | 6 |
| Examples 21-24 | 2% crystalline $Li_2FeP_2O_7$ | 1572.1 g | 31.4 g | 6 | 120 | 650 | 6 |
| Example 22 | 5.50% crystalline $Li_2FeP_2O_7$ | 1572.1 g | 86.5 g | 6 | 120 | 650 | 6 |
| Example 25 | 1% crystalline $Li_2FeP_2O_7$ | 1573.0 g | 15.7 g | 6 | 120 | 650 | 6 |
| Example 26 | 1% crystalline $Li_2FeP_2O_7$ | 1568.6 g | 15.7 g | 6 | 120 | 650 | 6 |
| Example 27 | 1% crystalline $Li_2FeP_2O_7$ | 1569.2 g | 15.7 g | 6 | 120 | 650 | 6 |
| Example 28 | 2% crystalline $Li_2FeP_2O_7$ | 1573.9 g | 31.4 g | 6 | 120 | 650 | 6 |
| Example 29 | 2% crystalline $Li_2FeP_2O_7$ | 1564.1 g | 31.2 g | 6 | 120 | 650 | 6 |

TABLE 4

Preparation of the second cladding layer suspension (Step S5)

| No. | Material for the second cladding layer | Step S5: Preparation of suspension for a second cladding layer |
|---|---|---|
| Comparative Examples 12, 18; Examples 1-14, 18-19, 25-27 | crystalline LiFePO$_4$ | 3.7 g lithium carbonate; 11.6 g ferrous carbonate; 11.5 g ammonium dihydrogen phosphate; 12.6 g oxalic acid dihydrate |
| Comparative Examples 13-16; Examples 15, 17, 20, 21-24, 28-29 | crystalline LiCoPO$_4$ | 3.7 g lithium carbonate; 15.5 g cobalt sulfate; 11.5 g ammonium dihydrogen phosphate; 12.6 g oxalic acid dihydrate |
| Comparative Example 17 | amorphous LiCoPO$_4$ | 3.7 g lithium carbonate; 15.5 g cobalt sulfate; 11.5 g ammonium dihydrogen phosphate; 12.6 g oxalic acid dihydrate |
| Example 16 | crystalline LiNiPO$_4$ | 3.7 g lithium carbonate; 11.9 g nickel carbonate; 11.5 g ammonium dihydrogen phosphate; 12.6 g oxalic acid dihydrate |

TABLE 5

Cladding of the second cladding layer (Step S6)

| No. | Material for a second cladding layer and its amount (based on the weight of the core) | Addition amount of pyrophosphate-coated material in step S6 (g) | The amount of corresponding cladding material in suspension for a second cladding layer (g) | Mixing time (hour) | Drying temperature (° C.) | Sintering temperature (° C.) | Sintering time (hour) |
|---|---|---|---|---|---|---|---|
| Comparative Example 12 | 3% crystalline LiFePO$_4$ | 1571.1 | 47.1 | 6 | 120 | 700 | 8 |
| Comparative Example 13 | 4% crystalline LiCoPO$_4$ | 1599.9 | 62.7 | 6 | 120 | 750 | 8 |
| Comparative Example 14 | 4% crystalline LiCoPO$_4$ | 1594.0 | 62.5 | 6 | 120 | 750 | 8 |
| Comparative Example 15 | 4% crystalline LiCoPO$_4$ | 1602.0 | 62.8 | 6 | 120 | 750 | 8 |
| Comparative Example 16 | 4% crystalline LiCoPO$_4$ | 1602.5 | 62.8 | 6 | 120 | 750 | 8 |
| Comparative Example 17 | 4% amorphous LiCoPO$_4$ | 1602.5 | 62.8 | 6 | 120 | 650 | 8 |
| Comparative Example 18 | 3% crystalline LiFePO$_4$ | 1586.8 | 47.1 | 6 | 120 | 700 | 8 |
| Examples 1-4 | 3% crystalline LiFePO$_4$ | 1586.8 | 47.1 | 6 | 120 | 700 | 8 |
| Example 5 | 3% crystalline LiFePO$_4$ | 1602.5 | 47.1 | 6 | 120 | 700 | 8 |
| Example 6 | 3% crystalline LiFePO$_4$ | 1618.2 | 47.1 | 6 | 120 | 700 | 8 |
| Example 7 | 3% crystalline LiFePO$_4$ | 1649.6 | 47.1 | 6 | 120 | 700 | 8 |
| Example 8 | 1% crystalline LiFePO$_4$ | 1586.8 | 15.7 | 6 | 120 | 700 | 8 |
| Example 9 | 4% crystalline LiFePO$_4$ | 1586.8 | 62.8 | 6 | 120 | 700 | 8 |
| Example 10 | 5% crystalline LiFePO$_4$ | 1586.8 | 78.6 | 6 | 120 | 700 | 8 |
| Example 11 | 2.50% crystalline LiFePO$_4$ | 1587.8 | 39.3 | 6 | 120 | 700 | 8 |
| Example 12 | 3% crystalline LiFePO$_4$ | 1587.4 | 47.2 | 6 | 120 | 700 | 8 |
| Example 13 | 2% crystalline LiFePO$_4$ | 1602.8 | 31.4 | 6 | 120 | 700 | 8 |
| Example 14 | 3.50% crystalline LiFePO$_4$ | 1610.5 | 55.0 | 6 | 120 | 700 | 8 |
| Example 15 | 2.5% crystalline LiCoPO$_4$ | 1603.3 | 39.3 | 6 | 120 | 750 | 8 |
| Example 16 | 3% crystalline LiNiPO$_4$ | 1619.0 | 47.2 | 6 | 120 | 680 | 8 |

TABLE 5-continued

Cladding of the second cladding layer (Step S6)

| No. | Material for a second cladding layer and its amount (based on the weight of the core) | Addition amount of pyrophosphate-coated material in step S6 (g) | The amount of corresponding cladding material in suspension for a second cladding layer (g) | Mixing time (hour) | Drying temperature (° C.) | Sintering temperature (° C.) | Sintering time (hour) |
|---|---|---|---|---|---|---|---|
| Example 17 | 2.5% crystalline LiCoPO$_4$ | 1595.5 | 39.3 | 6 | 120 | 750 | 8 |
| Example 18 | 3% crystalline LiFePO$_4$ | 1585.9 | 47.1 | 6 | 120 | 700 | 8 |
| Example 19 | 4% crystalline LiFePO$_4$ | 1602.4 | 62.8 | 6 | 120 | 700 | 8 |
| Example 20 | 3% crystalline LiCoPO$_4$ | 1587.7 | 47.2 | 6 | 120 | 750 | 8 |
| Example 21 | 4% crystalline LiCoPO$_4$ | 1603.5 | 62.9 | 6 | 120 | 750 | 8 |
| Example 22 | 4% crystalline LiCoPO$_4$ | 1658.6 | 62.9 | 6 | 120 | 750 | 8 |
| Example 23 | 5.50% crystalline LiCoPO$_4$ | 1603.5 | 86.5 | 6 | 120 | 750 | 8 |
| Example 24 | 4% crystalline LiCoPO$_4$ | 1603.5 | 62.9 | 6 | 120 | 750 | 8 |
| Example 25 | 3% crystalline LiFePO$_4$ | 1588.7 | 47.2 | 6 | 120 | 700 | 8 |
| Example 26 | 3% crystalline LiFePO$_4$ | 1584.3 | 47.1 | 6 | 120 | 700 | 8 |
| Example 27 | 3% crystalline LiFePO$_4$ | 1584.9 | 47.1 | 6 | 120 | 700 | 8 |
| Example 28 | 4% crystalline LiCoPO$_4$ | 1605.4 | 63.0 | 6 | 120 | 750 | 8 |
| Example 29 | 4% crystalline LiCoPO$_4$ | 1605.4 | 63.0 | 6 | 120 | 750 | 8 |

Note:
Comparative Example 12 relates to the amount of the added core.

TABLE 6

Cladding of the third cladding layer (Step S8)

| No. | Material for a third cladding layer | Molar ratio of SP2 to SP3 | Addition amount of material that has been covered with two layers in step S8 (g) | Amount of sucrose (g) | Mixing time (hour) | Drying temperature (° C.) | Sintering temperature (° C.) | Sintering time (hour) |
|---|---|---|---|---|---|---|---|---|
| Comparative Example 1 | 1% carbon | 2.5 | 1568.5 | 37.3 | 6 | 150 | 650 | 8 |
| Comparative Example 2 | 2% carbon | 2.8 | 1572.2 | 74.7 | 6 | 150 | 680 | 8 |
| Comparative Example 3 | 2% carbon | 2.7 | 1601.8 | 74.6 | 6 | 150 | 680 | 7 |
| Comparative Example 4 | 1% carbon | 2.4 | 1571.0 | 37.3 | 6 | 150 | 630 | 8 |
| Comparative Example 5 | 1.5% carbon | 2.6 | 1570.6 | 56.0 | 6 | 150 | 650 | 7 |
| Comparative Example 6 | 2.5% carbon | 2.8 | 1573.6 | 93.4 | 6 | 150 | 680 | 8 |
| Comparative Example 7 | 1% carbon | 2.7 | 1572.2 | 37.3 | 6 | 150 | 680 | 7 |
| Comparative Example 8 | 1.5% carbon | 2.9 | 1571.1 | 56.0 | 6 | 150 | 680 | 10 |
| Comparative Example 9 | 1% carbon | 2.2 | 1572.2 | 37.3 | 6 | 150 | 600 | 8 |
| Comparative Example 10 | 1% carbon | 2.4 | 1571.1 | 37.3 | 6 | 150 | 630 | 8 |
| Comparative Example 11 | 1% carbon | 2.3 | 1586.8 | 37.3 | 6 | 150 | 620 | 8 |

TABLE 6-continued

Cladding of the third cladding layer (Step S8)

| No. | Material for a third cladding layer | Molar ratio of SP2 to SP3 | Addition amount of material that has been covered with two layers in step S8 (g) | Step S8: Cladding of the third cladding layer | | | | |
|---|---|---|---|---|---|---|---|---|
| | | | | Amount of sucrose (g) | Mixing time (hour) | Drying temperature (° C.) | Sintering temperature (° C.) | Sintering time (hour) |
| Comparative Example 12 | 1% carbon | 2.1 | 1618.2 | 37.3 | 6 | 150 | 600 | 6 |
| Comparative Example 13 | 1% carbon | 2 | 1662.6 | 37.3 | 6 | 120 | 600 | 6 |
| Comparative Example 14 | 1% carbon | 1.8 | 1656.5 | 37.1 | 6 | 120 | 600 | 6 |
| Comparative Example 15 | 1% carbon | 1.7 | 1664.8 | 37.3 | 6 | 100 | 600 | 6 |
| Comparative Example 16 | 1% carbon | 3.1 | 1665.4 | 37.3 | 6 | 150 | 700 | 10 |
| Comparative Example 17 | 1% carbon | 3.5 | 1665.4 | 37.3 | 6 | 150 | 750 | 10 |
| Comparative Example 18 | 1% carbon | 2.2 | 1633.9 | 37.3 | 6 | 150 | 700 | 10 |
| Example 1 | 1% carbon | 2.2 | 1633.9 | 37.3 | 6 | 150 | 700 | 10 |
| Example 2 | 3% carbon | 2.3 | 1633.9 | 111.9 | 6 | 150 | 600 | 9 |
| Example 3 | 4% carbon | 2.1 | 1633.9 | 149.2 | 6 | 150 | 600 | 6 |
| Example 4 | 5% carbon | 2.4 | 1633.9 | 186.5 | 6 | 150 | 630 | 8 |
| Example 5 | 1% carbon | 2.5 | 1649.6 | 37.3 | 6 | 150 | 650 | 8 |
| Example 6 | 1% carbon | 2.5 | 1665.3 | 37.3 | 6 | 150 | 650 | 8 |
| Example 7 | 1% carbon | 2.4 | 1696.7 | 37.3 | 6 | 150 | 630 | 8 |
| Example 8 | 1% carbon | 2.3 | 1602.5 | 37.3 | 6 | 150 | 600 | 9 |
| Example 9 | 1% carbon | 2.2 | 1649.6 | 37.3 | 6 | 150 | 600 | 8 |
| Example 10 | 1% carbon | 2.2 | 1665.3 | 37.3 | 6 | 150 | 600 | 9 |
| Example 11 | 1.5% carbon | 2.3 | 1629.0 | 56.1 | 6 | 150 | 600 | 9 |
| Example 12 | 2% carbon | 2.4 | 1634.6 | 74.7 | 6 | 150 | 630 | 8 |
| Example 13 | 2% carbon | 2.5 | 1634.2 | 74.6 | 6 | 150 | 650 | 8 |
| Example 14 | 2.5% carbon | 2.7 | 1665.5 | 93.3 | 6 | 150 | 680 | 7 |
| Example 15 | 2% carbon | 2.8 | 1642.6 | 74.7 | 6 | 150 | 680 | 8 |
| Example 16 | 1% carbon | 2.7 | 1666.2 | 37.3 | 6 | 150 | 680 | 7 |
| Example 17 | 1.5% carbon | 2.3 | 1634.8 | 56.0 | 6 | 150 | 600 | 9 |
| Example 18 | 1% carbon | 2.6 | 1633.0 | 37.3 | 6 | 150 | 650 | 7 |
| Example 19 | 1.5% carbon | 2.4 | 1665.2 | 56.0 | 6 | 150 | 630 | 8 |
| Example 20 | 1.5% carbon | 2.2 | 1634.8 | 56.0 | 6 | 150 | 600 | 9 |
| Example 21 | 1% carbon | 2.2 | 1666.4 | 37.3 | 6 | 150 | 600 | 9 |
| Example 22 | 1% carbon | 2.3 | 1721.4 | 37.3 | 6 | 150 | 600 | 9 |
| Example 23 | 1% carbon | 2.4 | 1690.0 | 37.3 | 6 | 150 | 630 | 8 |
| Example 24 | 5.5% carbon | 2.6 | 1666.4 | 205.4 | 6 | 150 | 650 | 7 |
| Example 25 | 1% carbon | 2.4 | 1635.9 | 37.4 | 6 | 150 | 630 | 8 |
| Example 26 | 1% carbon | 2.3 | 1631.3 | 37.3 | 6 | 150 | 600 | 9 |
| Example 27 | 1.5% carbon | 2.1 | 1631.9 | 55.9 | 6 | 150 | 600 | 6 |
| Example 28 | 1% carbon | 0.07 | 1668.3 | 37.4 | 6 | 80 | 600 | 6 |
| Example 29 | 1% carbon | 13 | 1668.3 | 37.4 | 6 | 150 | 850 | 10 |

Note:
Comparative Examples 1-2 and 4-10 relate to the amount of the added core, Comparative Examples 3 and 11 relate to the amount of the added material which has been covered by the first layer.

TABLE 7

Investigation of materials for the first cladding layer

| No. | Materials for a first cladding layer | Preparation of suspension for a first cladding layer |
|---|---|---|
| Example 30 | crystalline $Li_2MgP_2O_7$ | Dissolving 7.4 g lithium carbonate, 8.4 g magnesium carbonate, 23.0 g ammonium dihydrogen phosphate and 12.6 g oxalic acid dihydrate in 500 mL of deionized water with a controlled pH of 5, and then stirring and fully reacting for 2 hours to obtain a solution, after which the solution was warmed to 80° C. and maintained at this temperature for 4 hours to obtain a suspension |
| Example 31 | crystalline $Li_2CoP_2O_7$ | Dissolving 7.4 g lithium carbonate, 15.5 g cobalt sulfate, 23.0 g ammonium dihydrogen phosphate and 12.6 g oxalic acid dihydrate in 500 mL of deionized water with a controlled pH of 5, and then stirring and fully reacting for 2 hours to obtain a solution, after which the solution was warmed to 80° C. and maintained at this temperature for 4 hours to obtain a suspension |

TABLE 7-continued

Investigation of materials for the first cladding layer

| No. | Materials for a first cladding layer | Preparation of suspension for a first cladding layer |
|---|---|---|
| Example 32 | crystalline $Li_2CuP_2O_7$ | Dissolving 7.4 g lithium carbonate, 16.0 g copper sulfate, 23.0 g ammonium dihydrogen phosphate and 12.6 g oxalic acid dihydrate in 500 mL of deionized water with a controlled pH of 5, and then stirring and fully reacting for 2 hours to obtain a solution, after which the solution was warmed to 80° C. and maintained at this temperature for 4 hours to obtain a suspension |
| Example 33 | crystalline $Li_2ZnP_2O_7$ | Dissolving 7.4 g lithium carbonate, 12.5 g zinc carbonate, 23.0 g ammonium dihydrogen phosphate and 12.6 g oxalic acid dihydrate in 500 mL of deionized water with a controlled pH of 5, and then stirring and fully reacting for 2 hours to obtain a solution, after which the solution was warmed to 80° C. and maintained at this temperature for 4 hours to obtain a suspension |
| Example 34 | crystalline $TiP_2O_7$ | Dissolving 24.0 g titanium sulfate, 23.0 g ammonium dihydrogen phosphate and 12.6 g oxalic acid dihydrate in 500 mL of deionized water with a controlled pH of 5, and then stirring and fully reacting for 2 hours to obtain a solution, after which the solution was warmed to 80° C. and maintained at this temperature for 4 hours to obtain a suspension |
| Example 35 | crystalline $Ag_4P_2O_7$ | Dissolving 67.9 g silver Nitrate, 23.0 g ammonium dihydrogen phosphate and 25.2 g oxalic acid dihydrate in 500 mL of deionized water with a controlled pH of 5, and then stirring and fully reacting for 2 hours to obtain a solution, after which the solution was warmed to 80° C. and maintained at this temperature for 4 hours to obtain a suspension |
| Example 36 | crystalline $ZrP_2O_7$ | Dissolving 56.6 g zirconium sulfate, 23.0 g ammonium dihydrogen phosphate and 25.2 g oxalic acid dihydrate in 500 mL of deionized water with a controlled pH of 5, and then stirring and fully reacting for 2 hours to obtain a solution, after which the solution was warmed to 80° C. and maintained at this temperature for 4 hours to obtain a suspension |

TABLE 8

Investigation of materials for the second cladding layer

| No. | Materials for the second cladding layer | Preparation of suspension for the second cladding layer |
|---|---|---|
| Example 37 | crystalline $Cu_3(PO_4)_2$ | Dissolving 48.0 g copper sulfate, 23.0 g ammonium dihydrogen phosphate, 37.8 g oxalic acid dihydrate in 1500 mL of deionized water, then stirring and fully reacting for 6 hours to obtain a solution, after which the solution was heated to 120° C. and maintained at this temperature for 6 hours to obtain a suspension |
| Example 38 | crystalline $Zn_3(PO_4)_2$ | Dissolving 37.6 g zinc carbonate, 23.0 g ammonium dihydrogen phosphate and 37.8 g oxalic acid dihydrate in 1500 mL of deionized water, then stirring and fully reacting for 6 hours to obtain a solution, after which the solution was heated to 120° C. and maintained at this temperature for 6 hours to obtain a suspension |
| Example 39 | crystalline $Ti_3(PO_4)_4$ | Dissolving 72.0 g titanium sulfate, 46.0 g ammonium dihydrogen phosphate and 75.6 g oxalic acid dihydrate in 1500 mL of deionized water, then stirring and fully reacting for 6 hours to obtain a solution, after which the solution was heated to 120° C. and maintained at this temperature for 6 hours to obtain a suspension |
| Example 40 | crystalline $Ag_3PO_4$ | Dissolving 50.9 g silver Nitrate, 11.5 g ammonium dihydrogen phosphate and 18.9 g oxalic acid dihydrate in 1500 mL of deionized water, then stirring and fully reacting for 6 hours to obtain a solution, after which the solution was heated to 120° C. and maintained at this temperature for 6 hours to obtain a suspension |

TABLE 8-continued

Investigation of materials for the second cladding layer

| No. | Materials for the second cladding layer | Preparation of suspension for the second cladding layer |
| --- | --- | --- |
| Example 41 | crystalline $Zr_3(PO_4)_4$ | Dissolving 85.0 g zirconium sulfate, 46.0 g ammonium dihydrogen phosphate and 37.8 g oxalic acid dihydrate in 1500 mL of deionized water, then stirring and fully reacting for 6 hours to obtain a solution, after which the solution was heated to 120° C. and maintained at this temperature for 6 hours to obtain a suspension |
| Example 42 | crystalline $AlPO_4$ | Dissolving 13.3 g aluminum chloride, 11.5 g ammonium dihydrogen phosphate and 18.9 g oxalic acid dihydrate in 1500 mL of deionized water, then stirring and fully reacting for 6 hours to obtain a solution, after which the solution was heated to 120° C. and maintained at this temperature for 6 hours to obtain a suspension |

TABLE 9

Preparation of non-aqueous electrolytic solution (Step 4)

| No. | Preparation of non-aqueous electrolytic solution |
| --- | --- |
| Comparative Examples 1-18 | In an argon atmosphere glove box ($H_2O$ < 0.1 ppm, $O_2$ < 0.1 ppm), as an organic solvent, ethylene carbonate (EC), diethyl carbonate (DEC) and dimethyl carbonate (DMC) were mixed homogeneously at a volume ratio of 1:1:1, in which 12.5 wt % (based on the total weight of the non-aqueous electrolytic solution) of $LiPF_6$ was dissolved, and the resulting mixture was stirred homogeneously, to obtain a non-aqueous electrolytic solution. |
| Examples 1-42 | In an argon atmosphere glove box ($H_2O$ < 0.1 ppm, $O_2$ < 0.1 ppm), as an organic solvent, ethylene carbonate (EC), diethyl carbonate (DEC) and dimethyl carbonate (DMC) were mixed homogeneously at a volume ratio of 1:1:1, in which 12.5 wt % (based on the total weight of the non-aqueous electrolytic solution) of $LiPF_6$ and 2 wt % (based on the total weight of the non-aqueous electrolytic solution) of compound H12 were dissolved, and the resulting mixture was stirred homogeneously, to obtain a non-aqueous electrolytic solution. |
| Example 43 | In an argon atmosphere glove box ($H_2O$ < 0.1 ppm, $O_2$ < 0.1 ppm), as an organic solvent, ethylene carbonate (EC), diethyl carbonate (DEC) and dimethyl carbonate (DMC) were mixed homogeneously at a volume ratio of 1:1:1, in which 12.5 wt % (based on the total weight of the non-aqueous electrolytic solution) of $LiPF_6$ and 2 wt % (based on the total weight of the non-aqueous electrolytic solution) of compound H1 were dissolved, and the resulting mixture was stirred homogeneously, to obtain a non-aqueous electrolytic solution. |
| Example 44 | In an argon atmosphere glove box ($H_2O$ < 0.1 ppm, $O_2$ < 0.1 ppm), as an organic solvent, ethylene carbonate (EC), diethyl carbonate (DEC) and dimethyl carbonate (DMC) were mixed homogeneously at a volume ratio of 1:1:1, in which 12.5 wt % (based on the total weight of the non-aqueous electrolytic solution) of $LiPF_6$ and 2 wt % (based on the total weight of the non-aqueous electrolytic solution) of compound H2 were dissolved, and the resulting mixture was stirred homogeneously, to obtain a non-aqueous electrolytic solution. |
| Example 45 | In an argon atmosphere glove box ($H_2O$ < 0.1 ppm, $O_2$ < 0.1 ppm), as an organic solvent, ethylene carbonate (EC), diethyl carbonate (DEC) and dimethyl carbonate (DMC) were mixed homogeneously at a volume ratio of 1:1:1, in which 12.5 wt % (based on the total weight of the non-aqueous electrolytic solution) of $LiPF_6$ and 2 wt % (based on the total weight of the non-aqueous electrolytic solution) of compound H13 were dissolved, and the resulting mixture was stirred homogeneously, to obtain a non-aqueous electrolytic solution. |
| Example 46 | In an argon atmosphere glove box ($H_2O$ < 0.1 ppm, $O_2$ < 0.1 ppm), as an organic solvent, ethylene carbonate (EC), diethyl carbonate (DEC) and dimethyl carbonate (DMC) were mixed homogeneously at a volume ratio of 1:1:1, in which 12.5 wt % (based on the total weight of the non-aqueous electrolytic solution) of $LiPF_6$ and 2 wt % (based on the total weight of the non-aqueous electrolytic solution) of compound H14 were dissolved, and the resulting mixture was stirred homogeneously, to obtain a non-aqueous electrolytic solution. |
| Example 47 | In an argon atmosphere glove box ($H_2O$ < 0.1 ppm, $O_2$ < 0.1 ppm), as an organic solvent, ethylene carbonate (EC), diethyl carbonate (DEC) and dimethyl carbonate (DMC) were mixed homogeneously at a volume ratio of 1:1:1, in which 12.5 wt % (based on the total weight of the non-aqueous electrolytic solution) of $LiPF_6$ and 2 wt % (based on the total weight of the non-aqueous electrolytic solution) of compound H21 were dissolved, and the resulting mixture was stirred homogeneously, to obtain a non-aqueous electrolytic solution. |
| Example 48 | In an argon atmosphere glove box ($H_2O$ < 0.1 ppm, $O_2$ < 0.1 ppm), as an organic solvent, ethylene carbonate (EC), diethyl carbonate (DEC) and dimethyl carbonate (DMC) were mixed homogeneously at a volume ratio of 1:1:1, in which 12.5 wt % (based on the total weight of the non-aqueous electrolytic solution) of $LiPF_6$ and 2 wt % (based on the total weight of the non-aqueous electrolytic solution) of compound H29 were dissolved, and the resulting mixture was stirred homogeneously, to obtain a non-aqueous electrolytic solution. |

TABLE 9-continued

Preparation of non-aqueous electrolytic solution (Step 4)

| No. | Preparation of non-aqueous electrolytic solution |
|---|---|
| Example 49 | In an argon atmosphere glove box ($H_2O$ < 0.1 ppm, $O_2$ < 0.1 ppm), as an organic solvent, ethylene carbonate (EC), diethyl carbonate (DEC) and dimethyl carbonate (DMC) were mixed homogeneously at a volume ratio of 1:1:1, in which 12.5 wt % (based on the total weight of the non-aqueous electrolytic solution) of $LiPF_6$ and 2 wt % (based on the total weight of the non-aqueous electrolytic solution) of compound H33 were dissolved, and the resulting mixture was stirred homogeneously, to obtain a non-aqueous electrolytic solution. |
| Example 50 | In an argon atmosphere glove box ($H_2O$ < 0.1 ppm, $O_2$ < 0.1 ppm), as an organic solvent, ethylene carbonate (EC), diethyl carbonate (DEC) and dimethyl carbonate (DMC) were mixed homogeneously at a volume ratio of 1:1:1, in which 12.5 wt % (based on the total weight of the non-aqueous electrolytic solution) of $LiPF_6$ and 2 wt % (based on the total weight of the non-aqueous electrolytic solution) of compound H35 were dissolved, and the resulting mixture was stirred homogeneously, to obtain a non-aqueous electrolytic solution. |
| Example 51 | In an argon atmosphere glove box ($H_2O$ < 0.1 ppm, $O_2$ < 0.1 ppm), as an organic solvent, ethylene carbonate (EC), diethyl carbonate (DEC) and dimethyl carbonate (DMC) were mixed homogeneously at a volume ratio of 1:1:1, in which 12.5 wt % (based on the total weight of the non-aqueous electrolytic solution) of $LiPF_6$ and 2 wt % (based on the total weight of the non-aqueous electrolytic solution) of compound H36 were dissolved, and the resulting mixture was stirred homogeneously, to obtain a non-aqueous electrolytic solution. |
| Example 52 | In an argon atmosphere glove box ($H_2O$ < 0.1 ppm, $O_2$ < 0.1 ppm), as an organic solvent, ethylene carbonate (EC), diethyl carbonate (DEC) and dimethyl carbonate (DMC) were mixed homogeneously at a volume ratio of 1:1:1, in which 12.5 wt % (based on the total weight of the non-aqueous electrolytic solution) of $LiPF_6$ and 2 wt % (based on the total weight of the non-aqueous electrolytic solution) of compound H37 were dissolved, and the resulting mixture was stirred homogeneously, to obtain a non-aqueous electrolytic solution. |
| Example 53 | In an argon atmosphere glove box ($H_2O$ < 0.1 ppm, $O_2$ < 0.1 ppm), as an organic solvent, ethylene carbonate (EC), diethyl carbonate (DEC) and dimethyl carbonate (DMC) were mixed homogeneously at a volume ratio of 1:1:1, in which 12.5 wt % (based on the total weight of the non-aqueous electrolytic solution) of $LiPF_6$ and 2 wt % (based on the total weight of the non-aqueous electrolytic solution) of compound H38 were dissolved, and the resulting mixture was stirred homogeneously, to obtain a non-aqueous electrolytic solution. |
| Example 54 | In an argon atmosphere glove box ($H_2O$ < 0.1 ppm, $O_2$ < 0.1 ppm), as an organic solvent, ethylene carbonate (EC), diethyl carbonate (DEC) and dimethyl carbonate (DMC) were mixed homogeneously at a volume ratio of 1:1:1, in which 12.5 wt % (based on the total weight of the non-aqueous electrolytic solution) of $LiPF_6$ and 0.01 wt % (based on the total weight of the non-aqueous electrolytic solution) of compound H12 were dissolved, and the resulting mixture was stirred homogeneously, to obtain a non-aqueous electrolytic solution. |
| Example 55 | In an argon atmosphere glove box ($H_2O$ < 0.1 ppm, $O_2$ < 0.1 ppm), as an organic solvent, ethylene carbonate (EC), diethyl carbonate (DEC) and dimethyl carbonate (DMC) were mixed homogeneously at a volume ratio of 1:1:1, in which 12.5 wt % (based on the total weight of the non-aqueous electrolytic solution) of $LiPF_6$ and 0.1 wt % (based on the total weight of the non-aqueous electrolytic solution) of compound H12 were dissolved, and the resulting mixture was stirred homogeneously, to obtain a non-aqueous electrolytic solution. |
| Example 56 | In an argon atmosphere glove box ($H_2O$ < 0.1 ppm, $O_2$ < 0.1 ppm), as an organic solvent, ethylene carbonate (EC), diethyl carbonate (DEC) and dimethyl carbonate (DMC) were mixed homogeneously at a volume ratio of 1:1:1, in which 12.5 wt % (based on the total weight of the non-aqueous electrolytic solution) of $LiPF_6$ and 0.5 wt % (based on the total weight of the non-aqueous electrolytic solution) of compound H12 were dissolved, and the resulting mixture was stirred homogeneously, to obtain a non-aqueous electrolytic solution. |
| Example 57 | In an argon atmosphere glove box ($H_2O$ < 0.1 ppm, $O_2$ < 0.1 ppm), as an organic solvent, ethylene carbonate (EC), diethyl carbonate (DEC) and dimethyl carbonate (DMC) were mixed homogeneously at a volume ratio of 1:1:1, in which 12.5 wt % (based on the total weight of the non-aqueous electrolytic solution) of $LiPF_6$ and 1 wt % (based on the total weight of the non-aqueous electrolytic solution) of compound H12 were dissolved, and the resulting mixture was stirred homogeneously, to obtain a non-aqueous electrolytic solution. |
| Example 58 | In an argon atmosphere glove box ($H_2O$ < 0.1 ppm, $O_2$ < 0.1 ppm), as an organic solvent, ethylene carbonate (EC), diethyl carbonate (DEC) and dimethyl carbonate (DMC) were mixed homogeneously at a volume ratio of 1:1:1, in which 12.5 wt % (based on the total weight of the non-aqueous electrolytic solution) of $LiPF_6$ and 5 wt % (based on the total weight of the non-aqueous electrolytic solution) of compound H12 were dissolved, and the resulting mixture was stirred homogeneously, to obtain a non-aqueous electrolytic solution. |
| Example 59 | In an argon atmosphere glove box ($H_2O$ < 0.1 ppm, $O_2$ < 0.1 ppm), as an organic solvent, ethylene carbonate (EC), diethyl carbonate (DEC) and dimethyl carbonate (DMC) were mixed homogeneously at a volume ratio of 1:1:1, in which 12.5 wt % (based on the total weight of the non-aqueous electrolytic solution) of $LiPF_6$ and 10 wt % (based on the total weight of the non-aqueous electrolytic solution) of compound H12 were dissolved, and the resulting mixture was stirred homogeneously, to obtain a non-aqueous electrolytic solution. |
| Example 60 | In an argon atmosphere glove box ($H_2O$ < 0.1 ppm, $O_2$ < 0.1 ppm), as an organic solvent, ethylene carbonate (EC), diethyl carbonate (DEC) and dimethyl carbonate (DMC) were mixed homogeneously at a volume ratio of 1:1:1, in which 12.5 wt % (based on the total weight of the non-aqueous electrolytic solution) of $LiPF_6$ and 15 wt % (based on the total weight of the non-aqueous electrolytic solution) of compound H12 were dissolved, and the resulting mixture was stirred homogeneously, to obtain a non-aqueous electrolytic solution. |

TABLE 9-continued

Preparation of non-aqueous electrolytic solution (Step 4)

| No. | Preparation of non-aqueous electrolytic solution |
|---|---|
| Example 61 | In an argon atmosphere glove box ($H_2O$ < 0.1 ppm, $O_2$ < 0.1 ppm), as an organic solvent, ethylene carbonate (EC), diethyl carbonate (DEC) and dimethyl carbonate (DMC) were mixed homogeneously at a volume ratio of 1:1:1, in which 12.5 wt % (based on the total weight of the non-aqueous electrolytic solution) of $LiPF_6$ and 20 wt % (based on the total weight of the non-aqueous electrolytic solution) of compound H12 were dissolved, and the resulting mixture was stirred homogeneously, to obtain a non-aqueous electrolytic solution. |
| Example 62 | In an argon atmosphere glove box ($H_2O$ < 0.1 ppm, $O_2$ < 0.1 ppm), as an organic solvent, ethylene carbonate (EC), diethyl carbonate (DEC) and dimethyl carbonate (DMC) were mixed homogeneously at a volume ratio of 1:1:1, in which 12.5 wt % (based on the total weight of the non-aqueous electrolytic solution) of $LiPF_6$, 2 wt % (based on the total weight of the non-aqueous electrolytic solution) of compound H12 and 0.5 wt % (based on the total weight of the non-aqueous electrolytic solution) of VC were dissolved, and the resulting mixture was stirred homogeneously, to obtain a non-aqueous electrolytic solution. |
| Example 63 | In an argon atmosphere glove box ($H_2O$ < 0.1 ppm, $O_2$ < 0.1 ppm), as an organic solvent, ethylene carbonate (EC), diethyl carbonate (DEC) and dimethyl carbonate (DMC) were mixed homogeneously at a volume ratio of 1:1:1, in which 12.5 wt % (based on the total weight of the non-aqueous electrolytic solution) of $LiPF_6$, 2 wt % (based on the total weight of the non-aqueous electrolytic solution) of compound H12 and 0.5 wt % (based on the total weight of the non-aqueous electrolytic solution) of VEC were dissolved, and the resulting mixture was stirred homogeneously, to obtain a non-aqueous electrolytic solution. |
| Example 64 | In an argon atmosphere glove box ($H_2O$ < 0.1 ppm, $O_2$ < 0.1 ppm), as an organic solvent, ethylene carbonate (EC), diethyl carbonate (DEC) and dimethyl carbonate (DMC) were mixed homogeneously at a volume ratio of 1:1:1, in which 12.5 wt % (based on the total weight of the non-aqueous electrolytic solution) of $LiPF_6$, 2 wt % (based on the total weight of the non-aqueous electrolytic solution) of compound H12 and 0.5 wt % (based on the total weight of the non-aqueous electrolytic solution) of FEC were dissolved, and the resulting mixture was stirred homogeneously, to obtain a non-aqueous electrolytic solution. |
| Example 65 | In an argon atmosphere glove box ($H_2O$ < 0.1 ppm, $O_2$ < 0.1 ppm), as an organic solvent, ethylene carbonate (EC), diethyl carbonate (DEC) and dimethyl carbonate (DMC) were mixed homogeneously at a volume ratio of 1:1:1, in which 12.5 wt % (based on the total weight of the non-aqueous electrolytic solution) of $LiPF_6$, 2 wt % (based on the total weight of the non-aqueous electrolytic solution) of compound H12 and 0.5 wt % (based on the total weight of the non-aqueous electrolytic solution) of ethanedinitrile were dissolved, and the resulting mixture was stirred homogeneously, to obtain a non-aqueous electrolytic solution. |
| Example 66 | In an argon atmosphere glove box ($H_2O$ < 0.1 ppm, $O_2$ < 0.1 ppm), as an organic solvent, ethylene carbonate (EC), diethyl carbonate (DEC) and dimethyl carbonate (DMC) were mixed homogeneously at a volume ratio of 1:1:1, in which 12.5 wt % (based on the total weight of the non-aqueous electrolytic solution) of $LiPF_6$, 2 wt % (based on the total weight of the non-aqueous electrolytic solution) of compound H12 and 0.5 wt % (based on the total weight of the non-aqueous electrolytic solution) of ethoxypentafluorocyclotriphosphonitrile were dissolved, and the resulting mixture was stirred homogeneously, to obtain a non-aqueous electrolytic solution. |

II. Performance Evaluation

1. Determination of Lattice Change Rate

Under a constant temperature environment of 25° C., a positive electrode active material sample was placed in X-ray powder diffractometer (Bruker D8 Discover model) and tested at 1°/minute. The test data was organized and analyzed. Referring to the standard PDF card, the lattice constants a0, b0, c0, and v0 (a0, b0, and c0 represent the length size in individual directions of lattice cell, respectively, v0 represents the volume of lattice cell, which can be directly obtained through XRD refinement results) were calculated.

Using the preparation of button battery as shown in examples, the positive electrode active material sample was prepared into a button battery. The button battery was charged at a small rate of 0.05C until the current was decreased to 0.01C. Then the positive electrode plate was taken out of the button battery and soaked in dimethyl carbonate (DMC) for 8 hours. After drying and scraping the powder, the particles with a particle size less than 500 nm were obtained by sieving. A sample was taken and its lattice volume v1 was calculated in the same way as the fresh sample was tested above. (v0−v1)/v0×100% representing the lattice change rate (lattice volume change rate) of before and after complete de-intercalation and deintercalation of lithium was shown in the table.

2. Li/Mn Anti-Site Defect Concentration

The XRD results measured in the "Measurement method for lattice change rate" were compared with the PDF (Powder Diffusion File) card of standard crystal to obtain the Li/Mn anti-site defect concentration. Specifically, the XRD results tested in the "Measurement method for lattice change rate" were imported into the General Structural Analysis System (GSAS) software to automatically obtain refined results, which include the occupancy of different atoms. The Li/Mn anti-site defect concentration was obtained by reading the refined results.

3. Compaction Density 5 g of the above prepared positive electrode active material powders were taken and placed in a special mold for compaction (CARVER mold in the United States, model 13 mm), and then the mold was placed on a compaction density instrument. 3 T (tonnes) of pressure was applied and thickness of powders under the pressure was read on the equipment (i.e. the thickness after the pressure is removed, the area of the container used for testing being 1540.25 $mm^2$). The compaction density was calculated via $\rho=m/v$.

4. Determination of Specific Surface Area:

5 g of the above prepared positive electrode active material powder was taken and tested by using Tri-Star 3020 specific surface area pore size analysis tester from Micromeritics, USA. The specific surface area was calculated by BET (Brunauer Emmett Teller) method. The testing standard was based on GB/T 19587-2017.

5. Determination of Surface Oxygen Valence 5 g of the above prepared positive electrode active material sample was taken and prepared into a button battery according to the preparation of button battery as described in examples. The button battery was charged at a low rate of 0.05C until the current decreased to 0.01C. Then the positive electrode plate was taken out the button battery and soaked in dimethyl carbonate (DMC) for 8 hours. After drying and scraping the powder, the particles with a particle size less than 500 nm were obtained by sieving. The obtained particles were measured with Electron Energy Loss Spectroscopy (EELS, Talos F200S model) to obtain the energy loss near edge structure (ELNES), which can reflect the state density and energy level distribution of elements. Based on the density of states and energy level distribution, the number of occupied electrons was calculated by integrating the density of states in valence band, thereby calculating the surface oxygen valence after charge.

6. Determination of Leaching Out of Transition Metal Mn (and Fe Doped at Mn Site)

At 45° C., a full battery prepared in the above Examples and Comparative Examples with capacity reduced to 80% was discharged to 2.0 V of cutoff voltage at a rate of 0.1 C. Then the battery was disassembled, the negative electrode plate was taken out. 30 discs having a unit area (1540.25 mm$^2$) were randomly taken on the negative electrode plate. Inductively coupled plasma emission spectrum (ICP) was tested by using Agilent ICP-OES730. The amounts of Fe (if Fe was doped at Mn site of the positive electrode active material) and of Mn were calculated on the basis of the ICP results, and then the amount of leaching out of Mn (and Fe doped at Mn site) after cycle was calculated. The testing standard was based on EPA-6010D-2014.

7. Measurement of Manganese and Phosphorus in Positive Electrode Active Material 5 g of the positive electrode active material made above was dissolved in 100 mL of Lefort aqua regia (i.e. a mixture of concentrated hydrochloric acid and concentrated nitric acid with a ratio of 1:3), the content of each element in the solution was tested using ICP, and then the content of manganese element or the phosphorus element was measured and converted (amount of manganese element or phosphorus element/amount of positive electrode active material×100%), to obtain its weight percentage.

8. Determination of Initial Specific Capacity of Button Battery

The above prepared button battery in each of the Examples and Comparative Examples was charged to 4.3V at 0.1C, then charged at a constant voltage of 4.3V until the current was less than or equal to 0.05 mA. The button battery was allowed to stand for 5 minutes and then was discharged at 0.1C to 2.0V. The discharge capacity measured at this moment was initial specific capacity, denoted as D0.

9. 3C Charge Constant Current Ratio

Under a constant temperature environment of 25° C., the above prepared fresh button battery in each of the Examples and Comparative Examples was allowed to stand for 5 minutes, then was discharged to 2.5V at ⅓C, then was allowed to stand for 5 minutes, then charged to 4.3 V at ⅓C, then was charged at a constant voltage of 4.3V until the current was less than or equal to 0.05 mA, then was allowed to stand for 5 minutes. The charge capacity at the moment was recorded as C0. The button battery was then discharged to 2.5V at ⅓C, was allowed to stand for 5 minutes and then charged to 4.3V at 3C and was allowed to stand for 5 minutes. The charge capacity at the moment was recorded as C1. A 3C charge constant current ratio was C1/C0×100%.

A higher 3C charge constant current ratio indicates that the secondary battery had a better rate performance.

10. Test of Expansion of Full Battery Upon Storage at 60° C. for 30 Days

The above prepared full battery in the Examples and Comparative Examples was stored at 100% state of charge (SOC) at 60° C. Before, during, and after storage, open circuit voltage (OCV) and AC internal impedance (IMP) of the battery were tested to monitor SOC and volume of the battery was measured. After every 48 hours of storage, the full battery was taken out and allowed to stand for 1 hour, and then open circuit voltage (OCV) and internal impedance (IMP) were tested. After it was cooled to room temperature, volume of the battery was measured using a drainage method. The drainage method included measuring gravity F1 of the battery alone with a balance that can automatically perform unit conversion with a dial data, and then placing the battery completely in deionized water (with a density of 1 g/cm$^3$), measuring gravity $F_2$ of the battery at this moment wherein a buoyant force $F_b$ of the battery was $F_1-F_2$, and then according to the Archimedes principle $F_b=\rho \times g \times V$, the volume of the battery was calculated: $V=(F_1-F_2)/(\rho \times g)$.

From the OCV and IMP test results, it can be seen that the batteries of the examples maintain a SOC of 99% or higher throughout the testing process until the end of storage.

After 30 days of storage, the volume of battery was measured, and the increased percentage in battery volume after storage compared to the previous battery volume was calculated.

11. Test of Cycle Performance at 45° C. of Full Battery

Under a constant temperature environment of 45° C., the above prepared full battery was charged at 1C to 4.3V, and then charged at a constant voltage at 4.3V until the current was less than or equal to 0.05 mA. The full battery was allowed to stand for 5 minutes, then discharged at 1C to 2.5V. The discharge capacity at this moment was reported as D0. The above charge-discharge cycle was repeated until the discharge capacity was reduced to 80% of D0. The number of cycles that the battery had undergone at this moment was recorded, i.e. cycle number corresponding to 80% capacity retention at 45° C.

12. Test of Crystal Plane Spacing and Orientation Angle:

1 g of the above prepared positive electrode active material powder each was placed in a 50 mL test tube, to which 10 mL of alcohol with 75% by mass was injected, and then it was subjected to sufficient stirring and dispersion for 30 minutes. And then an appropriate amount of the above solution was dropped on ta 300-mesh copper mesh with a clean disposable plastic pipette. At this time, some of the powder would be left on the copper mesh, and then the copper mesh with samples would be transferred to a TEM (Talo F200s G2) sample chamber for testing, thereby obtaining original images of TEM testing.

The above TEM images were opened in DigitalMicrograph software and subjected to Fourier transform (automatically done by the software after clicking the operation) to get a diffraction pattern, the distance from the diffracted spot to the center of diffraction pattern was measured to get a crystal plane spacing, and the orientation angle was calculated according to the Bragg's equation.

A cladding layer could be recognized for different substances contained therein by comparing the resulting data of crystal plane spacing and corresponding orientation angle with their standard values.

13. Test of Thickness of Cladding Layer

A cladding layer was tested for its thickness by FIB by cutting a thin slice of about 100 nm thickness from an individual particle of the positive electrode active material as described above at its middle position, and then subjecting the thin slice to a TEM test, to obtain an original image of TEM.

The original image obtained from the above TEM test was opened in DigitalMicrograph software, and the cladding layer was recognized by the lattice spacing and orientation angle information and then measured for its thickness.

The thickness was measured at three locations for the selected particles and averaged.

14. Determination of a Molar Ratio of the SP2 and SP3 Carbon in a Third Cladding Layer This test was carried out by Raman spectroscopy. A molar ratio of the two carbons was determined by splitting energy spectrum from the Raman test to obtain $I_d/I_g$ in which $I_d$ was a peak intensity of the carbon in the SP3 form and $I_g$ was a peak intensity of the carbon in the SP2 form.

15. Determination of the Chemical Formula of Core and the Compositions of Different Cladding Layers The internal microstructure and surface structure of the positive electrode active material were characterized with high spatial resolution by a spherical Aberration Corrected Scanning Transmission Electron Microscope (ACSTEM). By combining with a three-dimensional reconstruction technology, the chemical formula of the core and the compositions of the cladding layers each of the positive electrode active material were obtained.

Table 10 illustrates properties of the positive electrode active material powder and properties of the prepared positive electrode plates and batteries in Examples 1-42 and Comparative Examples 1-18.

Table 11 illustrates a thickness of each cladding layer and a weight ratio of manganese and phosphorus elements of the positive electrode active materials prepared in Examples 1-14 and Comparative Examples 3-4 and 12.

Table 12 illustrates a crystal plane spacing and orientation angle of materials for a first cladding layer and of materials for a second cladding layer in Examples 1, 30-42.

TABLE 10

| No. | Lattice change rate (%) | Li/Mn anti-site defect concentration (%) | Compaction density (g/cm³) | surface oxygen valence | Specific surface area of positive electrode active material (m²/g) | leaching out of Fe and Mn (ppm) after cycle | 3 C charge constant current ratio | 0.1 C capacity of button battery (mAh/g) | Battery expansion after storage at 60° C. for 30 d (V) | Cycle numbers corresponding to 80% capacity retention at 45° C. (%) |
|---|---|---|---|---|---|---|---|---|---|---|
| Comparative Example 1 | 11.4 | 5.2 | 1.5 | −1.55 | 15 | 2060 | 50.1 | 125.6 | 48.6 | 185 |
| Comparative Example 2 | 10.6 | 3.3 | 1.67 | −1.51 | 15 | 1810 | 54.9 | 126.4 | 47.3 | 243 |
| Comparative Example 3 | 10.8 | 3.4 | 1.64 | −1.64 | 15 | 1728 | 52.1 | 144.7 | 41.9 | 378 |
| Comparative Example 4 | 4.3 | 2.8 | 1.69 | −1.82 | 15 | 1096 | 56.3 | 151.2 | 8.4 | 551 |
| Comparative Example 5 | 2.8 | 2.5 | 1.65 | −1.85 | 15 | 31 | 58.2 | 148.4 | 7.5 | 668 |
| Comparative Example 6 | 3.4 | 2.4 | 1.61 | −1.86 | 15 | 64 | 58.4 | 149.6 | 8.6 | 673 |
| Comparative Example 7 | 4.5 | 2.4 | 1.73 | −1.83 | 15 | 85 | 59.2 | 148.6 | 8.3 | 669 |
| Comparative Example 8 | 2.3 | 2.4 | 1.68 | −1.89 | 15 | 30 | 59.3 | 152.3 | 7.3 | 653 |
| Comparative Example 9 | 2.3 | 2.4 | 1.75 | −1.89 | 15 | 30 | 59.8 | 152.3 | 7.3 | 672 |
| Comparative Example 10 | 2.3 | 2.2 | 1.81 | −1.9 | 15 | 28 | 64.1 | 154.2 | 7.2 | 685 |
| Comparative Example 11 | 2.3 | 2.2 | 1.92 | −1.92 | 15 | 12 | 65.4 | 154.3 | 5.4 | 985 |
| Comparative Example 12 | 2.3 | 2.1 | 1.95 | −1.95 | 15 | 18 | 65.5 | 154.6 | 4.2 | 795 |
| Comparative Example 13 | 11.4 | 5.2 | 1.63 | −1.96 | 15 | 56 | 52.4 | 130.2 | 5.4 | 562 |
| Comparative Example 14 | 8.1 | 3.8 | 1.76 | −1.96 | 15 | 41 | 58.3 | 135.1 | 5.1 | 631 |

TABLE 10-continued

| No. | Lattice change rate (%) | Li/Mn anti-site defect concentration (%) | Compaction density (g/cm³) | surface oxygen valence | Specific surface area of positive electrode active material (m²/g) | leaching out of Fe and Mn (ppm) after cycle | 3 C charge constant current ratio (mAh/g) | 0.1 C capacity of button battery (V) | Battery expansion after storage at 60° C. for 30 d (%) | Cycle numbers corresponding to 80% capacity retention at 45° C. |
|---|---|---|---|---|---|---|---|---|---|---|
| Comparative Example 15 | 2 | 1.8 | 2.13 | −1.96 | 15 | 8 | 61.3 | 154.3 | 3.7 | 1126 |
| Comparative Example 16 | 2 | 1.9 | 1.95 | −1.96 | 15 | 18 | 60.5 | 152.7 | 4.5 | 1019 |
| Comparative Example 17 | 2 | 1.9 | 1.9 | −1.89 | 15 | 24 | 60.4 | 152.4 | 5.1 | 897 |
| Comparative Example 18 | 2.5 | 1.8 | 2.35 | −1.93 | 15 | 7 | 70.3 | 157.2 | 4.2 | 1128 |
| Example 1 | 2.5 | 1.8 | 2.35 | −1.93 | 15 | 5 | 84.4 | 163.5 | 2.1 | 1579 |
| Example 2 | 2.5 | 1.8 | 2.24 | −1.94 | 15 | 4 | 84.2 | 162.6 | 1.9 | 1754 |
| Example 3 | 2.5 | 1.8 | 2.22 | −1.94 | 15 | 4 | 84.1 | 161.6 | 1.7 | 1924 |
| Example 4 | 2.5 | 1.8 | 2.21 | −1.95 | 15 | 2 | 84.2 | 159.8 | 1.5 | 1968 |
| Example 5 | 2.5 | 1.8 | 2.33 | −1.93 | 15 | 4 | 84.1 | 163.0 | 1.6 | 2101 |
| Example 6 | 2.5 | 1.8 | 2.31 | −1.93 | 15 | 3 | 83.6 | 162.4 | 1.4 | 2206 |
| Example 7 | 2.5 | 1.8 | 2.28 | −1.93 | 15 | 2 | 82.1 | 162.0 | 1.3 | 2306 |
| Example 8 | 2.5 | 1.8 | 2.29 | −1.93 | 15 | 6 | 82.9 | 162.7 | 1.7 | 1481 |
| Example 9 | 2.5 | 1.8 | 2.46 | −1.98 | 15 | 4 | 84.4 | 163.9 | 1.5 | 1800 |
| Example 10 | 2.5 | 1.8 | 2.49 | −1.98 | 15 | 4 | 86.7 | 164.1 | 1.3 | 2080 |
| Example 11 | 2.6 | 1.9 | 2.38 | −1.97 | 15 | 4 | 83.3 | 163.6 | 1.8 | 1436 |
| Example 12 | 2.4 | 1.8 | 2.41 | −1.97 | 15 | 3 | 85.7 | 162.6 | 1.3 | 1590 |
| Example 13 | 2.7 | 1.9 | 2.42 | −1.97 | 15 | 4 | 86.6 | 162.9 | 1.8 | 1690 |
| Example 14 | 2.8 | 1.9 | 2.45 | −1.97 | 15 | 2 | 88.0 | 160.0 | 1.9 | 1831 |
| Example 15 | 2.2 | 1.9 | 2.46 | −1.97 | 15 | 2 | 85.4 | 160.0 | 1.9 | 1553 |
| Example 16 | 2.1 | 1.9 | 2.47 | −1.98 | 15 | 4 | 84.1 | 160.4 | 1.9 | 1585 |
| Example 17 | 2.5 | 1.7 | 2.41 | −1.98 | 15 | 3 | 86.6 | 161.6 | 2.3 | 1761 |
| Example 18 | 2.3 | 1.6 | 2.42 | −1.97 | 15 | 3 | 87.5 | 160.5 | 2.4 | 1929 |
| Example 19 | 2.2 | 1.7 | 2.43 | −1.97 | 15 | 3 | 88.3 | 160.5 | 2.4 | 1859 |
| Example 20 | 2.6 | 1.8 | 2.42 | −1.94 | 15 | 3 | 86.7 | 160.1 | 1.7 | 2041 |
| Example 21 | 2.4 | 1.7 | 2.41 | −1.97 | 15 | 3 | 87.5 | 160.7 | 1.8 | 1858 |
| Example 22 | 2.4 | 1.8 | 2.32 | −1.95 | 15 | 1 | 82.9 | 158.2 | 1.4 | 2178 |
| Example 23 | 2.3 | 1.7 | 2.46 | −1.96 | 15 | 2 | 87.9 | 157.5 | 1.2 | 2303 |
| Example 24 | 2.2 | 1.8 | 2.47 | −1.95 | 15 | 2 | 87.7 | 158.2 | 1.3 | 2167 |
| Example 25 | 2.1 | 1.7 | 2.49 | −1.98 | 15 | 2 | 90.2 | 164.9 | 1.5 | 2153 |
| Example 26 | 3.6 | 2.5 | 2.21 | −1.97 | 15 | 6 | 64.9 | 158.4 | 2.4 | 1424 |
| Example 27 | 2.8 | 2.1 | 2.24 | −1.98 | 15 | 4 | 85.4 | 161.6 | 1.9 | 1576 |
| Example 28 | 2.5 | 1.9 | 1.95 | −1.94 | 15 | 6 | 62.9 | 161.1 | 3.2 | 1380 |
| Example 29 | 2.4 | 1.8 | 1.98 | −1.95 | 15 | 5 | 78.7 | 161.8 | 2.3 | 1466 |

TABLE 10-continued

| No. | Lattice change rate (%) | Li/Mn anti-site defect concentration (%) | Compaction density (g/cm³) | surface oxygen valence | Specific surface area of positive electrode active material (m²/g) | leaching out of Fe and Mn (ppm) after cycle | 3 C charge constant current ratio (mAh/g) | 0.1 C capacity of button battery (V) | Battery expansion after storage at 60° C. for 30 d (%) | Cycle numbers corresponding to 80% capacity retention at 45° C. |
|---|---|---|---|---|---|---|---|---|---|---|
| Example 30 | 2.4 | 1.9 | 2.36 | −1.97 | 15 | 11 | 79.0 | 162.4 | 2.4 | 1425 |
| Example 31 | 2.5 | 1.7 | 2.36 | −1.96 | 15 | 8 | 80.6 | 161.8 | 2.3 | 1522 |
| Example 32 | 2.5 | 1.7 | 2.38 | −1.97 | 15 | 10 | 79.5 | 162.1 | 2.2 | 1476 |
| Example 33 | 2.6 | 1.8 | 2.39 | −1.98 | 15 | 16 | 79.8 | 162.4 | 2.7 | 1396 |
| Example 34 | 2.6 | 1.9 | 2.34 | −1.96 | 15 | 11 | 82.0 | 162.7 | 2.3 | 1406 |
| Example 35 | 2.4 | 1.7 | 2.36 | −1.94 | 15 | 8 | 81.5 | 163.8 | 2.6 | 1543 |
| Example 36 | 2.5 | 1.9 | 2.33 | −1.92 | 15 | 10 | 82.3 | 162.0 | 2.7 | 1434 |
| Example 37 | 2.5 | 1.7 | 2.34 | −1.92 | 15 | 13 | 78.7 | 162.3 | 2.5 | 1476 |
| Example 38 | 2.4 | 1.9 | 2.33 | −1.95 | 15 | 19 | 77.6 | 160.9 | 3.0 | 1336 |
| Example 39 | 2.2 | 1.8 | 2.36 | −1.94 | 15 | 17 | 79.8 | 162.7 | 2.9 | 1424 |
| Example 40 | 2.4 | 1.9 | 2.37 | −1.91 | 15 | 22 | 82.3 | 162.0 | 2.7 | 1387 |
| Example 41 | 2.6 | 1.9 | 2.38 | −1.94 | 15 | 19 | 81.4 | 161.0 | 2.6 | 1365 |
| Example 42 | 2.4 | 1.9 | 2.36 | −1.92 | 15 | 11 | 82.2 | 163.1 | 2.1 | 1616 |

TABLE 11

| No. | Thickness of first cladding layer (nm) | Thickness of second cladding layer (nm) | Thickness of third cladding layer (nm) | Content of Mn element (wt %) | Weight ratio of Mn element to P element |
|---|---|---|---|---|---|
| Comparative Example 3 | 4 | — | 10 | 26.1 | 1.383 |
| Comparative Example 4 | — | — | 5 | 24.3 | 1.241 |
| Comparative Example 12 | — | 7.5 | 5 | 19.6 | 1.034 |
| Example 1 | 2 | 7.5 | 5 | 19 | 1.023 |
| Example 2 | 2 | 7.5 | 15 | 18.3 | 1.023 |
| Example 3 | 2 | 7.5 | 20 | 18 | 1.023 |
| Example 4 | 2 | 7.5 | 25 | 17.9 | 1.023 |
| Example 5 | 4 | 7.5 | 5 | 18.7 | 1.011 |
| Example 6 | 6 | 7.5 | 5 | 18.3 | 0.999 |
| Example 7 | 10 | 7.5 | 5 | 17.6 | 0.975 |
| Example 8 | 2 | 2.5 | 5 | 19.8 | 1.043 |
| Example 9 | 2 | 10 | 5 | 18.7 | 1.014 |
| Example 10 | 2 | 12.5 | 5 | 18.4 | 1.004 |
| Example 11 | 2 | 6.3 | 7.5 | 19 | 1.026 |
| Example 13 | 4 | 5 | 10 | 18.7 | 1.108 |
| Example 14 | 5 | 8.8 | 12.5 | 17.8 | 1.166 |

TABLE 12

| No. | Crystal plane spacing of materials for first cladding layer (nm) | Orientation (111) angle of materials for first cladding layer (°) | Crystal plane spacing of materials for second cladding layer (nm) | Orientation (111) angle of materials for second cladding layer (°) |
|---|---|---|---|---|
| Example 1 | 0.303 | 29.496 | 0.348 | 25.562 |
| Example 30 | 0.451 | 19.668 | 0.348 | 25.562 |
| Example 31 | 0.297 | 30.846 | 0.348 | 25.562 |
| Example 32 | 0.457 | 19.456 | 0.348 | 25.562 |
| Example 33 | 0.437 | 20.257 | 0.348 | 25.562 |
| Example 34 | 0.462 | 19.211 | 0.348 | 25.562 |
| Example 35 | 0.450 | 19.735 | 0.348 | 25.562 |
| Example 36 | 0.372 | 23.893 | 0.348 | 25.562 |
| Example 37 | 0.303 | 29.496 | 0.374 | 23.789 |
| Example 38 | 0.303 | 29.496 | 0.360 | 24.710 |
| Example 39 | 0.303 | 29.496 | 0.350 | 25.428 |
| Example 40 | 0.303 | 29.496 | 0.425 | 20.885 |
| Example 41 | 0.303 | 29.496 | 0.356 | 24.993 |
| Example 42 | 0.303 | 29.496 | 0.244 | 36.808 |

As shown in Table 10, the positive electrode active materials obtained by doping modification of lithium manganese phosphate and multilayer cladding of lithium manganese phosphate achieve smaller lattice change rate, smaller concentration of Li/Mn anti-site defects, larger compaction density, surface oxygen valence closer to −2, less leaching out of Mn and Fe after cycle, and better battery performance, such as better high-temperature cycle performance and high-temperature storage performance. The presence of a first additive in a non-aqueous electrolytic solution is beneficial to further reduce leaching out of Mn and Fe and gas production, which further improves rate performance, high-temperature cycle performance and high-temperature storage performance of batteries.

As can be seen from Table 11, by doping lithium manganese iron phosphate (with a manganese content of 35% and a phosphorus content of about 20%) at manganese and phosphorus sites and cladding it with three cladding layers, the content of manganese element in the positive electrode active material as well as a ratio of the content by weight of manganese element to the content by weight of phosphorus element are significantly reduced. Furthermore, comparing Examples 1-14 with Comparative Examples 3, 4, and 12, and combining with Table 10, it can be seen that the decrease in the manganese element and phosphorus element in the positive electrode active material enables leaching out of manganese ions and iron ions to decrease and performance of the battery prepared therefrom to improve.

Examples 30-42 were the same as Example 1 with the exception for materials for a first cladding layer or materials for a second cladding layer. As can be seen from the combination of Examples 30-42, the use of the first cladding layer and the second cladding layer comprising other elements within the scope of the present application has also resulted in a positive electrode active material with good performance and has achieved good battery performance. As can be seen from Table 12, the crystal plane spacing and orientation angle of the first cladding layer and the second cladding layer of the present application are within the range described in the present application.

Examples 43-66 were the same as Example 1 with the exception for the preparation of non-aqueous electrolytic solution. Table 13 shows performances of the batteries prepared by Examples 43-53. Table 14 shows performances of the batteries prepared by Examples 54-61. Table 15 shows performances of the batteries prepared by Examples 62-66.

TABLE 13

| No. | First additive Type | W1 (wt %) | 3 C charge constant current ratio (%) | 0.1 C capacity of button battery (mAh/g) | Battery expansion after storage at 60° C. for 30 d (%) | Cycle numbers corresponding to 80% capacity retention at 45° C. |
|---|---|---|---|---|---|---|
| Example 43 | H1  | 2 | 81.3 | 161.6 | 2.7 | 1402 |
| Example 44 | H2  | 2 | 72.5 | 157.3 | 4.0 | 1200 |
| Example 45 | H13 | 2 | 75.3 | 159.4 | 3.7 | 1267 |
| Example 46 | H14 | 2 | 81.2 | 161.5 | 2.5 | 1407 |
| Example 47 | H21 | 2 | 73.7 | 158.2 | 3.5 | 1245 |
| Example 48 | H29 | 2 | 74.6 | 159.5 | 3.3 | 1276 |
| Example 49 | H33 | 2 | 83.2 | 162.6 | 2.2 | 1501 |
| Example 50 | H35 | 2 | 82.6 | 162.1 | 2.3 | 1489 |
| Example 51 | H36 | 2 | 79.6 | 161.2 | 2.8 | 1396 |
| Example 52 | H37 | 2 | 74.8 | 159.5 | 3.2 | 1298 |
| Example 53 | H38 | 2 | 77.9 | 160.3 | 3.0 | 1323 |

TABLE 14

| No. | First additive Type | W1 (wt %) | W1/(C1 + C2 + C3) | 3 C charge constant current ratio (%) | 0.1 C capacity of button battery (mAh/g) | Battery expansion after storage at 60° C. for 30 d (%) | Cycle numbers corresponding to 80% capacity retention at 45° C. |
|---|---|---|---|---|---|---|---|
| Example 54 | H12 | 0.01 | 0.002 | 71.2 | 157.4 | 4.0 | 1178 |
| Example 55 | H12 | 0.1  | 0.020 | 75.0 | 159.2 | 3.6 | 1235 |
| Example 56 | H12 | 0.5  | 0.100 | 77.4 | 160.9 | 2.9 | 1385 |
| Example 57 | H12 | 1    | 0.200 | 81.3 | 162.5 | 2.5 | 1467 |
| Example 58 | H12 | 5    | 1.000 | 80.3 | 161.3 | 1.8 | 1489 |
| Example 59 | H12 | 10   | 2.000 | 76.5 | 160.2 | 1.5 | 1345 |
| Example 60 | H12 | 15   | 3.000 | 72.9 | 158.7 | 1.0 | 1223 |
| Example 61 | H12 | 20   | 4.000 | 71.1 | 157.3 | 0.8 | 1156 |

TABLE 15

| No. | First additive Type | W1 (wt %) | Second additive Type | W2 (wt %) | 3 C charge constant current ratio (%) | 0.1 C capacity of button battery (mAh/g) | Battery expansion after storage at 60° C. for 30 d (%) | Cycle numbers corresponding to 80% capacity retention at 45° C. |
|---|---|---|---|---|---|---|---|---|
| Example 62 | H12 | 2 | VC | 0.5 | 87.5 | 164.9 | 0.9 | 1867 |
| Example 63 | H12 | 2 | VEC | 0.5 | 86.7 | 164.3 | 1.2 | 1789 |
| Example 64 | H12 | 2 | FEC | 0.5 | 85.3 | 164.1 | 1.5 | 1745 |
| Example 65 | H12 | 2 | Ethane dinitrile | 0.5 | 84.9 | 163.8 | 1.8 | 1634 |
| Example 66 | H12 | 2 | Ethoxy pentafluoro cyclotriphosphonitrile | 0.5 | 84.5 | 163.6 | 2.0 | 1600 |

As can be seen from the combination of Example 1 and Examples 43-53, the improvement effect on battery performances varies slightly depending on the type of the first additive.

As can be seen from the combination of Example 1 and Examples 54-61, as the content of the first additive is increased from 0.01% to 20%, the leaching out of Fe and Mn from the resulting material after cycle gradually decreases, and the safety performance of the corresponding batteries also improves, but the specific capacity, the 3C charge constant current ratio and the cycle performance at 45° C. will decrease to a certain extent when the content of the first additive is higher.

As can also be seen from the combination of Example 1 and Examples 54-61, when the applied amount of C1% by weight of the first cladding layer, the applied amount of C2% by weight of the second cladding layer, the applied amount of C3% by weight of the third cladding layer, and the content of W1% by weight of the first additive satisfy the relationship of W1/(C1+C2+C3) that is from 0.001 to 2, optionally from 0.01 to 1, and more optionally from 0.05 to 1, it is allowed to further improve the specific capacity, cycle performance, and storage performance of batteries.

As can be seen from the combination of Example 1 and Examples 62-66, when the non-aqueous electrolytic solution further comprises an appropriate amount of the second additive, it is allowed to further enhance the specific capacity, rate performance, high-temperature cycle performance, and high-temperature storage performance of batteries.

It should be noted that this application is not limited to the above embodiments. The above embodiments are only provided as examples, and within the technical solution of the present application, embodiments having substantially the same configuration as the technical idea and exerting the same effects are all included within the technical scope of the present application. In addition, various modifications to the embodiments that can be conceived by those skilled in the art without departing from the scope of the spirit of the present application and other embodiments constructed by combining some constituent elements in the embodiments are also included in the scope of the present application.

What is claimed is:

1. A secondary battery, comprising a positive electrode plate and an non-aqueous electrolytic solution, wherein the positive electrode plate comprises a positive electrode active material with a core-shell structure, said positive electrode active material comprising an core and a shell covering said core, said core having a chemical formula of $Li_{1+x}Mn_{1-y}A_yP_{1-z}R_zO_4$, in which x is any value in the range of −0.100 to 0.100, y is any value in the range of 0.001 to 0.500, z is any value in the range of 0.001 to 0.100, said A is one or more elements selected from Zn, Al, Na, K, Mg, Mo, W, Ti, V, Zr, Fe, Ni, Co, Ga, Sn, Sb, Nb, and Ge, optionally one or more elements selected from Fe, Ti, V, Ni, Co and Mg, said R comprises one or more elements selected from B, Si, N and S, optionally one element selected from B, Si, N and S;

said x, y and z having a value satisfying such a condition that the core is electrically neutral overall;

the shell comprising a first cladding layer covering the core, a second cladding layer covering the first cladding layer and a third cladding layer covering the second cladding layer, in which said first cladding layer comprises crystalline pyrophosphate salts of $Li_aMP_2O_7$ and/or $Mb(P_2O_7)_c$, $0 \leq a \leq 2$, $1 \leq b \leq 4$, $1 \leq c \leq 6$, wherein said a, b, and c have an value satisfying such a condition that the crystalline pyrophosphate salts of $Li_aMP_2O_7$ or $Mb(P_2O_7)_c$ are electrically neutral; and each M in the crystalline pyrophosphate salts of $Li_aMP_2O_7$ and/or $Mb(P_2O_7)_c$ is independently one or more elements selected from Fe, Ni, Mg, Co, Cu, Zn, Ti, Ag, Zr, Nb, and Al, and said second cladding layer comprises crystalline phosphate salts of $XPO_4$, X is one or more elements selected from Li, Fe, Ni, Mg, Co, Cu, Zn, Ti, Ag, Zr, Nb and Al; and said third cladding layer is carbon, said non-aqueous electrolytic solution comprises a first additive which comprises one or more of compounds as shown by Formula 1, Formula 2 and Formula 3,

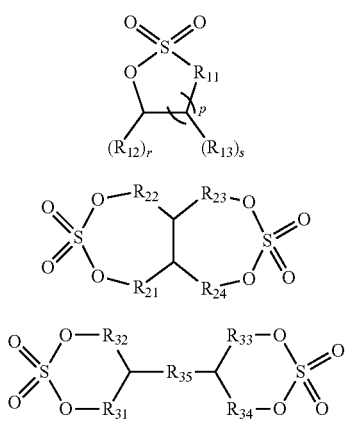

Formula 1

Formula 2

Formula 3 in which p represents 1, 2 or 3, r represents 1 or 2, s represents 1 or 2, $R_{11}$ represents an oxygen atom or $C(Y^1)_2$, $Y^1$ independently represents one of a hydrogen atom, a halogen atom, C1-C6 alkyl, C1-C6 haloalkyl, C1-C6 alkoxy, and C1-C6 haloalkoxy, $R_{12}$ each independently represents one of a hydrogen atom, a halogen atom, C1-C6 alkyl, C1-C6 haloalkyl, C1-C6 alkoxy, and C1-C6 haloalkoxy, $R_{13}$ each independently represents one of a hydrogen atom, a halogen atom, C1-C6 alkyl group, C1-C6 haloalkyl group, C1-C6 alkoxy group, and C1-C6 haloalkoxy group, $R_{21}$, $R_{22}$, $R_{23}$, $R_{24}$ each independently represent a single bond or $C(Y^2)_2$, and $Y^2$ each independently represents one of a hydrogen atom, a halogen atom, C1-C6 alkyl, C1-C6 haloalkyl, C1-C6 alkoxy, and C1-C6 haloalkoxy, $R_{31}$, $R_{32}$, $R_{33}$, $R_{34}$ each independently represent a single bond or $C(Y^3)_2$, and $Y^3$ each independently represents one of a hydrogen atom, a halogen atom, C1-C6 alkyl, C1-C6 haloalkyl, C1-C6 alkoxy, and C1-C6 haloalkoxy, and $R_{35}$ is absent or represents one of a single bond, an oxygen atom, C1-C6 alkylene, C1-C6 haloalkylene, C1-C6 oxa-alkylene.

2. The secondary battery as claimed in claim 1, wherein said compound shown in Formula 1 satisfies at least one of the following conditions (1) to (4):

(1) p represents 1 or 2, (2) $R_{11}$ represents an oxygen atom or $C(Y^1)_2$, with $Y^1$ independently representing one of a hydrogen atom, a fluorine atom, methyl, ethyl, propyl, fluorinated methyl, fluorinated ethyl, fluorinated propyl, methoxy, ethoxy, and propoxy, (3) $R_{12}$ each independently represents one of a hydrogen atom, a fluorine atom, methyl, ethyl, propyl, fluorinated methyl, fluorinated ethyl, fluorinated propyl, methoxy, ethoxy, and propoxy, and (4) $R_{13}$ each independently represents one of a hydrogen atom, a fluorine atom, methyl, ethyl, propyl, fluorinated methyl, fluorinated ethyl, fluorinated propyl, methoxy, ethoxy, and propoxy; and/or said compound shown in formula 2 satisfies at least one of the following conditions (5) to (7):

(5) $R_{21}$, $R_{22}$, $R_{23}$, $R_{24}$ independently represent a single bond or methylene, (6) $R_{21}$, $R_{22}$, $R_{23}$, and $R_{24}$ are not all a single bond, and (7) one or both of $R_{21}$, $R_{22}$ are methylene, and one or both of $R_{23}$, $R_{24}$ are methylene; and/or said compound shown in formula 3 satisfies at least one of the following conditions (8) to (10):

(8) $R_{31}$, $R_{32}$, $R_{33}$, and $R_{34}$ independently represent a single bond or methylene, and $R_{31}$, $R_{32}$, $R_{33}$, and $R_{34}$ are not all a single bond, (9) $R_{35}$ is absent or represents one of a single bond, an oxygen atom, methylene, ethylene, propylene, fluorinated methylene, fluorinated ethylene, fluorinated propylene, 2-oxa-1,3-propylene, 2-oxa-1,4-butylene, 3-oxa-1,5-pentylene, and

(10) $R_{35}$ is absent or represents one of a single bond, methylene, ethylene, propylene, 2-oxa-1,3-propylene.

3. The secondary battery as claimed in claim 1, wherein $R_{31}$, $R_{32}$, $R_{33}$, $R_{34}$, and $R_{35}$ satisfy any one of the following conditions (1) to (6):

(1) $R_{35}$ is a single bond, one or both of $R_{31}$ and $R_{32}$ are methylene, and the remaining substituents are a single bond, and (2) $R_{35}$ is a single bond, one or both of $R_{33}$ and $R_{34}$ are methylene, and the remaining substituents are a single bond, and (3) $R_{35}$ is a single bond, one of $R_{31}$ and $R_{32}$ is methylene, one of $R_{33}$ and $R_{34}$ is methylene, and the remaining substituents are a single bond, and (4) $R_{35}$ is a single bond, one of $R_{31}$ and $R_{32}$ is methylene, one of $R_{33}$ and $R_{34}$ is methylene, and the remaining substituents are a single bond, and (5) $R_{35}$ is a single bond, $R_{33}$ and $R_{34}$ are both methylene, one of $R_{31}$ and $R_{32}$ is methylene, and the remaining substituents are a single bond, and (6) $R_{35}$ is a single bond, $R_{31}$, $R_{32}$, $R_{33}$, $R_{34}$ are all methylene.

4. The secondary battery as claimed in claim 1, wherein said first additive comprises at least one of the following compounds:

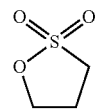

H1

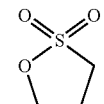

H2

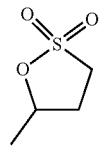

H3

-continued
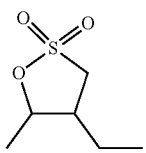 H4
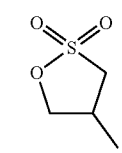 H5
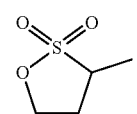 H6
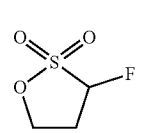 H7
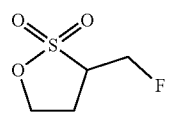 H8
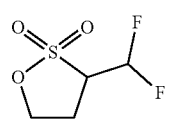 H9
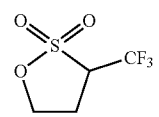 H10
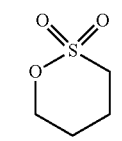 H11
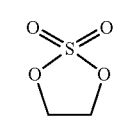 H12
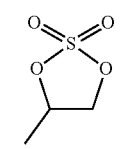 H13
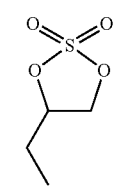 H14
-continued
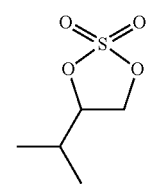 H15
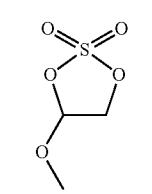 H16
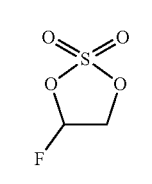 H17
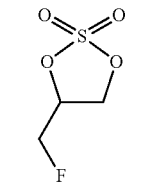 H18
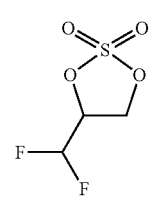 H19
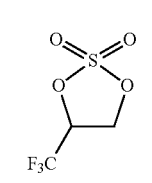 H20
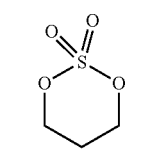 H21
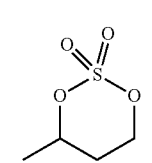 H22
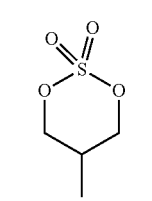 H23

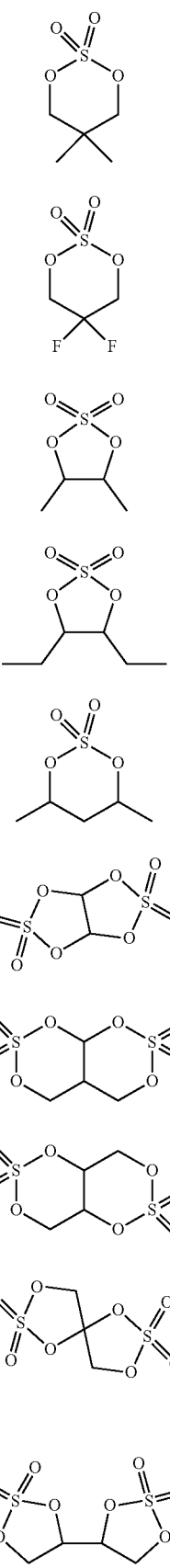
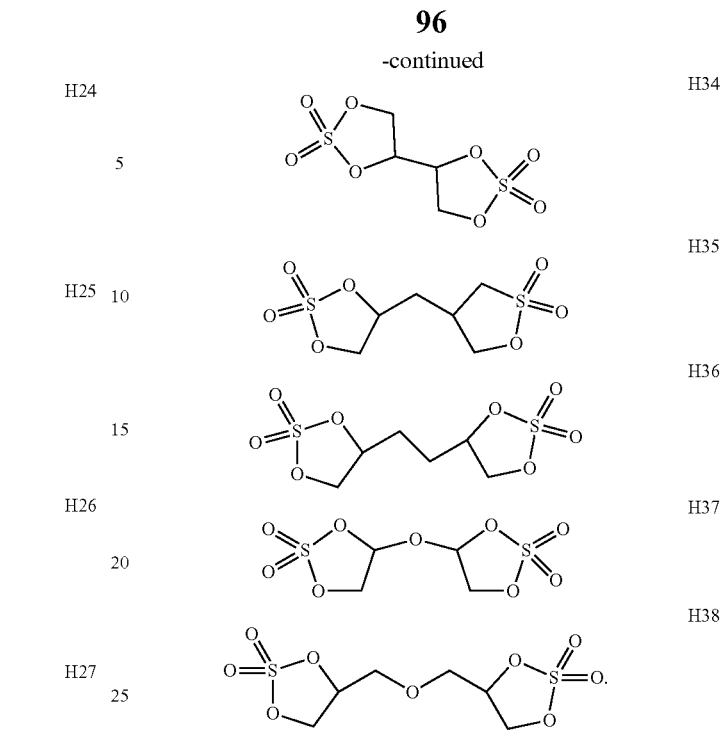

5. The secondary battery as claimed in claim 1, wherein
said first additive is present in an amount of W1% by weight, with W1 being 0.01 to 20, optionally 0.1 to 10, more optionally 0.5 to 5, based on the total weight of said non-aqueous electrolytic solution; and/or said first cladding layer is applied in an amount of C1% by weight, with C1 being greater than 0 wt % and less than or equal to 6 wt %, optionally of greater than 0 wt % and less than or equal to 5.5 wt %, more optionally of greater than 0 wt % and less than or equal to 2 wt %, based on the weight of said core; and/or said second cladding layer is applied in an amount of C2% by weight, with C2 being greater than 0 wt % and less than or equal to 6 wt %, optionally of greater than 0 wt % and less than or equal to 5.5 wt %, more optionally of from 2 wt % to 4 wt %, based on the weight of said core; and/or said third cladding layer is applied in an amount of C3% by weight, with C3 being greater than 0 wt % and less than or equal to 6 wt %, optionally of greater than 0 wt % and less than or equal to 5.5 wt %, more optionally of greater than 0 wt % and less than or equal to 2 wt %, based on the weight of said core.

6. The secondary battery as claimed in claim 5, wherein W1/(C1+C2+C3) is 0.001 to 2, optionally 0.01 to 1, and more optionally 0.05 to 1.

7. The secondary battery as claimed in claim 1, wherein the non-aqueous electrolytic solution further includes a second additive, and the second additive comprises one or more of a cyclic carbonate compound containing unsaturated bonds, a halogenated cyclic carbonate compound, a nitrile compound, a phosphonitrile compound, an aromatic hydrocarbon and halogenated aromatic hydrocarbon compound, an anhydride compound, a phosphite ester compound, a phosphate ester compound, a borate ester compound, a sulfite ester compound, a methylene disulfonate compound, and an isocyanate compound.

8. The secondary battery as claimed in claim 1, wherein
said first cladding layer has a thickness of 1 to 10 nm; and/or
said second cladding layer has a thickness of 2 to 15 nm; and/or
said third cladding layer has a thickness of 2 to 25 nm.

9. The secondary battery as claimed in claim 1, wherein in said core,
a ratio of y to 1−y is from 1:10 to 1:1, optionally from 1:4 to 1:1; and/or
a ratio of z to 1−z is from 1:9 to 1:999, optionally from 1:499 to 1:249.

10. The secondary battery as claimed in claim 1, wherein
said first cladding layer contains crystalline pyrophosphate salts having a crystal plane spacing of 0.293 nm to 0.470 nm, and a crystal orientation (111) angle of 18.00° to 32.00°;
said second cladding layer contains crystalline phosphate salts having a crystal plane spacing of 0.244 nm to 0.425 nm, and a crystal orientation (111) angle of from 20.000 to 37.00°.

11. The secondary battery as claimed in any one of claims 1 to 10, wherein the carbon of the third cladding layer is a mixture of SP2 carbon and SP3 carbon, optionally, a molar ratio of the SP2 carbon to SP3 carbon is any value in the range of 0.1 to 10, optionally any value in the range of 2.0 to 3.0.

12. The secondary battery as claimed in claim 1, wherein, based on the weight of the positive electrode active material,
manganese is present in a content in the range of from 10 wt % to 35 wt %, optionally in the range of from 15 wt % to 30 wt %, and more optionally in the range of from 17 wt % to 20 wt %,
phosphorus is present in a content in the range of from 12 wt % to 25 wt %, optionally in the range of from 15 wt % to 20 wt %,
optionally, a weight ratio of manganese to phosphorus is in the range of 0.90 to 1.25, optionally in the range of 0.95 to 1.20.

13. The secondary battery as claimed in claim 1, wherein said positive electrode active material satisfies at least one of the following conditions (1) to (5):
(1) said positive electrode active material has a lattice change rate of 4% or less, optionally 3.8% or less, more optionally from 2.0% to 3.8% before and after complete de-intercalation and intercalation of lithium;
(2) said positive electrode active material has a Li/Mn anti-site defect concentration of 4% or less, optionally 2.2% or less, more optionally from 1.5% to 2.2%;
(3) said positive electrode active material has a compaction density of 2.2 g/cm$^3$ or more, optionally 2.2 g/cm$^3$ or more and 2.8 g/cm$^3$ or less, at 3 T;
(4) said positive electrode active material has a surface oxygen valence of −1.82 or less, optionally −1.89 to −1.98; and
(5) said positive electrode active material has a specific surface area of B in m$^2$/g, with B being in the range of 7 to 18, optionally 10 to 15.

14. A battery module, comprising the secondary battery according to claim 1.

15. A battery pack, comprising the battery module according to claim 14.

16. An electrical device comprising the secondary battery according to claim 1.

* * * * *